(12) United States Patent
Scotchmer et al.

(10) Patent No.: US 12,409,504 B2
(45) Date of Patent: Sep. 9, 2025

(54) WELDING APPLICATOR AND METHOD OF APPLICATION

(71) Applicant: HUYS INDUSTRIES LIMITED, Weston (CA)

(72) Inventors: Nigel Scotchmer, Willowdale (CA); Franklin Rementer, Dover, DE (US); Dominic Cheuk Hung Leung, Thornhill (CA)

(73) Assignee: HUYS INDUSTRIES LIMITED, Weston (CA)

(*) Notice: Subject to any disclaimer, the term of this patent is extended or adjusted under 35 U.S.C. 154(b) by 377 days.

(21) Appl. No.: 16/781,638

(22) Filed: Feb. 4, 2020

(65) Prior Publication Data
US 2020/0246900 A1    Aug. 6, 2020

Related U.S. Application Data

(60) Provisional application No. 62/801,437, filed on Feb. 5, 2019.

(51) Int. Cl.
*B23K 9/04* (2006.01)
*B23H 1/00* (2006.01)
(Continued)

(52) U.S. Cl.
CPC .............. *B23K 9/04* (2013.01); *B23H 1/02* (2013.01); *B23K 9/09* (2013.01); *B23K 9/1006* (2013.01);
(Continued)

(58) Field of Classification Search
CPC ........ B23K 9/09; B23K 9/124; B23K 9/1043; B23K 9/04; B23K 9/173; B23K 9/1006; B23H 1/02; B23H 1/00
(Continued)

(56) References Cited

U.S. PATENT DOCUMENTS 2,526,035 A    10/1950    Miller
3,558,998 A *  1/1971    Bertolasi ................. B23H 1/02
                                                    315/121
(Continued)

FOREIGN PATENT DOCUMENTS

CA    902189 A    6/1972
CA    1177545 A1    11/1984
(Continued)

OTHER PUBLICATIONS

Machine English Translation of CN-103817399-A (Year: 2014).*
(Continued)

*Primary Examiner* — Helena Kosanovic
*Assistant Examiner* — Erwin J Wunderlich
(74) *Attorney, Agent, or Firm* — Vorys, Sater, Seymour and Pease LLP; Rex W. Miller, II

(57) ABSTRACT

A welding rod assembly has a seat, a chuck, and a welding rod. The chuck has a socket for the welding rod. The seat has a passageway having an inlet and an outlet, and a fluid conduit through the seat. The apparatus that has a power supply having a main control unit, and a welding electrode. It has synthetic discharge signal generator programmed to produce DC discharges as output electrical signals from the power supply. Each discharge has a voltage, charge, starting time and polarity. The discharges define a synthetic AC output. It has an output polarity reversing switch. The apparatus includes three output terminals, a first of the output terminals being connected to the welding electrode, a second of said output terminals and a third of said output terminals having respective workpiece connections.

20 Claims, 49 Drawing Sheets

(51) Int. Cl.
*B23H 1/02* (2006.01)
*B23K 9/09* (2006.01)
*B23K 9/10* (2006.01)
*B23K 9/12* (2006.01)
*B23K 9/173* (2006.01)

(52) U.S. Cl.
CPC .............. *B23K 9/124* (2013.01); *B23K 9/173* (2013.01); *B23H 1/00* (2013.01); *B23K 9/1043* (2013.01)

(58) Field of Classification Search
USPC ............... 219/130.51, 70, 96, 113, 95, 76.13
See application file for complete search history.

(56) References Cited

U.S. PATENT DOCUMENTS

| | | | |
|---|---|---|---|
| 3,662,148 A | 5/1972 | Blosser et al. | |
| 3,763,343 A | 10/1973 | Rocklin | |
| 3,764,771 A | 10/1973 | Roy | |
| 3,845,271 A | 10/1974 | Hirano et al. | |
| 3,939,321 A | 2/1976 | Bertrand et al. | |
| 4,029,931 A | 6/1977 | Simmons | |
| 4,098,447 A | 7/1978 | Edson et al. | |
| 4,356,378 A | 10/1982 | Cloos et al. | |
| 4,551,603 A * | 11/1985 | Rocklin .................. | B23H 1/02 219/76.13 |
| 4,614,857 A | 9/1986 | Webb et al. | |
| 4,861,961 A | 8/1989 | Huys | |
| 4,866,237 A | 9/1989 | Inoue | |
| 4,873,412 A | 10/1989 | Vinczer et al. | |
| 4,950,860 A * | 8/1990 | El-Menshawy .......... | B23H 7/18 219/69.18 |
| 4,992,639 A | 2/1991 | Watkins et al. | |
| 5,281,789 A | 1/1994 | Merz et al. | |
| 5,448,035 A | 9/1995 | Thutt et al. | |
| 5,541,382 A | 7/1996 | Taylor et al. | |
| 5,688,364 A | 11/1997 | Sato | |
| 5,914,057 A | 6/1999 | Nippert et al. | |
| 5,947,364 A | 9/1999 | Tamura et al. | |
| 6,020,568 A | 2/2000 | Joseph | |
| 6,295,708 B1 | 10/2001 | Spaid et al. | |
| 6,380,505 B1 | 4/2002 | Stoops et al. | |
| 6,417,477 B1 * | 7/2002 | Brown .................... | B23K 9/044 219/76.13 |
| 6,452,130 B1 | 9/2002 | Qian et al. | |
| 6,465,754 B1 * | 10/2002 | Balleys .................. | B23H 1/022 219/69.18 |
| 7,358,458 B2 | 4/2008 | Daniel | |
| 7,538,294 B2 | 5/2009 | Scotchmer | |
| 8,101,040 B2 | 1/2012 | Shibata et al. | |
| 9,789,557 B2 * | 10/2017 | Lin ........................ | C23C 26/02 |
| 10,391,574 B2 * | 8/2019 | Scotchmer ............. | B23K 37/00 |
| 11,738,401 B2 * | 8/2023 | Marchione ............. | B23K 9/044 219/76.1 |
| 2001/0054602 A1 * | 12/2001 | Watanabe ............... | B23K 11/241 219/110 |
| 2005/0072762 A1 | 4/2005 | Delgado | |
| 2005/0092728 A1 | 5/2005 | Barbeau et al. | |
| 2005/0284848 A1 | 12/2005 | Martin Gonzalez | |
| 2006/0029512 A1 | 2/2006 | Dong et al. | |
| 2007/0211503 A1 * | 9/2007 | Oyama .................... | H02M 3/07 363/62 |
| 2009/0161212 A1 | 6/2009 | Gough | |
| 2009/0230108 A1 * | 9/2009 | Nakahara ................. | B23K 9/23 219/137 PS |
| 2009/0314748 A1 | 12/2009 | Rao et al. | |
| 2011/0042356 A1 | 2/2011 | Leung et al. | |
| 2012/0152909 A1 | 6/2012 | Hung | |
| 2013/0200054 A1 * | 8/2013 | O'Donnell ............. | B23K 9/121 219/137 R |
| 2013/0228558 A1 * | 9/2013 | Daniel .................... | B23K 9/025 219/130.21 |
| 2013/0260648 A1 | 10/2013 | Rementer | |
| 2014/0050938 A1 | 2/2014 | Lin et al. | |
| 2015/0076120 A1 * | 3/2015 | Pagano .................. | B23K 9/073 219/124.1 |
| 2015/0165538 A1 * | 6/2015 | Shijie ...................... | C23C 26/00 219/76.13 |
| 2015/0343549 A1 * | 12/2015 | Henry .................. | B23K 9/1735 219/130.51 |
| 2016/0082539 A1 * | 3/2016 | Flagg ...................... | B23K 9/32 219/130.51 |
| 2018/0178308 A1 * | 6/2018 | Scotchmer .......... | B23K 9/0953 |
| 2021/0346976 A1 * | 11/2021 | Scotchmer .......... | B23K 35/004 |

FOREIGN PATENT DOCUMENTS

| | | | | |
|---|---|---|---|---|
| CA | 2712119 A1 | 2/2011 | | |
| CA | 2871185 A1 | 11/2014 | | |
| CA | 2820146 A1 | 12/2019 | | |
| CN | 101994079 A | 3/2011 | | |
| CN | 102019531 A | 4/2011 | | |
| CN | 201824106 U | 5/2011 | | |
| CN | 103131981 A | 6/2013 | | |
| CN | 103817399 A * | 5/2014 | .............. | B23K 9/04 |
| CN | 103993312 A | 8/2014 | | |
| CN | 106695030 A * | 5/2017 | | |
| DE | 102015000734 A1 | 7/2016 | | |
| EP | 0192880 B1 | 1/1989 | | |
| EP | 2669036 A2 | 4/2013 | | |
| GB | 428396 A | 5/1935 | | |
| GB | 2215250 A | 9/1989 | | |
| JP | 5822218 B1 * | 11/2015 | .............. | B23K 9/042 |
| WO | 9511107 A1 | 4/1995 | | |
| WO | 2006/122410 A1 | 11/2006 | | |
| WO | 2014138891 A1 | 9/2014 | | |
| WO | WO-2015003290 A1 * | 1/2015 | .............. | B23K 9/04 |

OTHER PUBLICATIONS

Machine English Translation of WO-2015003290-A1 (Year: 2015).*
Machine English Translation of JP-5822218-B1 (Year: 2015).*
Machine English Translation of CN-106695030-A (Year: 2017).*
International Search Report and Written Opinion dated Jun. 10, 2014; PCT/CA2014/000219.
International Search Report and Written Opinion dated Apr. 23, 2020; PCT/CA2020/050143.

* cited by examiner

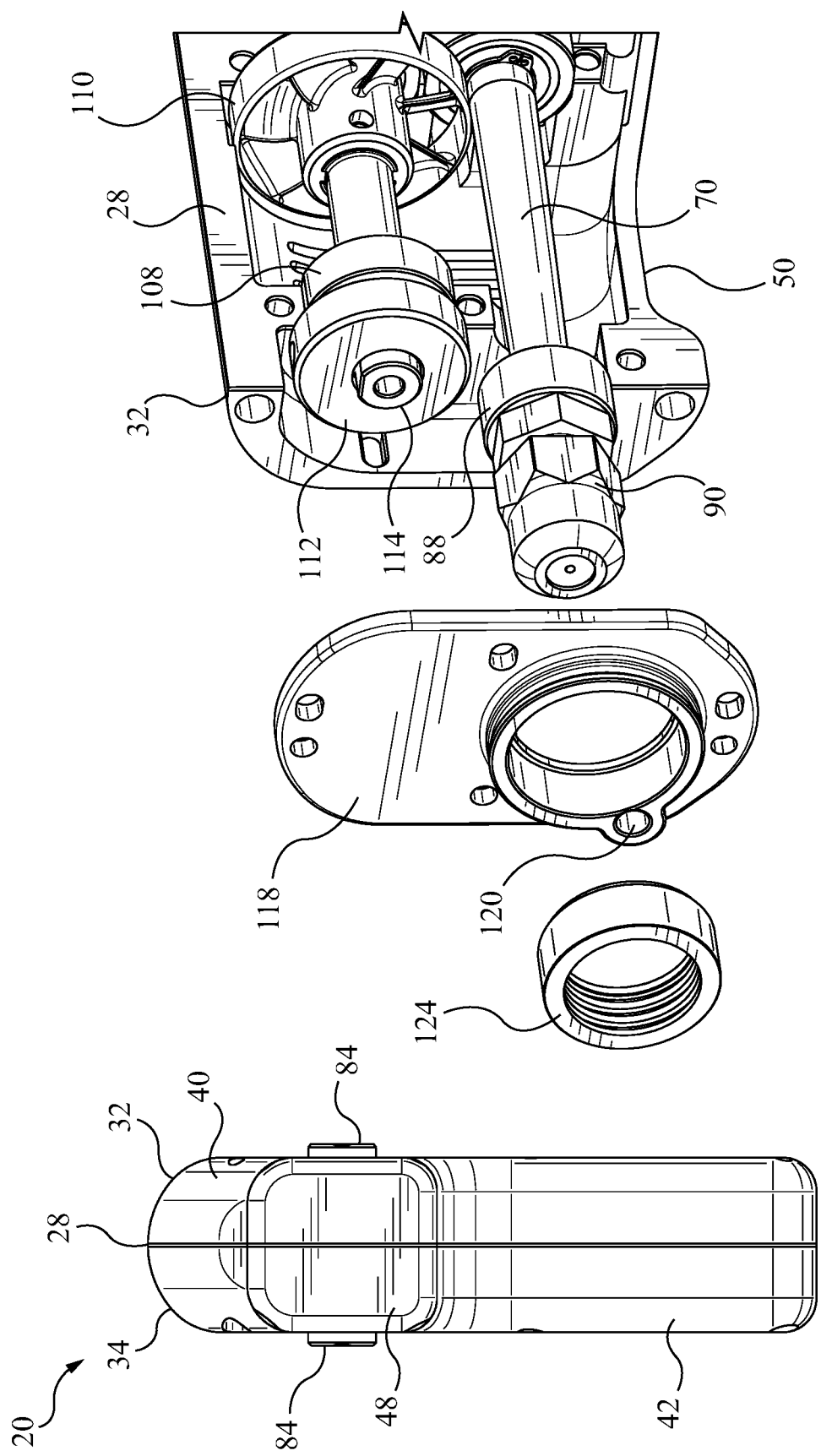

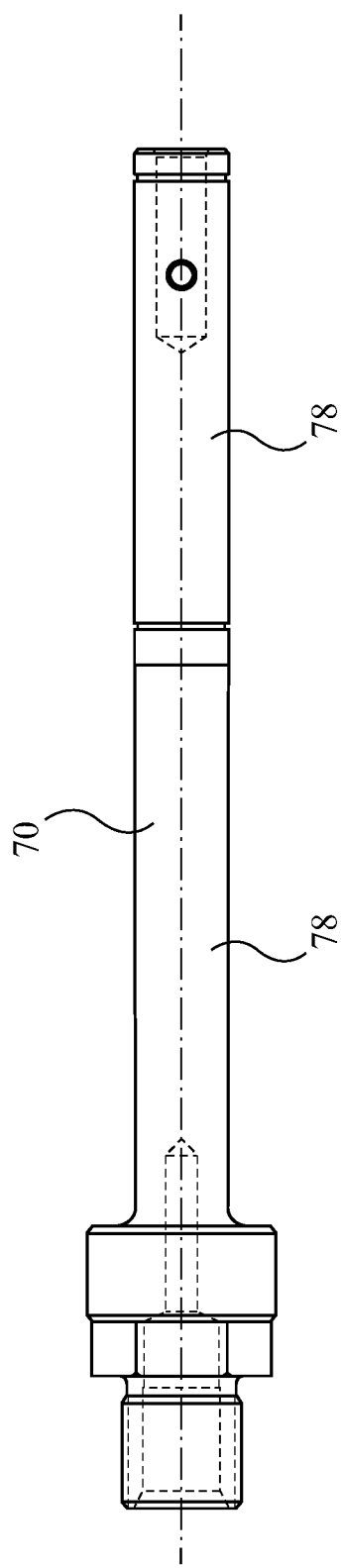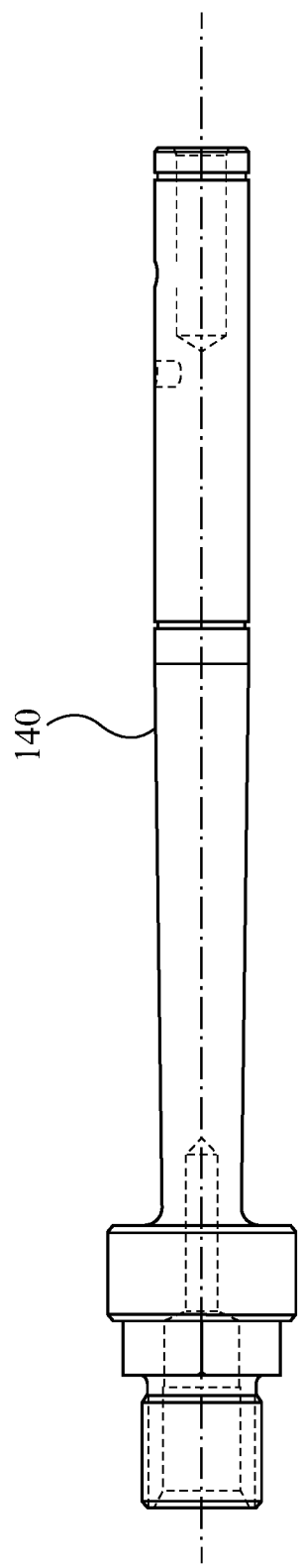
FIG. 8a
FIG. 8b

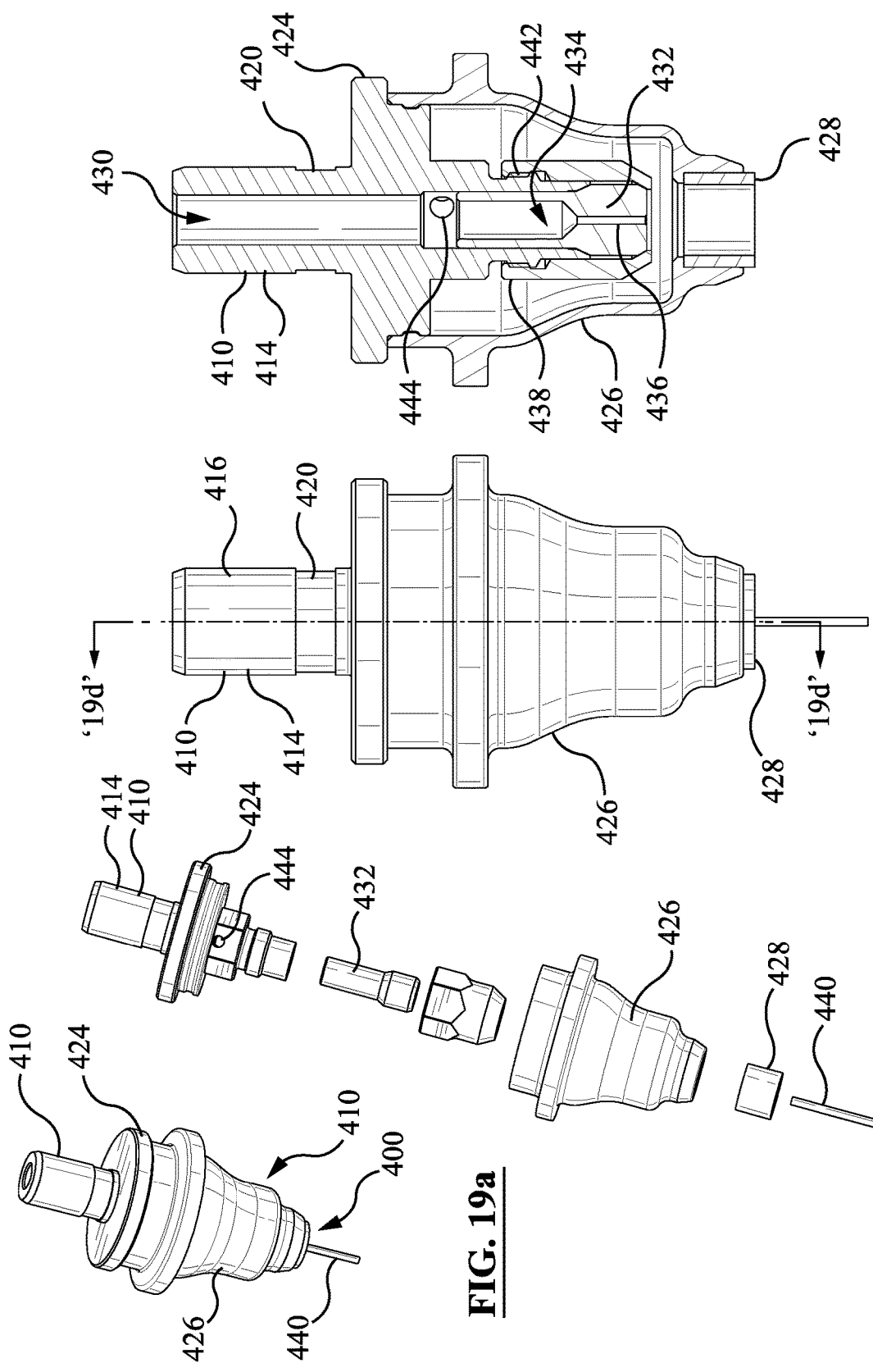

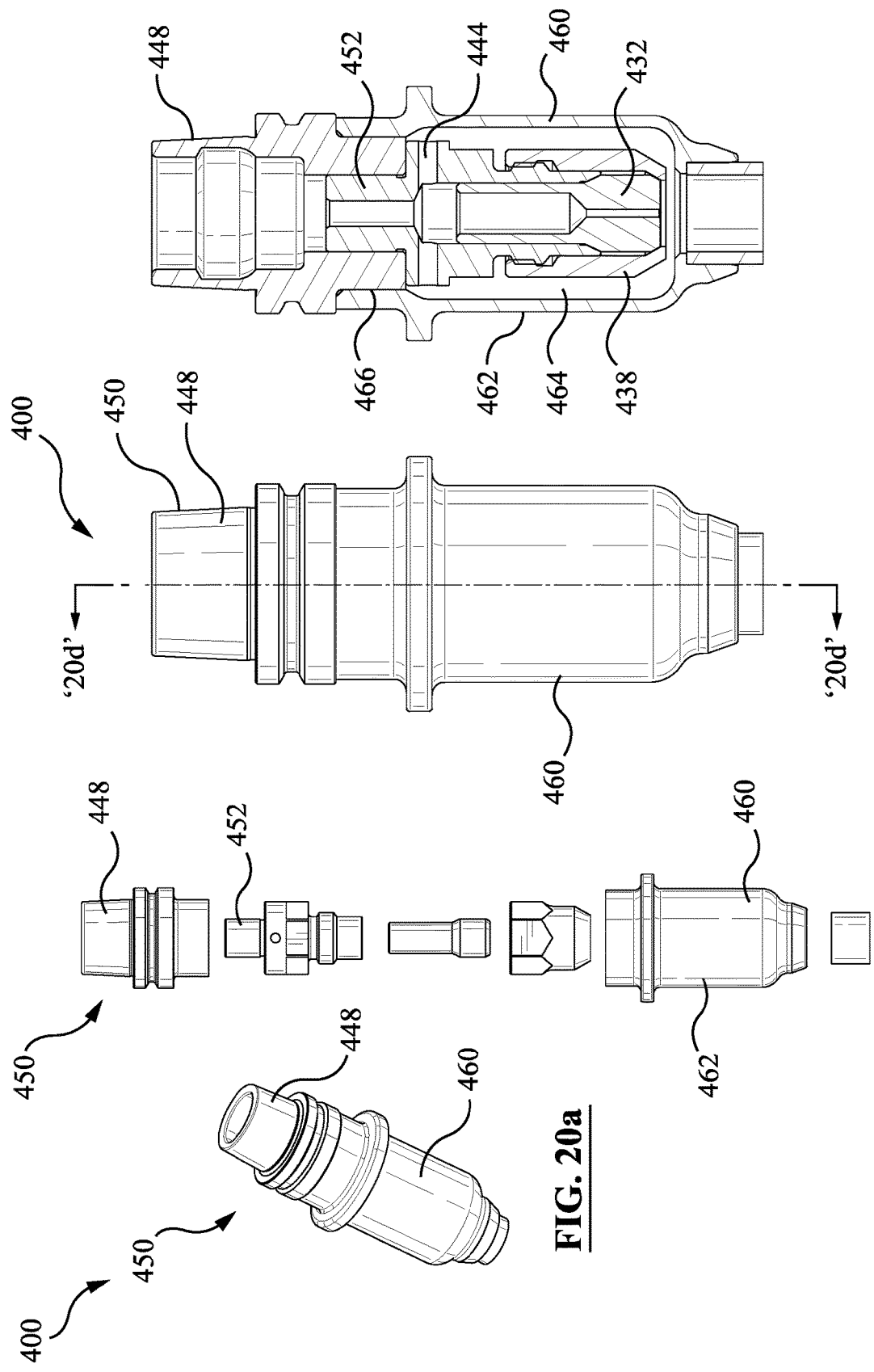

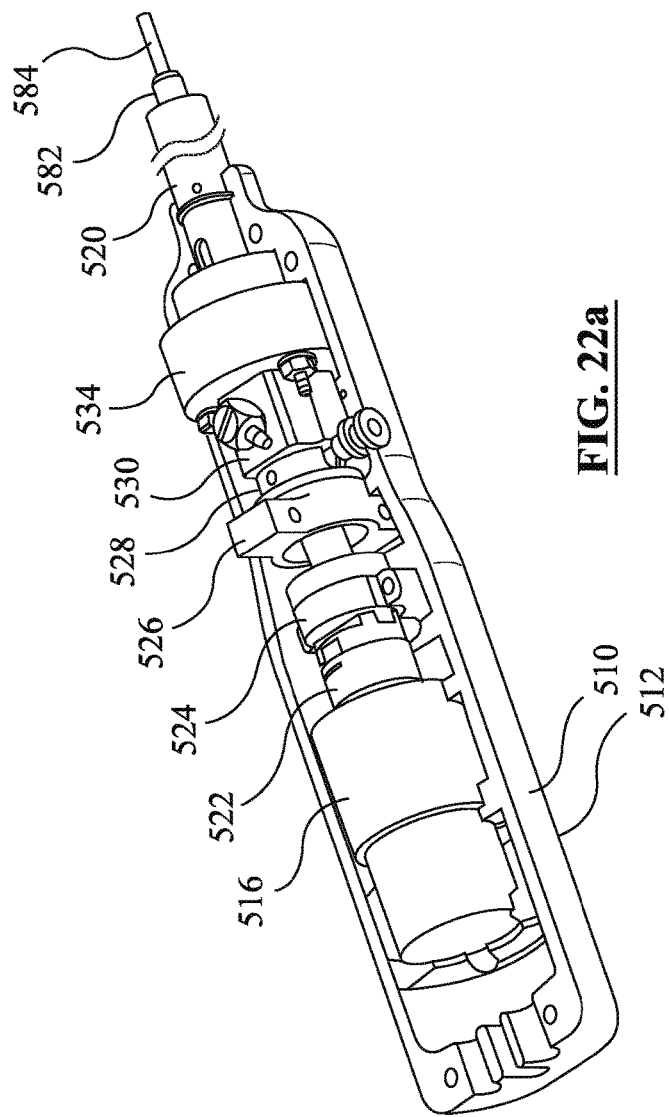
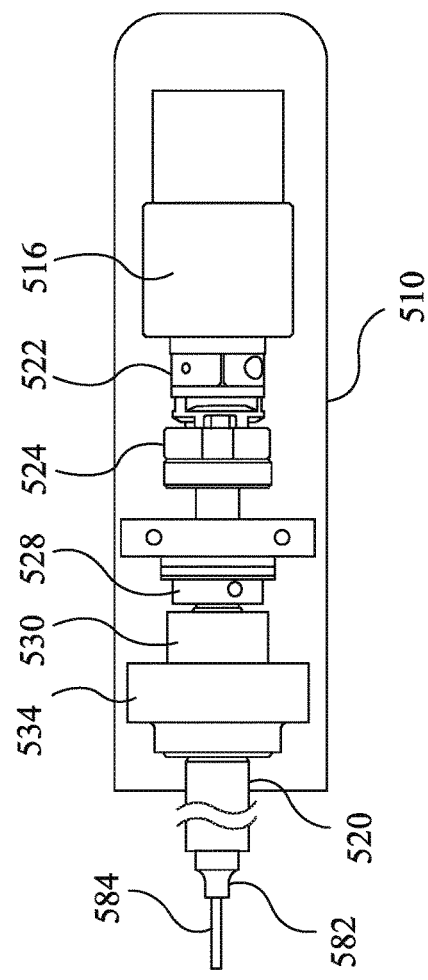
FIG. 22a
FIG. 22b

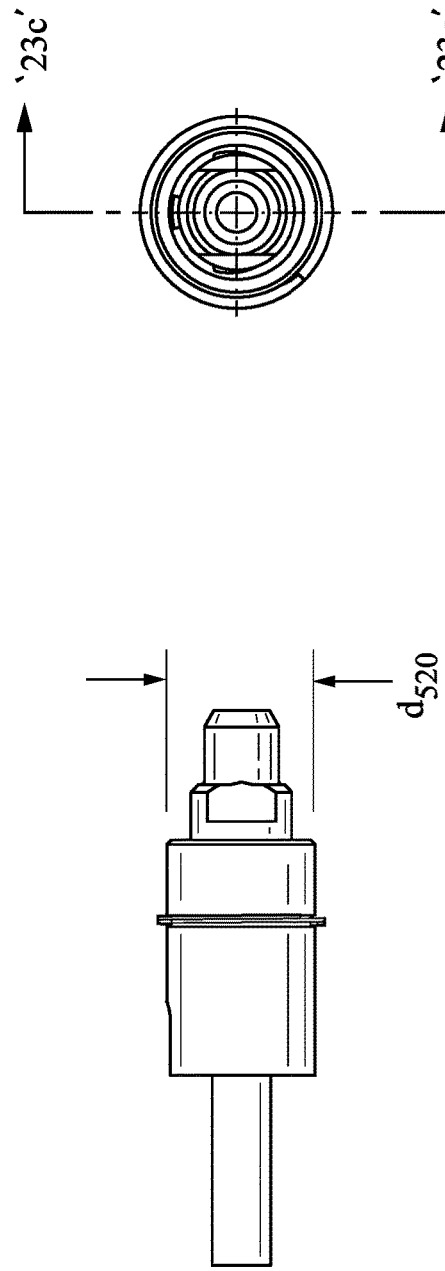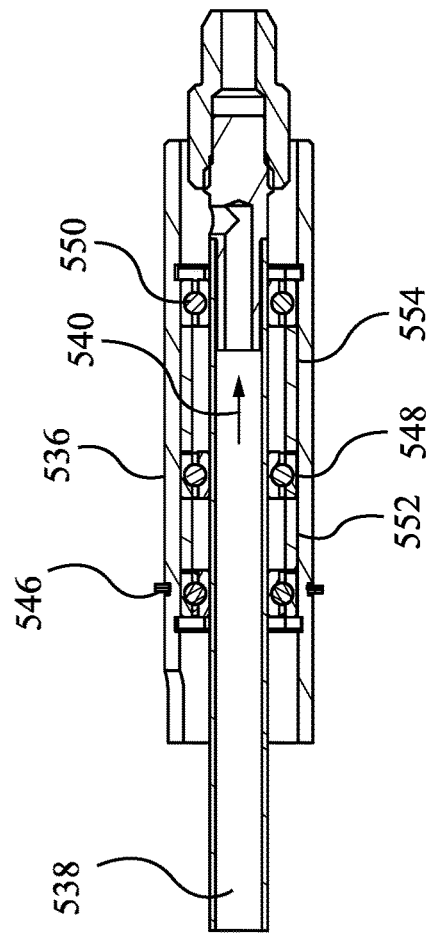
FIG. 23a
FIG. 23b
FIG. 23c

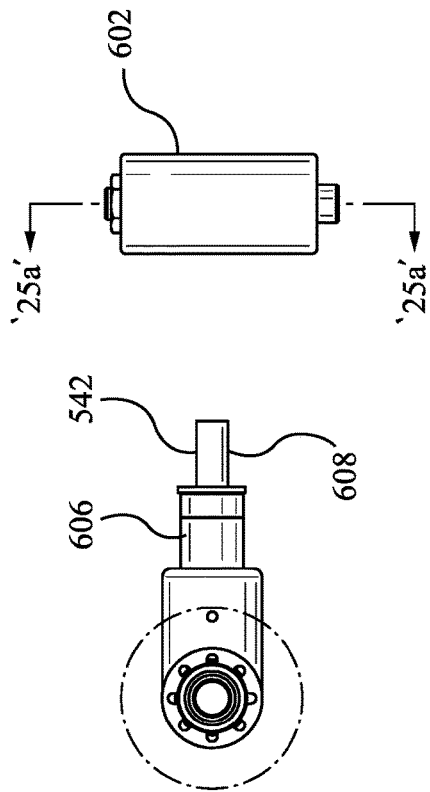
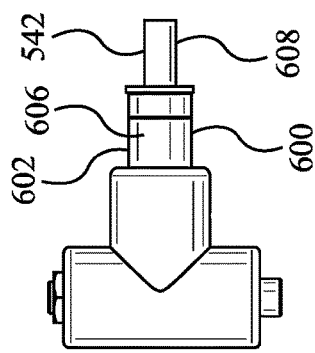
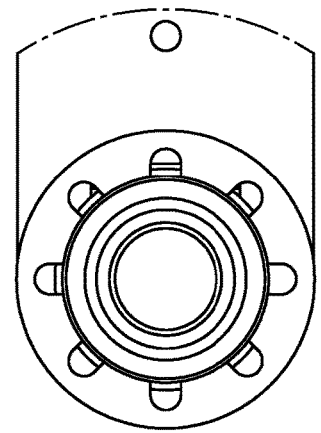
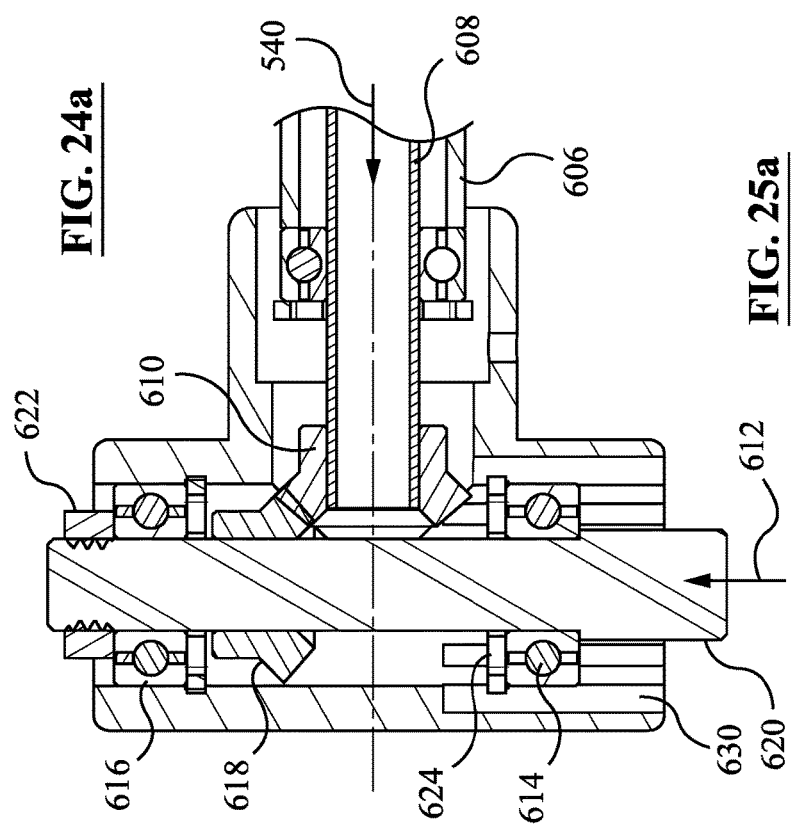
FIG. 24c
FIG. 24b
FIG. 25b
FIG. 24a
FIG. 25a

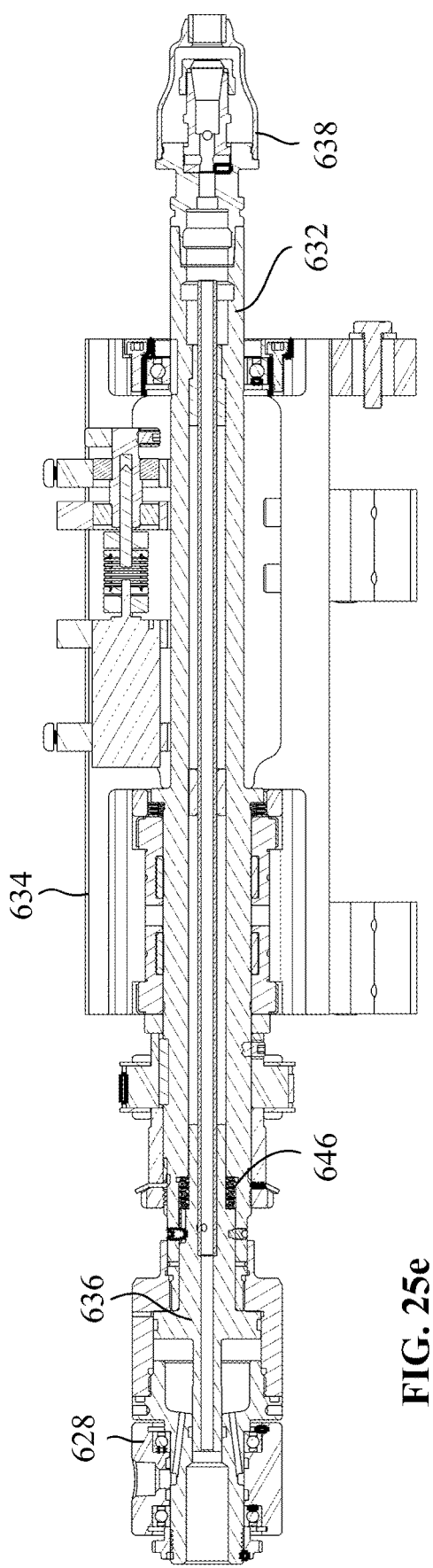
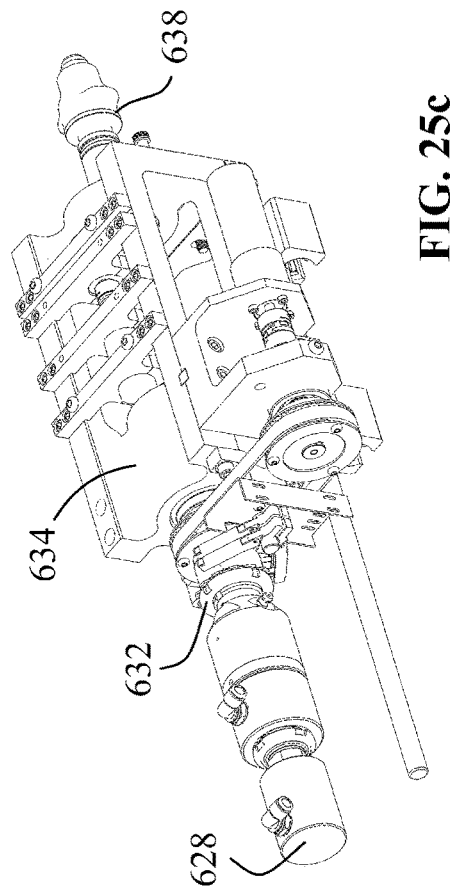
FIG. 25c
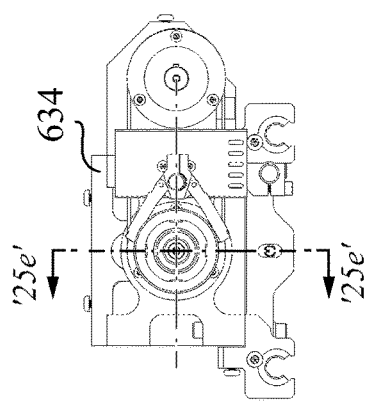
FIG. 25d
FIG. 25e

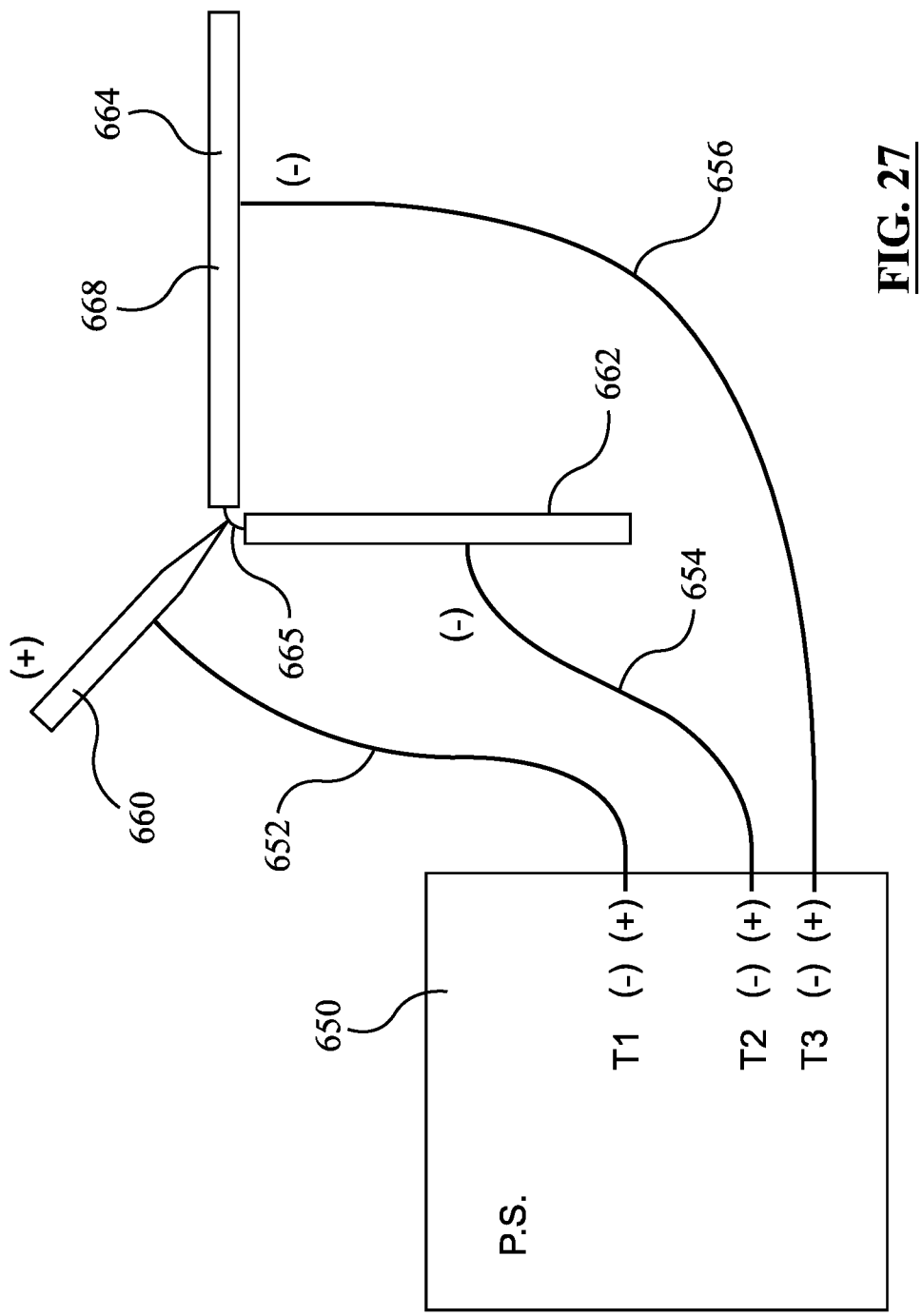

Dual Return Alternating Polarity ESD Power Supply

WELDING APPLICATOR AND METHOD OF APPLICATION

This application claims the benefit of priority of U.S. Provisional Patent Application Ser. No. 62/801,437 filed Feb. 5, 2019, the specification and drawings thereof being incorporated in their entirety herein by reference.

FIELD OF INVENTION

This application relates to tools for welding electrodes, and to a method of welding.

BACKGROUND

In a number of industries it may be helpful to be able to coat a metal substrate having certain desired qualities with a coating of a dissimilar material having other properties. One such application may be for the coating of existing parts by a deposition process. Another application may occur where it is desired to remove or repair defects in the surface of a substrate, whether as a planar surface or as part of a non-planar three-dimensional object. Another application may pertain to welding electrodes for use in a production line for the sequential assembly of parts using a large number of welding stations. Welding electrodes are generally made of copper. The electrode may have a surface coating, such as a ceramic coating, that may be intended to increase electrode life. Other objects, such as steel may be provided with a surface coating, such as nickel or chrome. For example, coatings of vanadium-carbide, tungsten-carbide, titanium-diboride, zirconium-diboride, Titanium-carbide, $Cr_3C_2$, and so on, might be applied to tool steels or aluminum, or other metals, as may be. Such treatments, or coatings, or repairs may occur where it is desired to change the surface, or near surface properties of an object, such as hardness, or corrosion resistance or other property.

The surface area will be coated with a layer of the electrode material when swept by the electrode. The electrode cap may be mounted to a moving device. The condition of the contact may be dependent on the relative motion of the rod of depositing electrode coating material and the electrode cap to be coated.

Sometimes the surface to be welded or treated or coated, or a defect to be repaired, or materials to be joined, may not be conveniently located. The welding location may have poor access, as on the inside of a bore, tube, or cylinder. Sometimes it may be helpful to provide shielding gas even in such a poorly accessible location. In ESD processes it may also be helpful to cause motion between the electrode at the location of application and the surface of the workpiece to which the welding or coating activity is to be applied.

Further, ESD processes tend to be Low Energy Welding processes, in which the energy of an individual welding discharge may be substantially less than 200 Joules. ESD welding is considered to be, or is grouped as, a Direct Current (DC) process, and the inadvertent application of the incorrect polarity may tend to be quickly evident.

SUMMARY

As described herein, in one aspect, there is a welding rod assembly. It has a seat, a chuck, and a welding rod, all of them being electrically conductive. The seat has a first end, a second end, and a body extending between the first and second ends. The first end of the seat is matable to a rotational drive. The second end of the seat and the chuck are releasably matingly engageable. The chuck has a socket defined therein in which an end of the welding rod is permanently mounted. The seat has a passageway formed therein, the passageway having an inlet and an outlet. The passageway defines a fluid conduit from the first end of the seat toward the chuck.

In another aspect there is a welding rod assembly. It has a welding rod and a chuck. The welding rod is unremovably mounted in the chuck. The chuck has a releasable end fitting operable to engage a welding electrode holder seat.

In a feature of that aspect, the releasable end fitting is a threaded end fitting. In another feature, the chuck has a socket in which an end of the welding rod is mounted, and the chuck is plastically deformed after insertion of the end of the rod in the socket. In a further feature, the chuck is made of a different material from the welding rod. In a still further feature, there assembly includes the electrode holder seat, and the seat has an end fitting that mates with the end fitting of the chuck. In another feature, the respective end fittings are threaded end fittings. In still another feature, the seat has a shielding gas passageway formed therethrough.

In another aspect there is a welding coating head. It has a conductor and a shroud. The shroud extends along the conductor. The conductor has a first end and a second end. The conductor is a rotor having a torque input fitting at the first end, and a torque output fitting at the second end. The conductor has a fluid passageway defined therewithin. The fluid passageway has an inlet at the first end of the conductor, and an outlet at the second end of the conductor. The conductor is electrically conductive and has an electrical input at the first end of the conductor and an output at the second end of the conductor.

In a feature of that aspect, there is a set of bearings mounted along the shroud within which the conductor is carried, the shroud being a stator relative to the conductor. In another feature, the bearings are non-electrically conductive. In still another feature there is any one or more of (a) the shroud is electrically non-conductive; (b) the shroud has an electrically non-conductive coating; and (c) the shroud is electrically isolated from the conductor. in another feature, the coating head has a welding rod mounted to the second end thereof. In still another feature, the coating head has a welding rod holder seat mounted to the second end thereof. In a further feature, a welding rod holder is mounted to the welding rod holder seat. In still another feature, the welding rod holder is removably mounted to the seat, and the rod holder has a welding rod permanently mounted thereto. In a further feature, a welding rod holder seat is mounted to the second end thereof, and the seat includes a non-coaxial welding rod mounting. In another feature, the welding rod mounting has a transverse welding rod accommodation. In yet another feature, the welding rod mounting includes a gear drive having a transverse shaft output. In another feature, the transverse shaft output includes bevel gearing. In yet another feature, the welding head is mounted to a holding body, the holding body including any one of: (a) a mechanical transmission by which the rotor is driven; (b) an electrical stator mounted to pass electrical current into the rotor; and (c) a fluid union by which fluid is supplied to the rotor. In still another feature, the welding head is mounted to a holding body, and the holding body includes a vibration source. In yet another feature, the vibration source includes at least one of (a) a mechanical oscillator; and (b) an ultrasonic vibration source.

In another aspect, there is a method of surface treatment employing a welding head, the method of surface treatment comprising applying a direct current discharge between a welding electrode and a workpiece to be treated, and subsequently applying a direct current discharge of opposite polarity between the welding electrode and the workpiece to be treated.

In a feature of that aspect, the method includes applying a train of direct current discharges between the welding electrode and the workpiece, and the train of discharges includes both positive polarity discharges and negative polarity discharges. In another feature, there is a train of the discharges, and the number of discharges of positive polarity is different from the number of discharges of negative polarity. In still another feature, there is a train of the discharges, and the train is asymmetric as between positive discharges and negative discharges in at least one of (a) number of discharges; (b) initial voltage of discharges; (c) duration of individual discharges; and (d) total electric charge per pulse of discharge. In yet another feature, the welding head is connected to a power supply having a plurality of capacitor banks, and the method includes charging different capacitors of the capacitor banks to different voltages.

In a further feature, the welding head is connected to a power supply having at least one programmably controlled switch connected to govern discharge from a first capacitor, and the method includes operating the switch to reverse the polarity of output from the first capacitor to the welding head. In again another feature, the welding head is connected to a power supply, the power supply has a programmable controller, and the method includes operating the controller to form asymmetric positive and negative polarity discharges. In another feature, individual discharge pulses of one polarity have greater electrical charge per discharge than do individual discharge pulses of the opposite polarity. In still another feature, a synthetic AC wavetrain of discharge pulses is applied between the welding electrode and the workpiece, the synthetic AC wavetrain being made up of DC discharge pulses of varying polarity.

In yet another feature, the method proceeds while at least one of: (a) a mechanical oscillation source acts on at least one of (i) the welding electrode; (ii) the workpiece; and (c) any fixture to which the workpiece is mounted; and (b) an ultrasonic vibration source acts on (i) the welding electrode; (ii) the workpiece; and (c) any fixture to which the workpiece is mounted. In a further feature, a first vibration source acts on the welding electrode; and a separate, second vibration sources acts on any one of (i) the workpiece; and (ii) any fixture to which the workpiece is mounted. In another feature, the method includes rotating the welding electrode during welding. In still another feature, the method includes any one of (a) rotating the workpiece; and (b) shaking the workpiece, during welding. In a further feature, the method includes peening deposited weld material at times during the method when discharge is not occurring. In another feature, the method includes providing a supply of shielding gas during welding. In still another feature, the method includes initiating discharges at a frequency greater than 10 Hz. In a further feature, the method includes maintaining total energy in individual ones of the discharges to less than 20 Joules. In a still further feature, the method includes maintaining total energy in individual ones of the discharges to less than 2 Joules. In yet another feature the method includes alternating discharge current between at least two workpiece connections. In a still further feature, the method includes building a fillet of weldmetal between two workpiece parts using electro-spark deposition.

In another aspect of the invention there is an electro-spark deposition apparatus. It has a power supply having a main control unit and a welding electrode connected to the power supply. The main control unit includes a synthetic discharge signal generator programmed to produce DC discharges as output electrical signals from the power supply. Each discharge has an initial voltage, a charge, a starting time and a polarity. The synthetic discharge signal generator is programmed to release a plurality of these DC discharges in series. The set of discharges defines a synthetic AC output composed of the series of the DC discharges.

In a feature of that aspect, the apparatus includes an output polarity reversing switch and a main control unit connected to operate the output polarity reversing switch. in another feature, the apparatus includes at least three output terminals, a first of the output terminals is connected to the welding electrode, a second of the output terminals and a third of the output terminals has respective workpiece connections. In another feature, the apparatus includes an output selection switch operable alternately to connect the second and third output terminals, and a main control unit connected to operate the output selection switch. In a further feature, the power supply includes at least first and second banks of capacitors, and the main control unit is connected to govern discharge of the first and second banks of capacitors.

In another aspect, there is a method of electro-spark deposition. It includes providing a welding apparatus including a power supply, a welding electrode connected to the power supply, and a consumable welding electrode rod mounted to the welding electrode, and at least first and second workpiece connections emanating from the power supply. The workpiece connections, in operation, are of opposite polarity to the welding electrode. The method includes providing an electro-spark discharge current to the welding electrode rod while the power supply is switched to elect the first workpiece connection; switching the power supply to elect the second workpiece connection; and providing an electro-spark discharge current to the welding electrode rod while the power supply is switched to elect the second workpiece connection.

In another feature, the method includes repeatedly switching back and forth between the first and second workpiece connections. In a further feature, the method includes reversing polarity as between the welding electrode and the first and second workpiece connections from time to time. In yet another feature, the method includes changing output voltage when polarity is reversed. In still another feature, the method includes applying a first voltage during straight polarity discharge, and applying a second voltage during reverse polarity discharge. The first voltage has a greater magnitude than the second voltage. In an additional feature, the method includes applying straight polarity discharges more often than reverse polarity discharges. In a further additional feature, there is a ratio of straight polarity discharges to reverse polarity discharges, and the ratio is in the range of 2:1 to 10:1. In still another feature the method includes vibrating at least the welding electrode to peen deposited weld metal between discharges. In another feature, the method includes applying ultrasonic vibration to the workpiece.

In still yet another feature, the workpiece includes a first work piece part and a second workpiece part, and the method includes welding the first workpiece part and the second workpiece part together to form the workpiece. In another feature, the first workpiece connection is electrically connected to the first workpiece part, and the second workpiece connection is electrically connected to the second workpiece part. In a further feature, the first workpiece part is made of a first material and the second workpiece part is made of a second material. The first material is different from the second material. In a yet further feature, the method includes providing an electro-spark deposition coating of at least one of the first and second workpiece parts of a first coating alloy, followed by a further coating of a second coating alloy applied to the first coating alloy. In another feature, the method includes building a weldmetal fillet between the first and second workpiece parts. In another feature, the method is undertaken in the presence of a shielding gas.

In another aspect, there is an electro-spark deposition apparatus. It has a power supply, and an electro-spark deposition applicator. The power supply includes a main control unit operable to govern electro-spark discharge signals from the power supply. The power supply has a first output terminal connected to the electro-spark deposition applicator. The power supply has at least a second output terminal and a third output terminal. The second and third output terminals have respective workpiece connections. The first terminal is of opposite polarity to the second and third terminals.

In a feature of that aspect, the control unit is programmed to alternate connection between the second and third output terminals. In another feature, the power supply has a polarity reversing switch, and the control unit is programmed to reverse polarity as between (a) the first output terminal; and (b) the second and third output terminals. In another feature, the power supply includes at least a first capacitor bank and a second capacitor bank. In operation, the first capacitor bank is maintained at a different voltage than is the second capacitor bank. In an additional feature, the first voltage is higher than the second voltage. The first voltage is applied in a first polarity mode, and the second voltage is applied in a second, opposed, polarity mode. In another feature, the apparatus has an input power converter. The input power converter is sensitive to at least voltage amplitude and frequency of input power, and a main control unit is programmed to transform input power received by the input power converter to a DC output. In another feature, the apparatus includes a welding electrode vibrator. In another feature, the apparatus includes a workpiece vibrator.

BRIEF DESCRIPTION OF THE DRAWINGS

These aspects and features can be understood with the aid of the following illustrations of exemplary, and non-limiting, embodiments in which:

FIG. 5 is an end view of the apparatus of FIG. 1;

FIG. 6 is an exploded perspective view of the forward end of the apparatus of FIG. 1;

FIG. 8a shows a first embodiment of rotating shaft for the assembly of FIG. 7;

FIG. 8b sows a second embodiment of rotating shaft for the assembly of FIG. 7;

FIG. 9b shows an enlarged perspective view of a detail of FIG. 9a;

FIG. 10b is a side view of the apparatus of FIG. 10a;

FIG. 11a is a perspective view of an alternative embodiment of the welding apparatus of FIG. 10a;

FIG. 11b is a side view of the embodiment of FIG. 11a;

FIG. 12a is a perspective view with near side half shell cover removed of a still further alternative embodiment to that of FIG. 9a; and FIG. 12b is a side view of the welding apparatus of FIG. 12a;

FIG. 14a shows a left hand side view of the coating apparatus of FIG. 13a;

FIG. 14b shows a front view of the welding or coating apparatus of FIG. 14a;

FIG. 14c shows a right and view of the coating apparatus of FIG. 14a;

FIG. 14d shows a rear view of the coating apparatus of FIG. 14a;

FIG. 14e shows a top view of the coating apparatus of FIG. 14a;

FIG. 14f shows a bottom view of the coating apparatus of FIG. 14a;

FIG. 15a shows front view of the spindle housing of the apparatus of FIG. 14a;

FIG. 16c shows a perspective view of from the left front of the coating head of the coating apparatus of FIG. 14a;

FIG. 16d shows a perspective view from the rear right of the coating head for the coating apparatus of FIG. 14a;

FIG. 17a shows a perspective view, from the right front, of a base or slide assembly of the coating apparatus of FIG. 14a;

FIG. 17b shows a perspective view from the left front of the assembly of FIG. 17a;

FIG. 19a shows a manual release chuck for the tool of FIG. 18a;

FIG. 19b is an exploded view of the chuck of FIG. 19a;

FIG. 19c is a side view of the chuck of FIG. 19a;

FIG. 19*d* is a cross-sectional view of the chuck of FIG. 19*c* on '19*d*-19*d*' of FIG. 19*c* on the vertical centerline plane;

FIG. 20*a* shows a quick release chuck for the tool of FIG. 18*a*;

FIG. 20*b* is an exploded view of the chuck of FIG. 20*a*;

FIG. 20*c* is a side view of the chuck of FIG. 20*a*; and

FIG. 20*d* is a cross-sectional view of the chuck of FIG. 19*c* on '20*d*-20*d*' of FIG. 20*c* on the vertical centerline plane;

FIG. 22*a* is a perspective view of a welding electrode handle of the welding apparatus of FIG. 21*a* with one half of its shell housing removed;

FIG. 22*b* is a top view of the apparatus of FIG. 22*a*;

FIG. 23*a* is a side view of an extension head of the electrode handle of FIG. 22*a*;

FIG. 23*b* is a cross-section of the end extension of FIG. 23*a*;

FIG. 23*c* is an end view of the end extension of FIG. 23*a*;

FIG. 24*a* is a side view of an alternate end fitting for the end extension of FIG. 23*a*;

FIG. 24*b* is a top view of the alternate end fitting of FIG. 24*a*;

FIG. 24*c* is an end view of the alternate end fitting of FIG. 24*a*;

FIG. 25*a* is an enlarged cross-sectional detail of the end fitting of FIG. 24*a* taken on section '25*a*-25*a*' of FIG. 24*c*; and FIG. 25*b* is an end view of the end extension of FIG. 25*a*;

FIG. 25*c* is a perspective view of an apparatus such as that of FIG. 22*b* in a mounting head such as that of FIG. 15*b*, suitable for mounting to an automated carrier;

FIG. 25*d* is an end view of the mounting head of FIG. 25*c*;

FIG. 25*e* is a cross-sectional view comparable to FIG. 15*b* of the apparatus of FIG. 25*c* taken on section '25*e*-25*e*' of FIG. 25*d*;

FIG. 27 shows a schematic of a welding apparatus;

DETAILED DESCRIPTION

Figure 1:
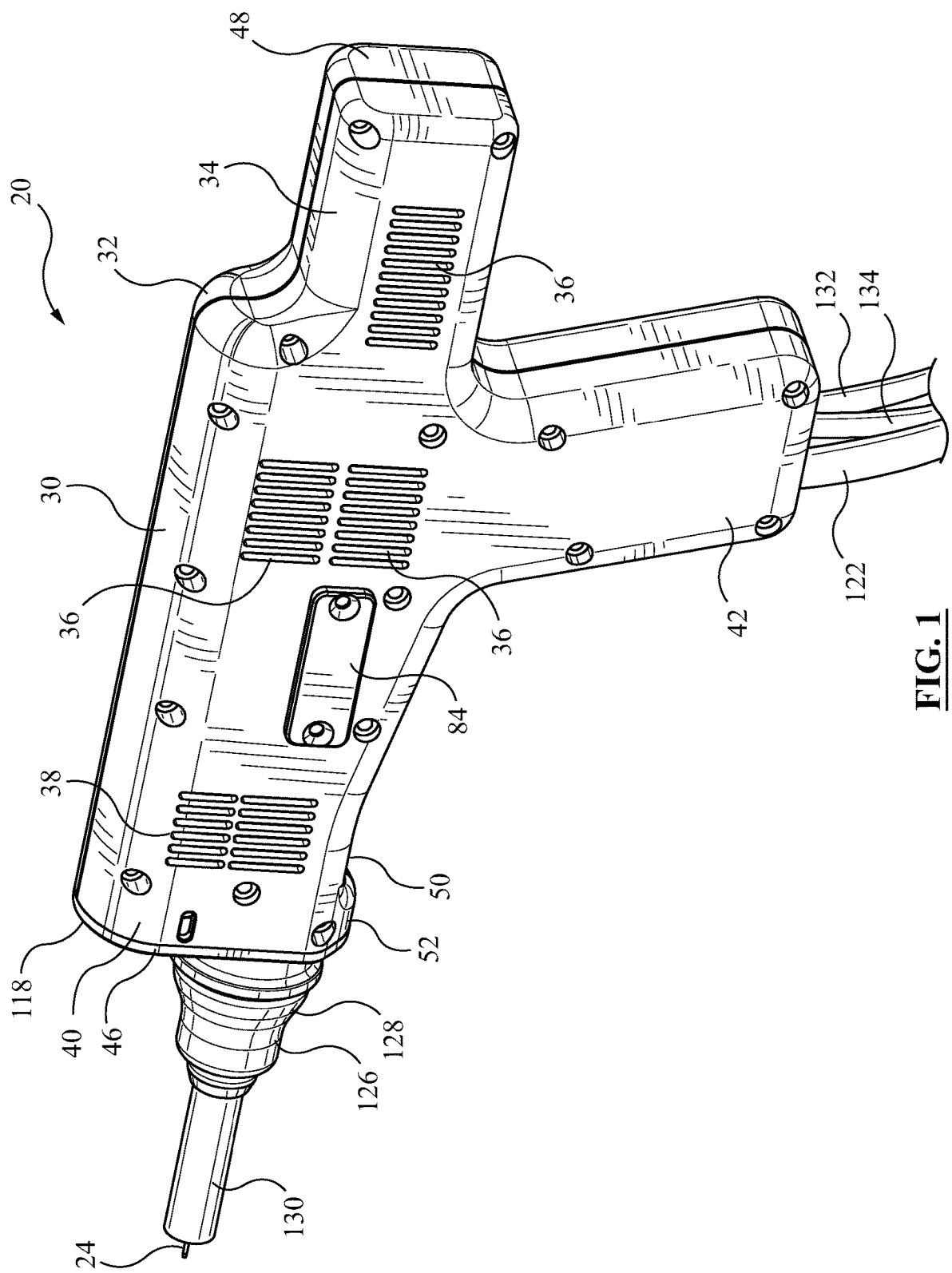
FIG. 1 is a perspective view of a welding apparatus for holding a welding electrode.
Figure 2:
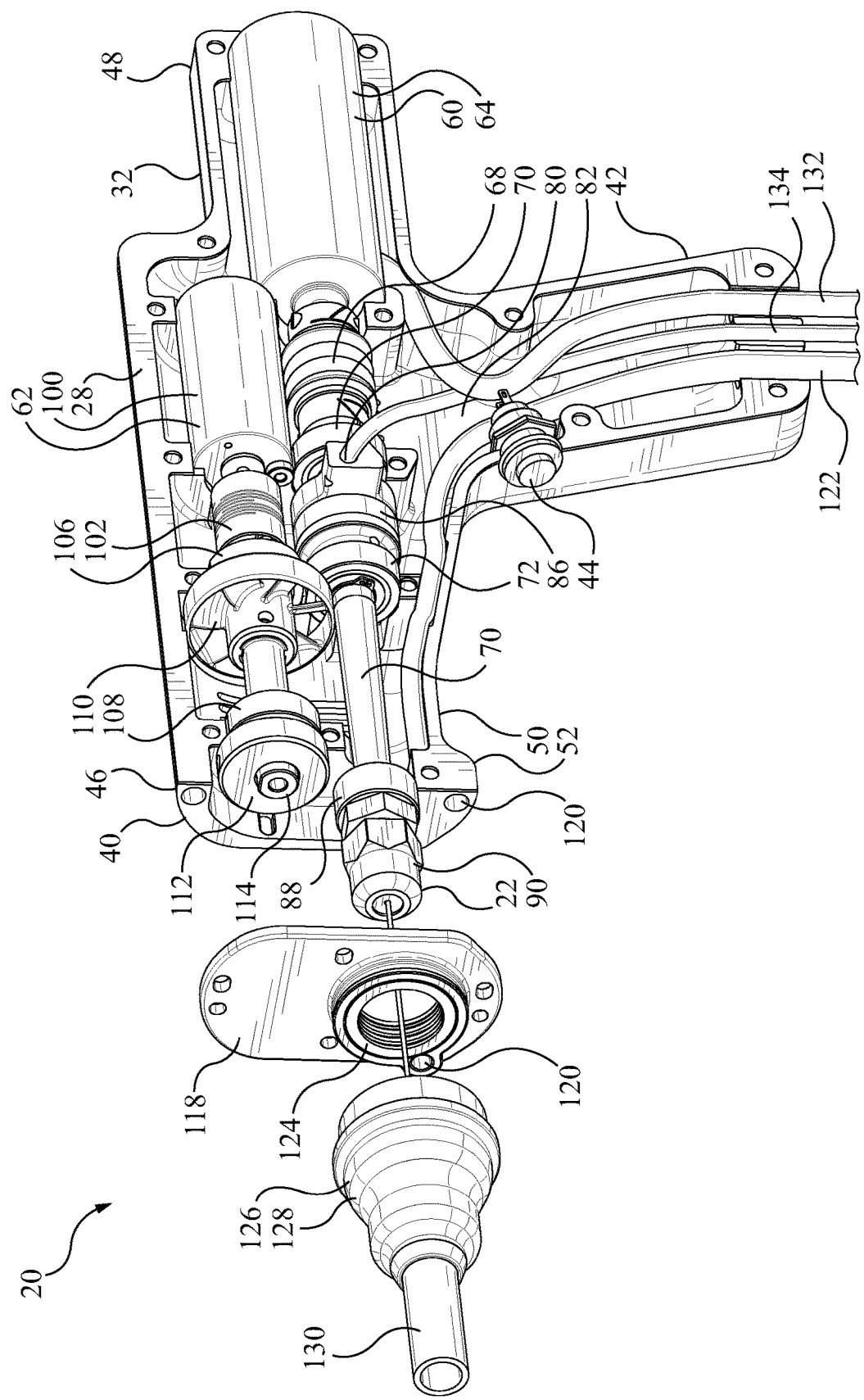
FIG. 2 shows an exploded perspective view of the apparatus of FIG. 1 with near side exterior shell removed to reveal internal details.
Figure 3:
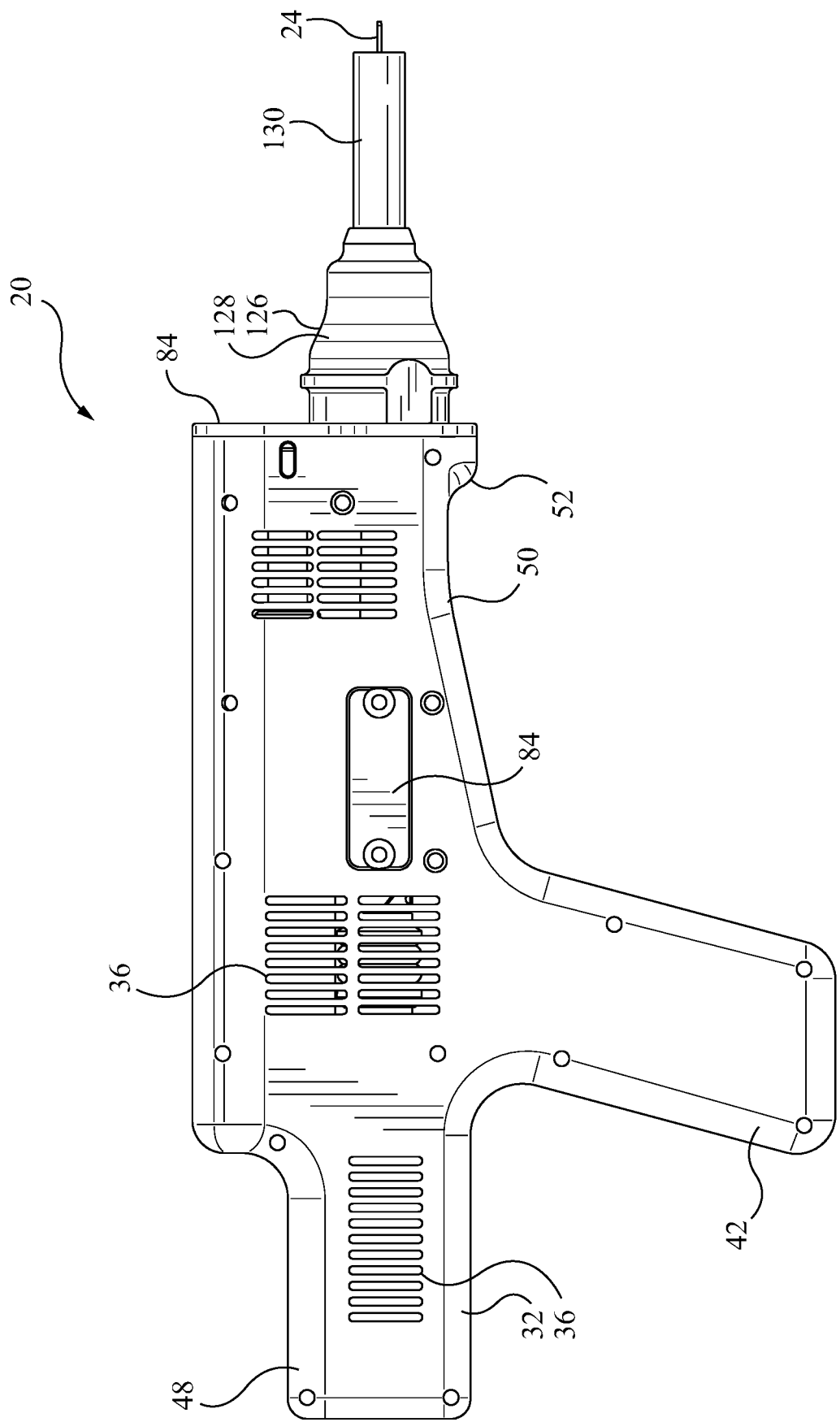
FIG. 3 is a right-hand side view of the apparatus of FIG. 1.

The description that follows, and the embodiments described therein, are provided by way of illustration of an example, or examples, of particular embodiments of the principles of the invention. These examples are provided for the purposes of explanation, and not of limitation, of those principles and of the invention. In the description, like parts are marked throughout the specification and the drawings with the same respective reference numerals. The drawings may be understood to be to scale and in proportion unless otherwise noted. The wording used herein is intended to include both singular and plural where such would be understood, and to include synonyms or analogous terminology to the terminology used, and to include equivalents thereof in English or in any language into which this specification many be translated, without being limited to specific words or phrases.

For the purposes of this description, a Cartesian frame of reference may be employed. In such a frame of reference, the long, or largest, dimension of an object may be considered to extend in the direction of the x-axis, being the longitudinal axis and the main axis of rotation. The height of the object is measured in the z-direction, and the lateral distance from the central vertical plane is measured in the y-direction. Unless noted otherwise, the terms "inside" and "outside", "inwardly" and "outwardly", refer to location or orientation inside the housing of the apparatus. In this specification, the commonly used engineering terms "proud", "flush" and "shy" may be used to denote items that, respectively, protrude beyond an adjacent element, are level with an adjacent element, or do not extend as far as an adjacent element, the terms corresponding conceptually to the conditions of "greater than", "equal to" and "less than". Unless otherwise noted, the assembly shown and described herein may tend to be symmetrical, or largely symmetrical, about the vertical longitudinal central plane. In this specification distinction may be made between materials that are thermal conductors and thermal insulators. In general, the thermal conductors may be thought of as materials such as metals, such as steel, stainless steel, copper sheathing, mild steel flashing, whether galvanized or otherwise, or aluminum sheeting or aluminum extrusions, painted or otherwise. The insulators may be thought of as materials such as wood, particle board, oriented strand board, composites, and plastics, whether fiber reinforced or otherwise.

The embodiments illustrated and described are non-limiting examples of principles of the invention. It is possible to make other embodiments that employ the principles of the invention and that fall within the claims. To the extent that the features of those examples are not mutually exclusive of each other, the features of the various embodiments may be mixed-and-matched, i.e., combined, in such manner as may be appropriate, without having to resort to repetitive description of those features in respect of each possible combination or permutation. The invention is not limited to the specific examples or details given by way of illustration herein, but only by a purposive interpretation of the claims to include equivalents under the doctrine of equivalents.

By way of general overview, a welding apparatus, such as may be identified as an electrode handle apparatus, or simply as a electrode handle, is shown in FIG. 1 as 20. Handle 20 has an electrode holder, indicated generally as 22, in which an electrode 24 is mounted. Electrode 24 has a cylindrical shape, and is relatively long and thin. Electrode 24 may be a semi-conducting material, such as titanium carbide, titanium di-boride, or such other welding rod material, as may be. The outwardly extending tip of electrode 24 is seen positioned toward an object with which electrode 24 is to interact, i.e., that is to be subject to welding.

Considering again handle 20, there is housing, or backshell, or haft, or body, generally indicated as 30. Housing 30 includes first and second portions 32, 34, which may be referred to as first and second, or left hand and right hand backshell or housing halves or housing portions. First and second housing portions 32, 34 are held together by an array of fasteners such as may be in the nature of threaded cap screws 26 spaced thereabout. A gasket 28 may be captured between portions 32, 34, and compressed by the tightening of screws 26. Both backshell halves may have porting in the nature of vents such as inlet vent array 36 and outlet vent array 38, by which air or other gas coolant may be admitted to, and enabled to depart from, the interior of housing 30. The backshell halves may be made of an electrically non-conductive, or electrically insulating, material. The girth of housing 30 may be suitable for being grasped or cradled in the hand of an operator. The general proportions of housing 30 are such that it may have a through dimension in the transverse or y-direction of the order of 2 inches.

As assembled, housing 30 may be generally gun-shaped, i.e., it has a main body or barrel, or longitudinal portion 40, and a predominantly transversely projecting hand grip portion 42. Portion 42 may have a trigger, or activator, or switch 44. Handle 20 has a forward end, or nose, 46 from which the welding electrode protrudes or advances in operation, and a rearward end or butt, or tail 48 that extends rearwardly of grip portion 42. The underside of forward end 46 is somewhat flared or bulbous as at 52, such that a recess 50 is formed rearwardly thereof. In use, the operator may support apparatus 20 with one hand in recess 50, thereby cradling apparatus 20, while the other hand holds grip portion 42 and operates switch 44. Switch 44 may be a variable speed switch, e.g., in which the maximum speed of rotation of the first drive is adjusted by rotation of the switch about its axis, and the on-off function, and the speed of the motor between zero and maximum selected speed is governed by how far the trigger is depressed axially. The desired speed may be set, and the switch is squeezed the full distance to that speed.

Looking at the inside of apparatus 20, each half portion 32, 34 forms a cavity. The halves are molded to define cavities (or two halves of one cavity) in which to receive the controller, circuitry, and rotating elements of handle 20. There is a first rotating assembly 60, and a second rotating assembly 62. Each has a respective axis of rotation, which is, or may be considered to be, or substantially to be, parallel to the long direction of the main body or longitudinal portion 40. The axis of rotation of assembly 62 is transversely offset from, and may conveniently be parallel to, the axis of rotation of assembly 60.

Starting with assembly 60, and proceeding from the rear of the unit to the front, a first drive in the form of a motor 64 is rearmost. The body or housing of motor 64 fits into a pre-formed moulded seat in the backshell or housing, there being a corresponding half-seat in the other housing half. The output shaft of motor 64 extends forwardly to mate with the input of a coupling or clutch 68. Main drive shaft 70 has a first end that engages the output side of clutch 68. Clutch 68 is an insulating coupling that electrically isolates motor 64 from shaft 70. Clutch 68 may also compensate for any misalignment between motor 64 and shaft 70.

Near end bearing 72 and intermediate bearing 74 are provided to carry main shaft 70. Near end bearing 72 is located at, or close to, the clutch-connected end of main shaft 70. Intermediate bearing 74 is located at roughly the half-way, or mid-point, of main shaft 70, such that a first portion 76 of shaft 70 is carried between bearings 72 and 74, and a second portion 78 is cantilevered forwardly away from bearing 74. An electrical power pick-up 80 mounts on shaft 70 near first bearing 72. Power pick-up ring, 80 may typically be made of copper, and is connected to the welding power cable 82. In operation, ring 80 is held stationary. Ring 80 is externally accessible through a slot or port covered by external cover plates 84 located on the outside of housing portions 32 and 34 forward of the rearward set of air vent ports. A slip ring 86 is mounted axially forward of pick-up ring 80. Slip ring 86 may be a carbon-lined slip ring. It bears against main shaft 70 and against pick-up ring 80. In operation it carries electrical current from pick-up ring 80 into shaft 70. The distal, of most forward end of shaft 70 is enlarged at a forward shoulder into a head 88 that has a mating threaded chuck. Chuck 90 and head 88 co-operate to define a seat or accommodation for the inward end of welding rod 24, chuck 90 being releasable to permit replacement of rod 24, and may be tightened to secure rod 24 in place, or to adjust the protruding length of rod 24.

As noted, a second drive in the form of a second rotating assembly 62 is transversely offset from first rotating assembly 60. It includes a motor 100, and isolation coupling 102, a second shaft 104 (i.e., the first shaft being main shaft 70); a pair of near and far bearings 106, 108; an impeller 110; an eccentric weight 112 and an eccentric weight retainer 114. Motor 100 fits in a molded seat in the housing shell. In this instance, it is nested just forward of motor 64, above coupling 68. Shaft 104 is carried in bearings 106, 108, with coupling 102 being located between bearing 106 and motor 100. Shaft 104 is keyed or splined forwardly of bearing 106, for mating with corresponding key or spline fitting of the hub of impeller 110, to be able to impart torque to impeller 110, and thereby to drive impeller 110 to force air to flow through the inlet and outlet vents or ports to permit cooling of the elements inside the housing. Impeller 110 is held axially in place by a transverse roll pin or grub screw. Bearing 108 is spaced axially forward of impeller 110, and is located between a pair of circlips.

The second drive is an oscillator used to provide a vibrational forcing function to apparatus. To that end, an imbalance, in the form of eccentric weight 112 is mounted forward of bearing 108, and is held in place by removable retainer 114. Eccentric weight 112 may therefore be removed and replaced or adjusted to provide a different imbalance, as may suit. Although a rotational eccentric weight is shown, a linearly reciprocating element could also be used. It does not matter that shaft 100 be precisely parallel to shaft 70, although it is convenient for making a compact design. Shaft 100 merely needs to be such that rotation of eccentric weight 112 results in a forcing function having a varying component of force in a transverse direction relative to shaft 64, such as to cause oscillation therein (and, ultimately, at the tip of welding rod 24).

At the front end or nose of apparatus 20 there is a closure member or closure plate 118, that permits access to the inside of handle 20 without having to take the two backshell halves apart. This access permits adjustment of eccentric weight 112. Plate 118 may also have a gas manifold fitting or conduit 120 which is connected to the inert gas supply line 122 on the inside, and which delivers that gas forwardly at the forward facing outlet or shielding gas port. Cover plate 118 also provides the seat for a guide bearing and gas seal 124 that seat about the outside of the radially outwardly facing external shoulder of head 88.

A gas shield 126 is mounted on the outside or forward face of cover plate 118. Gas shield 126 has a broad or somewhat bulbous of bell-shaped cowling 128 that has a large end that mounts about gas seal 124, and a smaller forward end that carries a tip member 130. Tip member 130 has the form of a ceramic tube such as may be suitable for exposure to high temperature materials, e.g., splatter from ESD welding. When gas shield 126 is in place, shielding gas conveyed by line 122 is carried through plate 118 and discharged into the shielded chamber or duct, or passageway, or curtain, defined within cowling 128 and tip member 130, thereby to bathe the electrode in inert shielding gas.

At the connected end, housing 30 has three input connections, the third input being an inert gas supply line 122. The first input is an electrode power connection, which may be an AC or DC power connection, indicated as 132, and which may, ultimately, be connected to an ESD power source—the same power source of which the opposite pole is connected to the work piece upon which electrode 24 is to be applied. The power source may be indicated generically as a power supply, discussed below. The second input is a motor power source 134 for operation of electric motors 64 and 100 within housing 30, in the form of a power cable which may be 120V AC 60 Hz, or 220 V AC 50 Hz, or a 12V DC source, or such other source as may be, and could be a pneumatic source. In the embodiment shown, it may be a 24 V DC source, and motor 64 may be a 24 V DC Pittman variable speed motor having forward and reverse directions controllable by the On-Off switch. Motor 64 may be termed a low speed brush DC motor. It may have an operating speed range of 0 to 1800 r.p.m. In one application it has a rotational speed of about 300 r.p.m., which would generally be considered a relatively slow speed. Motor 100 may be an high speed DC, brushless DC or variable frequency AC, variable speed servo motor. Ability to adjust speed and imbalance of the eccentric may permit the operator to choose a setting suited to the materials to be welded and to be applied. It may have an operating speed range up to 3000 r.p.m., and may typically be run in the range of 500 to 1500 r.p.m. About 1000 r.p.m. is a speed that has been used.

FIGS. 8a and 8b show alternate embodiments of main shaft 70. In FIG. 8a, main shaft 70 is substantially cylindrical from coupling 68 to the rearward face of the shoulder of head 88. By contrast, in the alternate embodiment of FIG. 8b, main shaft 140 is tapered to narrow in section longitudinally forward of the mid-pint bearing, thus making shaft 140 somewhat less stiff than shaft 70.

The main power cable, namely that of electrode power connection 132, is secured at a terminal lug inside housing 30. The shielding gas conduit 122 may have the form of a hollow pipe that is formed to run along the inside proximal margin of housing 30. Coolant conduit 122 may be used to conduct an inert gas, such as argon, to electrode rod 24, and may be used for the alternate purpose of providing an inert gas shielding to the coating process. Conduit 122 may be made of a non-electrically conductive material such as a plastic tube. That portion of conduit 122 lying within housing 30 may be made of a metal, such as copper, aluminum, stainless steel, mild steel, or such other metal as may be suitable.

As noted, also enclosed within housing 30 is a vibration assembly, or an oscillator, or shaker, or motion exciter, namely assembly 62. The resultant vibration has an amplitude having a component in the transverse direction of electrode rod 24. In use, an operator grasps housing 32, and uses electrode 24 much like a pencil to paint or coat the workpiece object—provided one is accustomed to painting or writing while the pencil is oscillating. Of course, the pencil has two degrees of motion imposed upon it, namely rotation about the axis of the rod (by motor 64) and transverse deflection (by motor 100 and eccentric weight 118). The rotation of eccentric 118 causes apparatus 20 to vibrate, which, in turn, causes electrode 24 rapidly and repeatedly to make and break contact with the work piece. With each oscillation there is a new spark and deposition of the material of electrode rod 24 onto the workpiece.

Vibration assembly 62 provides a forcing function input to the drive transmission of rod 26, namely assembly 100, transmitting an input impulse, or wave-train of impulses. The force and displacement transmissibility of that transmission of the mechanical motion of the forcing function input to electrode 24 is dependent upon the natural frequency of the vibrational degree of freedom of interest. Although the axis of the cylindrical rod of electrode 24 is shown as being parallel to the long axis of apparatus 20, this need not necessarily be so. In another embodiment, electrode 24 may have the form of a rod having an axis at least partially transverse to the main body of housing 30.

The apparatus shown and described herein may be employed for processes that may be termed "Low Energy Welding". That is, where there may be 1 kJ of energy used in the heating of a resistance spot weld, in an intermittent electrical discharge weld the amount of energy used in heating at each contact of the electrode to the workpiece may be of the order of 1 Joule. The heating has very short time duration, is highly localised, and results in the deposition of only a very small amount of material. While the welding is true welding in terms of the fusion of materials through melting, the small energy input may tend to reduce or substantially eliminate any heat affected zone.

The handle apparatus drives the consumable electrode 24 to vibrate in a first degree of freedom of motion relative to the metallic surface being coated or treated in the process. The force or displacement is generated by attaching an eccentric circular metal load to a spinning motor. The positioning of the eccentric weight determines the pounding or contact force when the contacts are made. The frequency of vibration is controlled with the speed of the motor to which the eccentric weight is mounted. The longitudinal movement of the consumable electrode in a direction that includes a component of motion, and usually a predominant component of motion, normal to the surface to be treated, allows the periodic contacts to be made with the metallic surface of the workpiece. This occurs while that workpiece surface is being driven in a second degree of freedom of motion. The combination of motions, and the vibration-driven urge to make and break contact, may result in a relatively stable or consistent sequence of electro-sparks (when the contacts open) and depositions of coating material (when the open contacts approach) that take place in the process. The vibrating motion is, or may include, motion normal to the surface being coated.

It is known to use an ultrasonic horn to impose vibration on a welding rod. Here, however, an apparatus is provided that may provide secondary vibration (i.e., the first or primary motion forcing function is rotation about the axis, caused by motor 64; the second forcing function is due to motor 100 and eccentric 118), without using an ultrasonic vibration source. A variable speed motor and weight combination may tend to be a relatively low cost and robust approach to this issue.

Figure 4:
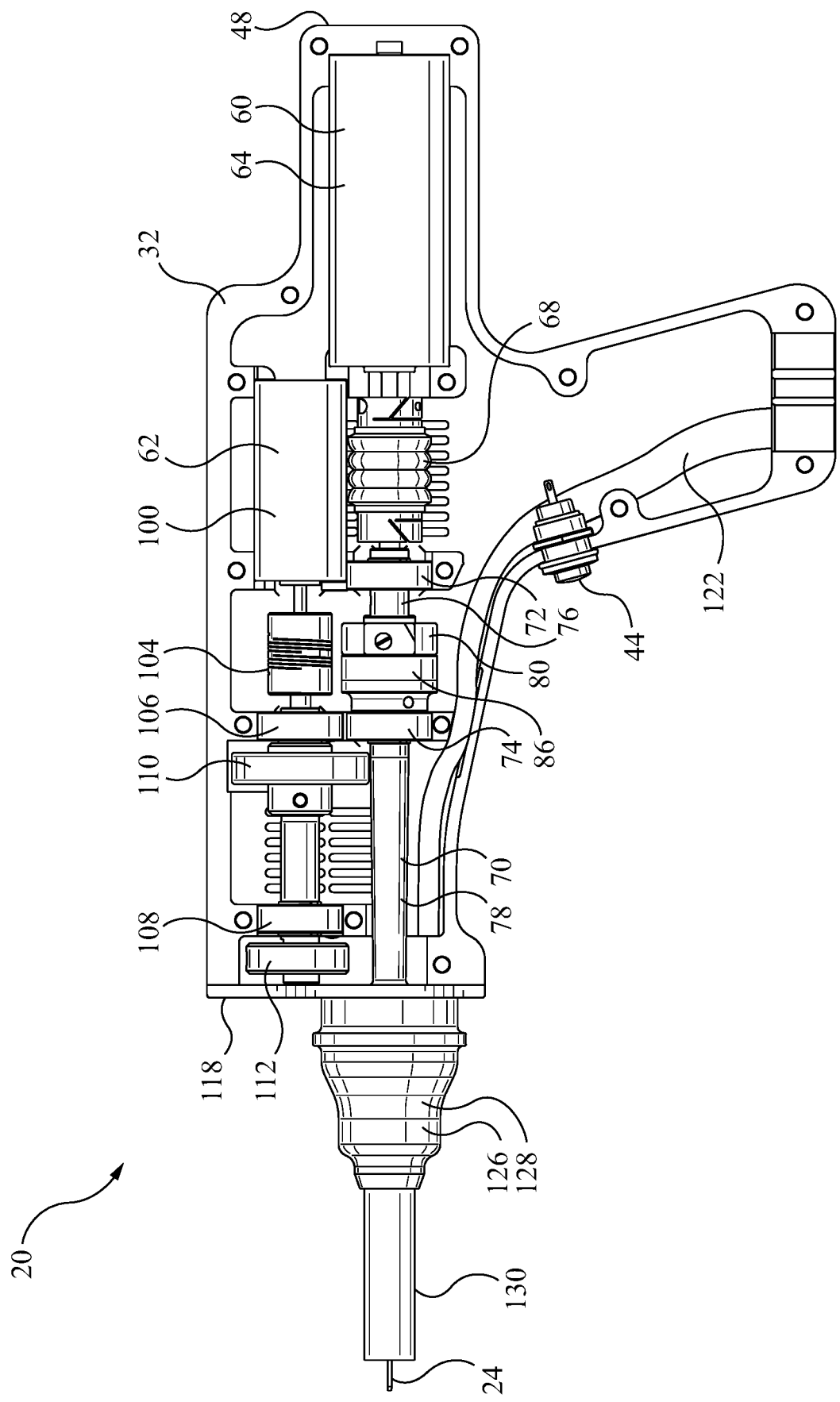
FIG. 4 is a left-hand side view of the apparatus of FIG. 1 with near-side exterior shell removed to reveal internal details.
Figure 7:
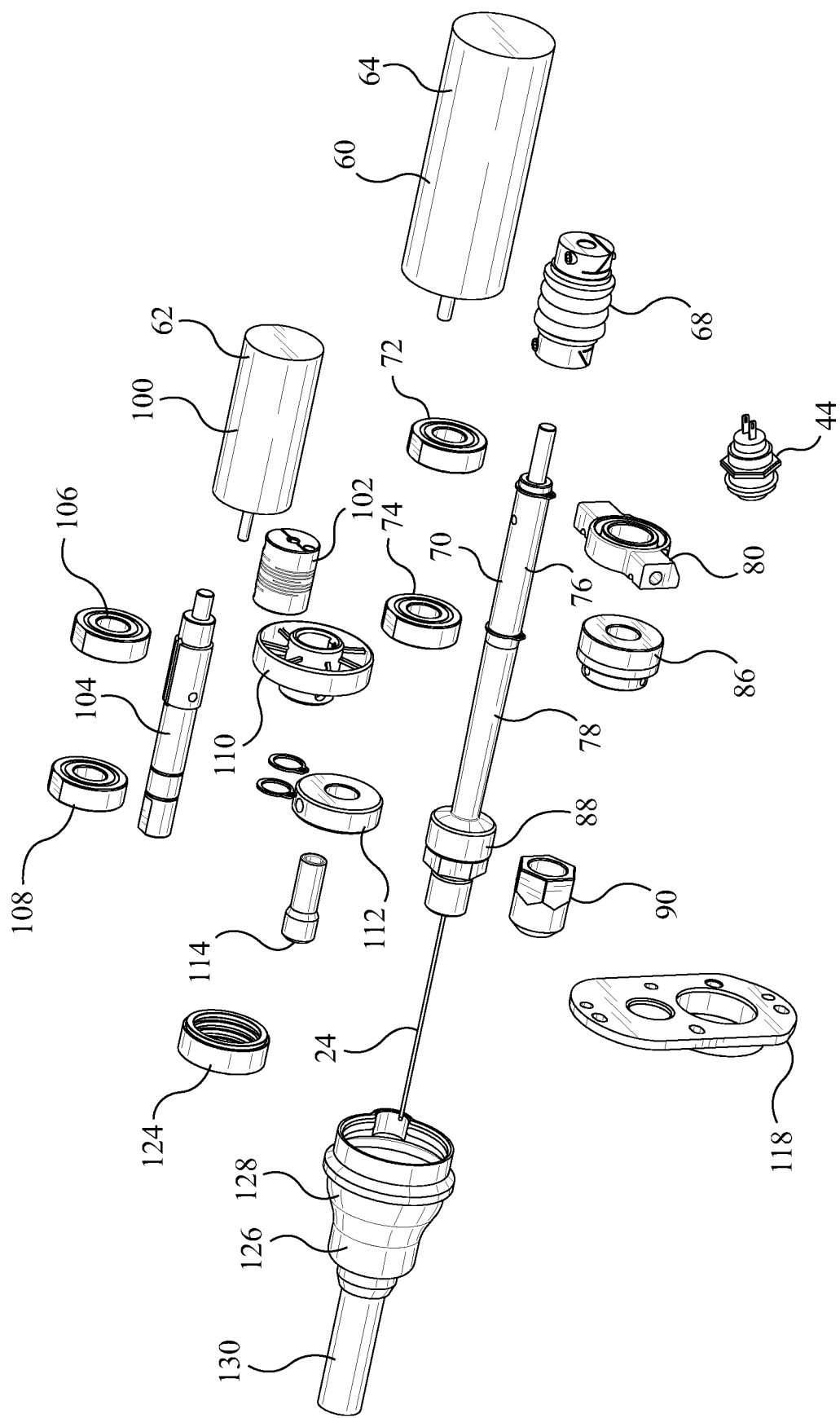
FIG. 7 shows an exploded view of the rotating elements of the apparatus of FIG. 1.
Figure 9A:
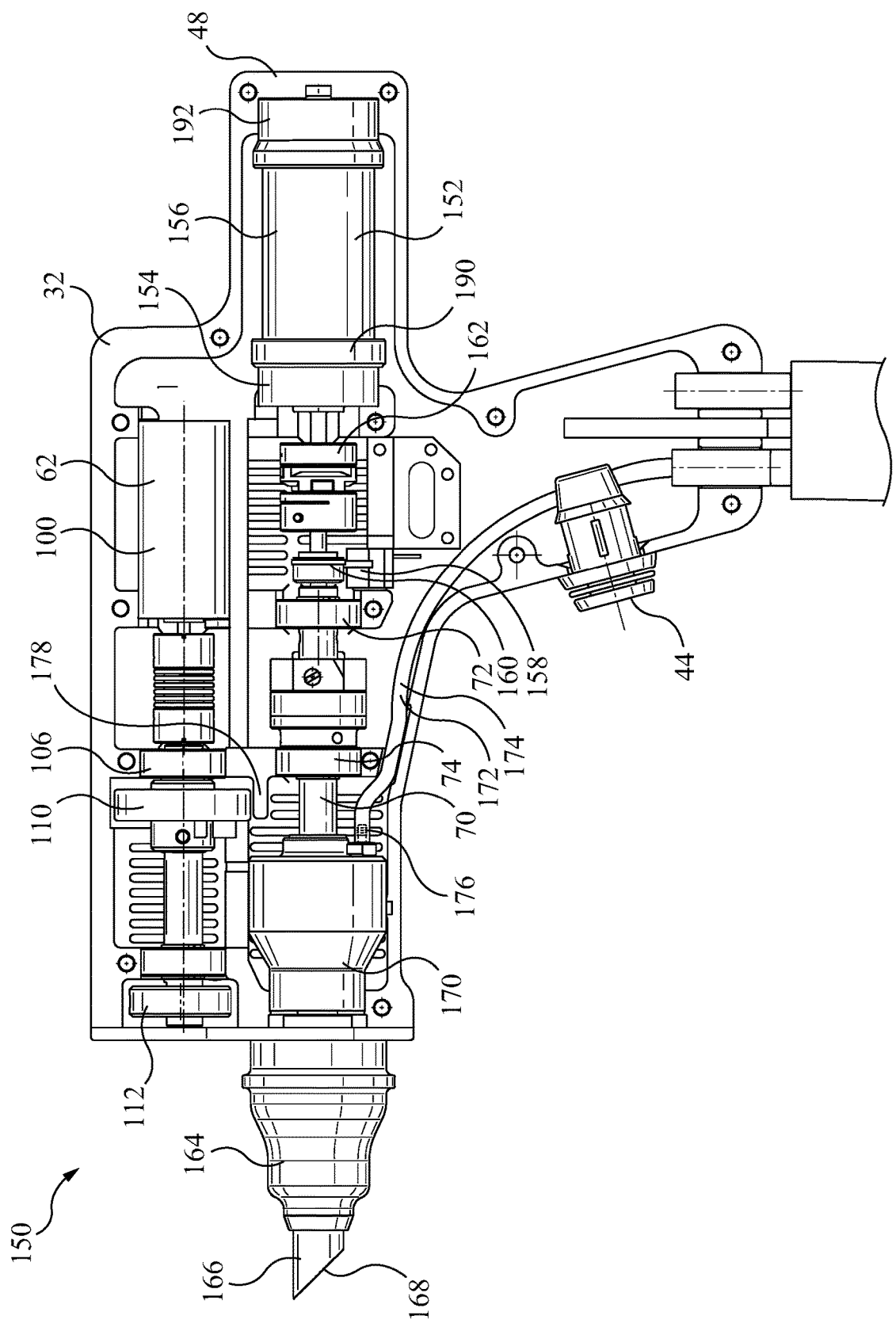
FIG. 9a shows a section of an alternate embodiment of welding apparatus to that of FIG. 4, with near-side housing shell removed.
Figure 9B:
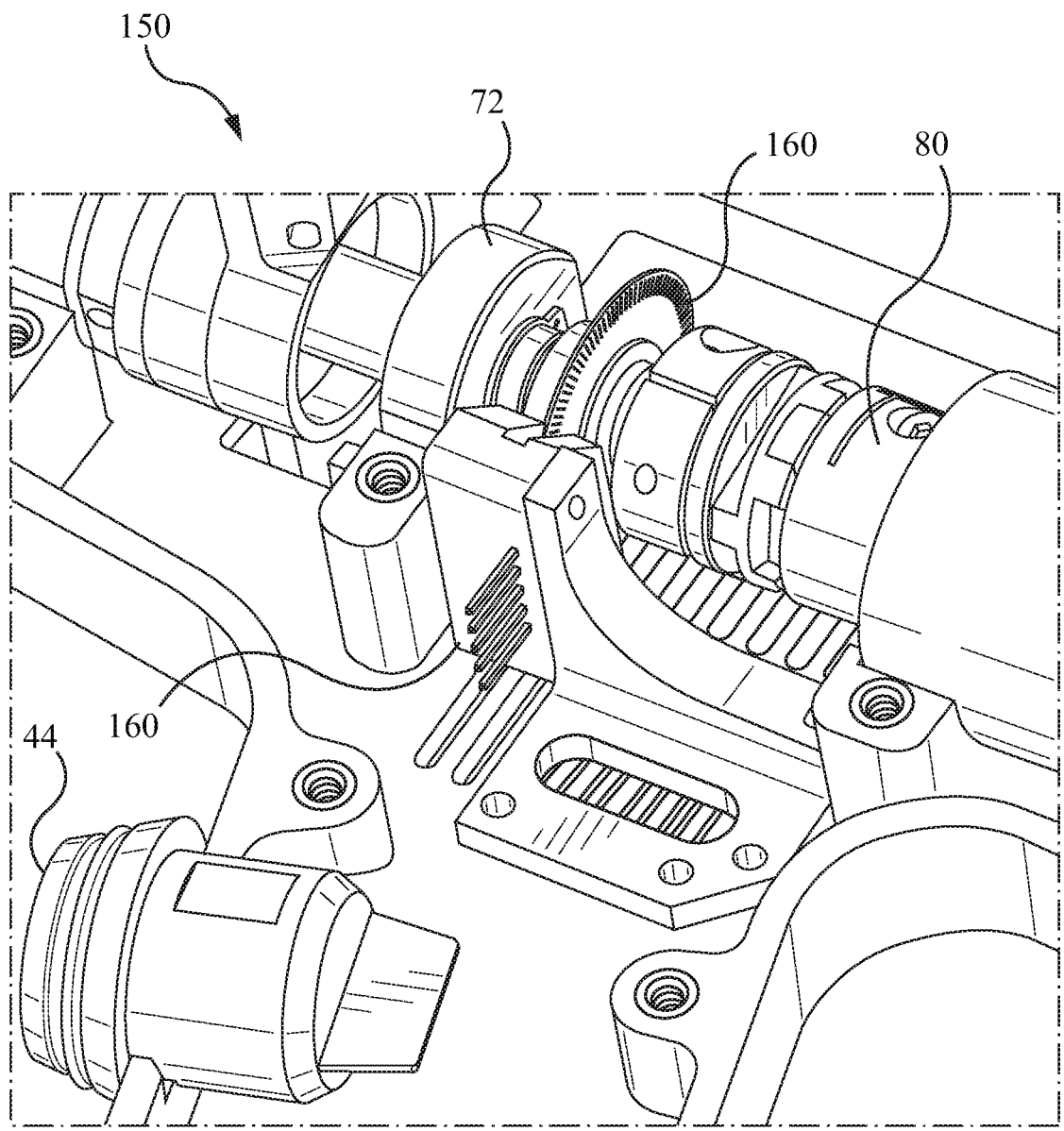

In FIGS. 9a and 9b there is a welding apparatus 150 that is substantially similar to that of FIG. 4. However, in addition to the features of apparatus 20, welding apparatus 150 has a first drive 152 that includes a speed reducer, in this case a gear reducer, 154, mounted at the front end of motor 156 to drop down the output rotational speed. Further, apparatus 150 includes a feedback control apparatus 158 that includes a digital encoder 160 mounted to observe shaft speed. Encoder 160 is mounted between coupling 162 and near end bearing 72. In this embodiment, it may be noted that the inert gas delivery cowling 164 gives onto an output duct or tube 166 that has a mitred end 168 rather than a square cut end.

When the welding rod is depositing material on the work surface, the material at the tip is heated to a molten state. The deposited material cools rapidly. There may be a tendency for the tip of the rod to stick and jump. This may tend also to cause variation in the rotational speed of the welding rod between substantially instantaneous high load no-load conditions. The use of a feedback function may permit the variation of rotational speed to tend to be reduced. The clock pulse frequency of the digital sensor and encoder may be very where the frequency of events it is polling is much lower, i.e., of the order of Hz. The frequency of rotation of the rod may be of the order of 300 rpm, i.e., 5 Hz.

In another feature, liquid cooling is provided to electrode holder 22, in the form of a liquid cooling jacket 170, supplied from supply and return lines 172, 174 attached at corresponding supply and return fittings 176. The provision of a liquid coolant system in this way may permit more consistent control of electrode rod temperature during operation.

In this embodiment, apparatus 150 may also include an impeller 110. The housing has a shroud 178 to discourage output air from impeller 110 from recirculating back into the input, such that flow may start by being drawn in at the vents or ports in the housing on one side of the impeller and be pushed out the vents or ports on the other side.

Figure 10A:
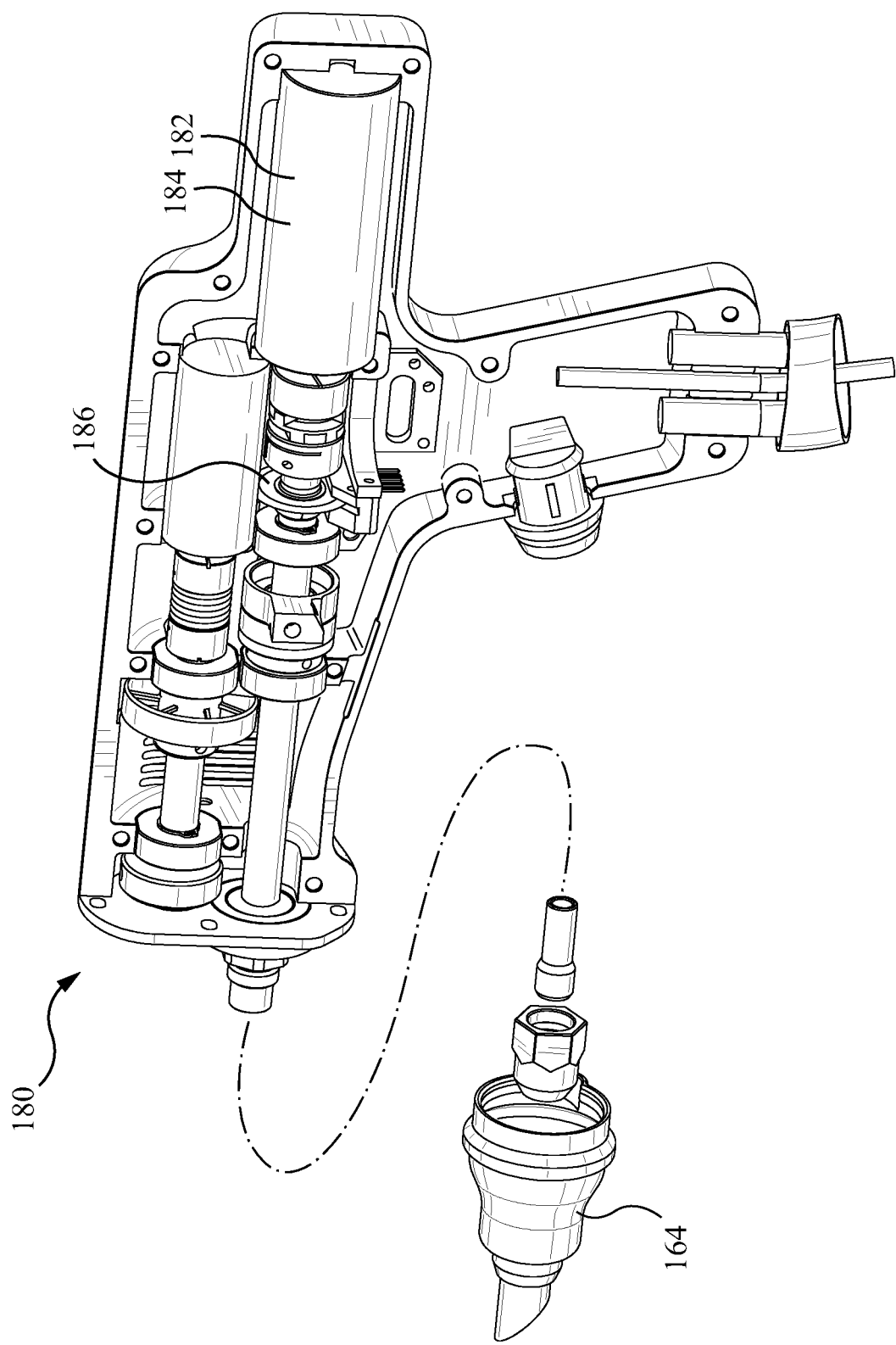
FIG. 10a is a perspective view of a further alternative embodiment of welding apparatus to that of FIG. 9a, with near-side half-shell cover removed.
Figure 10B:
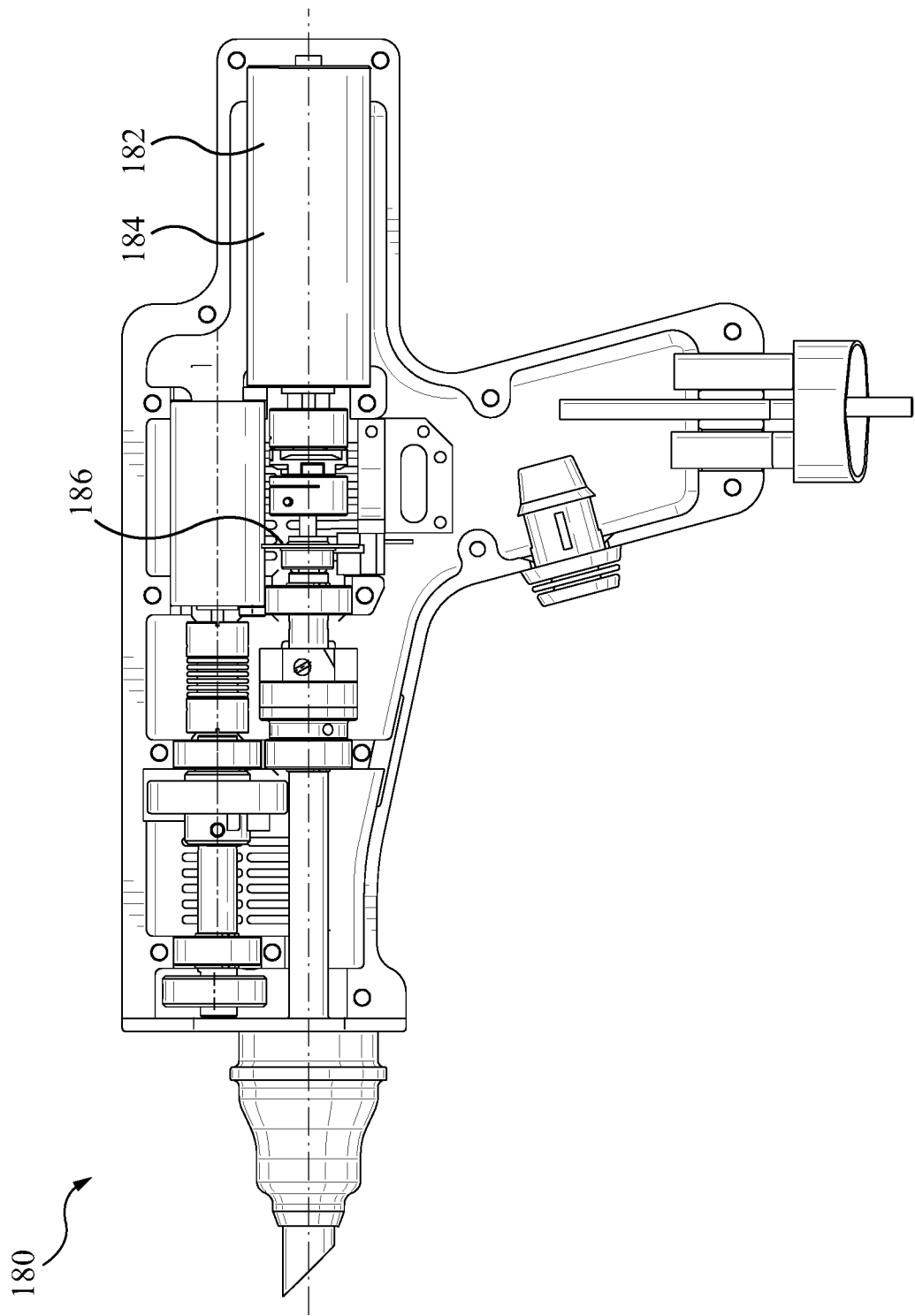

Some embodiments may not have all of the features of FIGS. 9a and 9b. By way of example, in FIGS. 10a and 10b, welding apparatus 180 is substantially the same as, or similar to, welding apparatus 150, except that it does not employ a liquid cooling manifold, or liquid cooling jacket, and the motor 184 of the first drive 182 does not have a gear reducer. It does, however, have an output shaft speed feedback control system that includes a digital encoder as at 186 that is used to govern the variable speed motor 184.

Figure 11A:
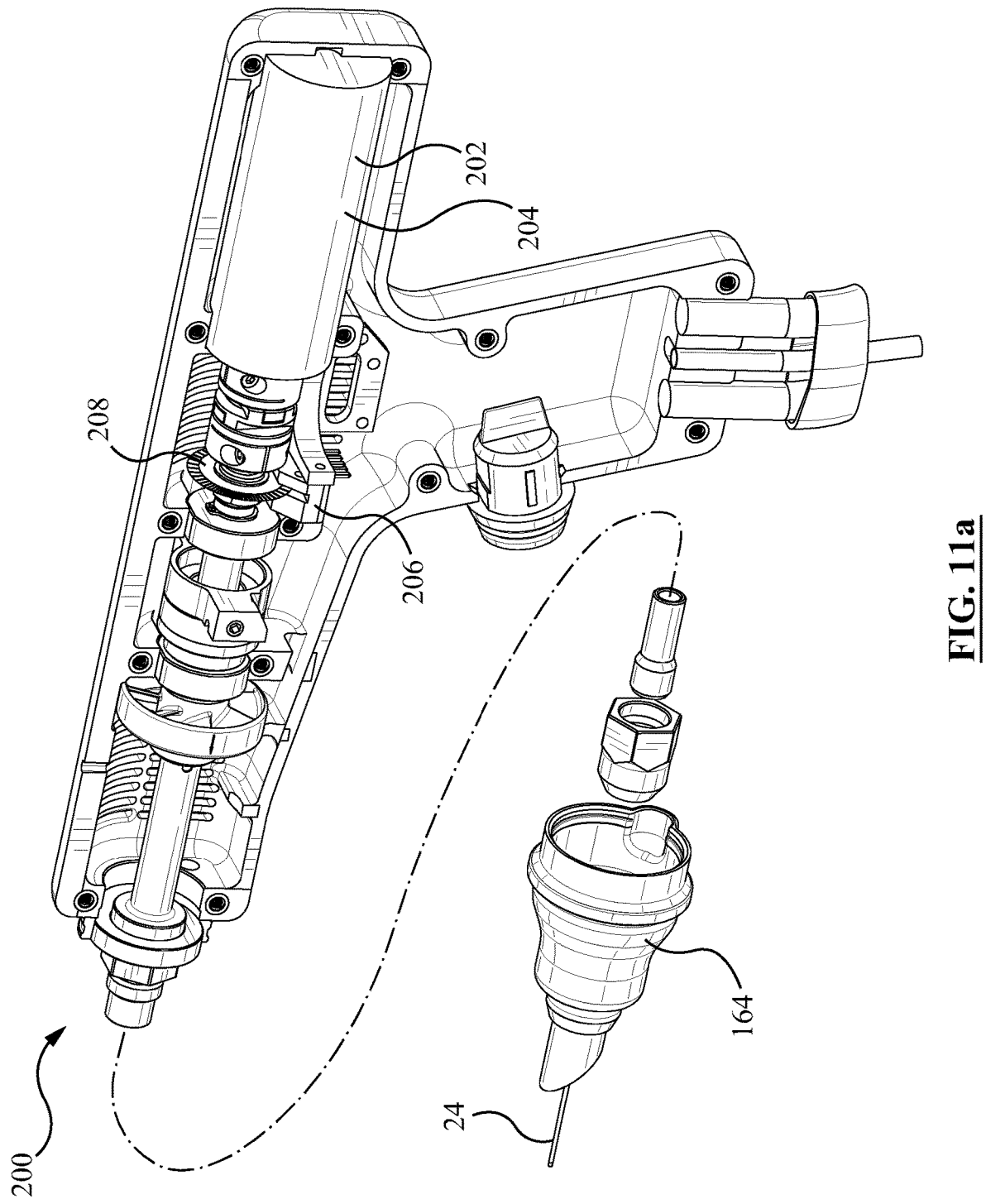
Figure 11B:
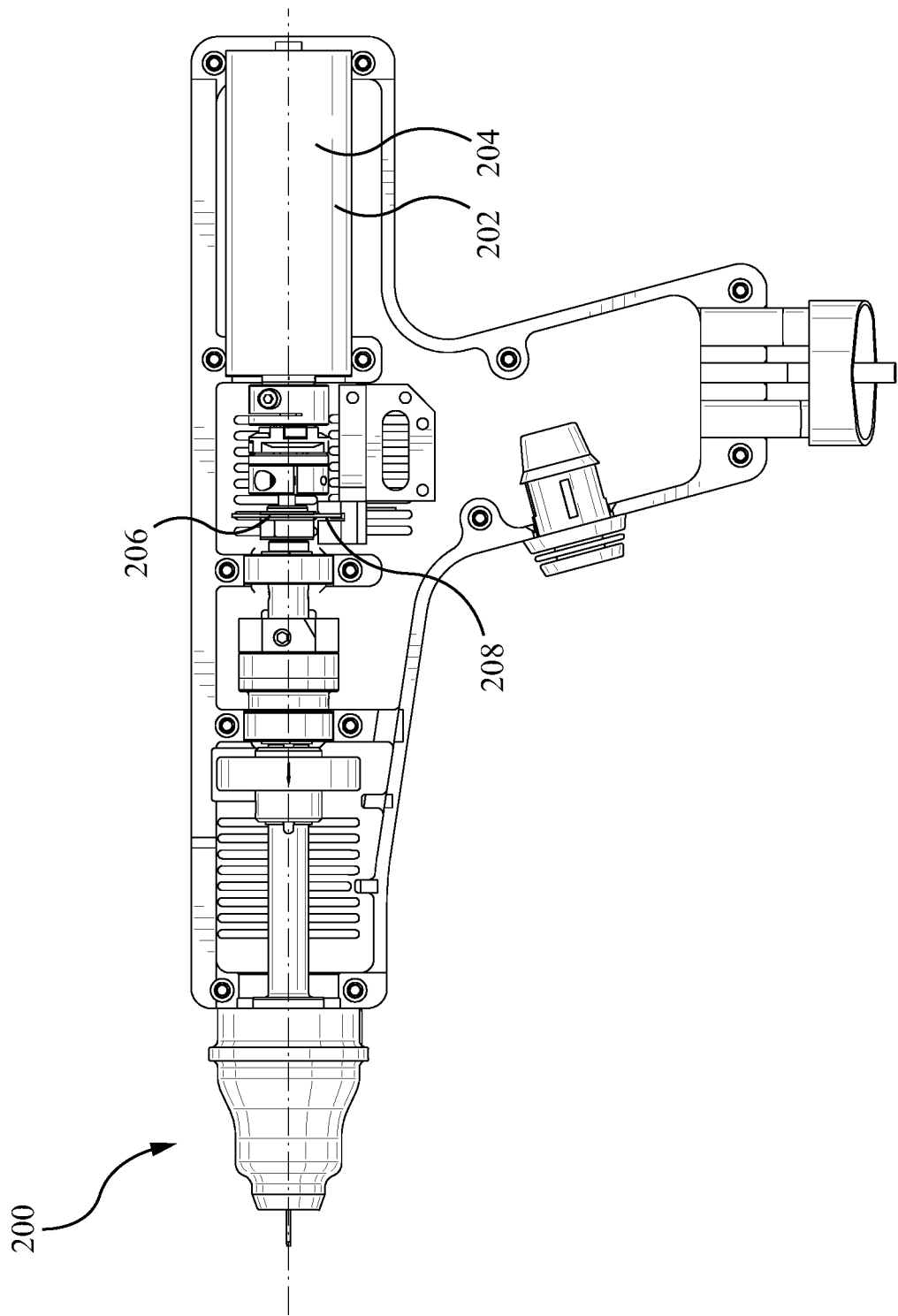
Figure 12A:
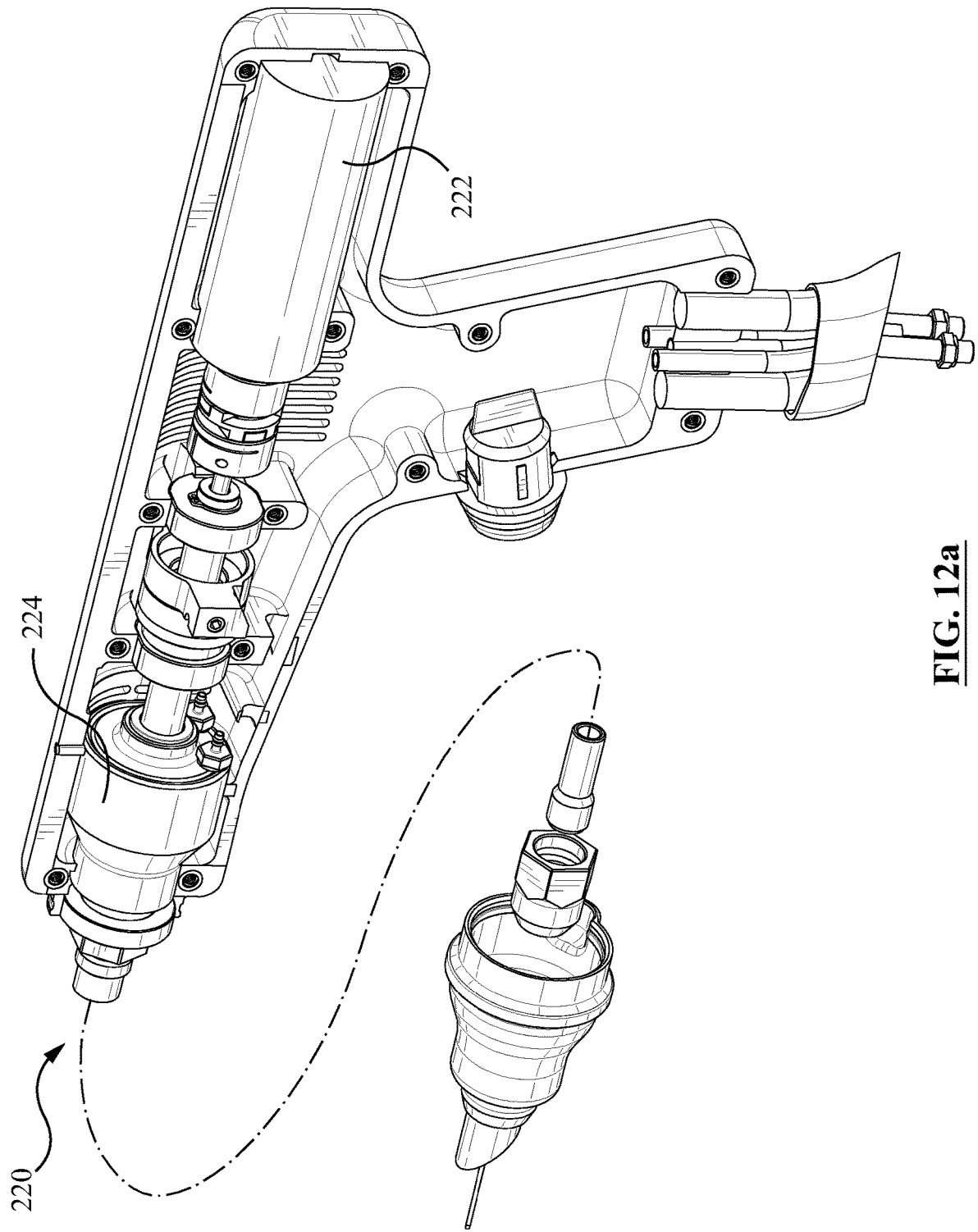
Figure 12B:
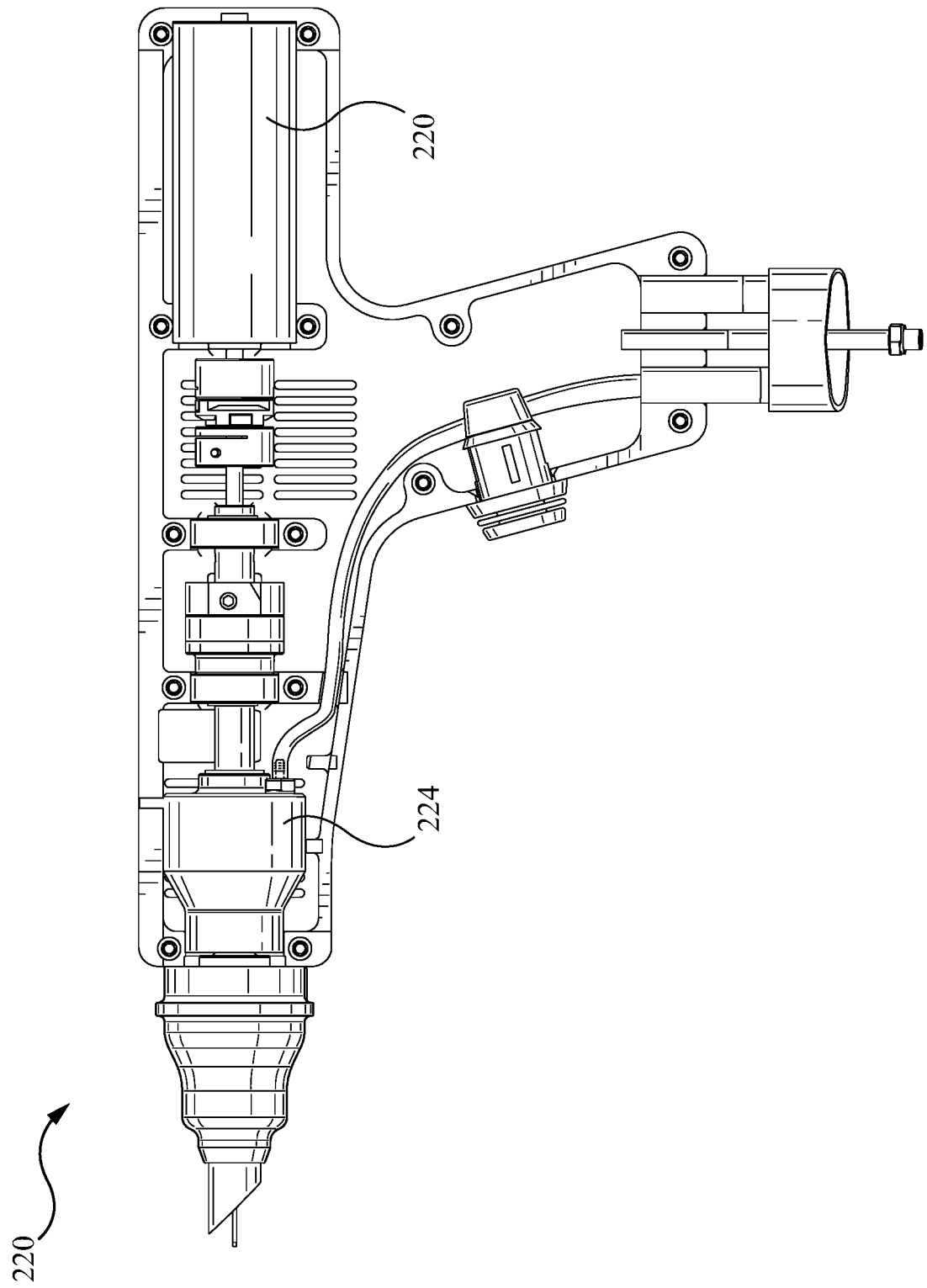
Figure 13A:
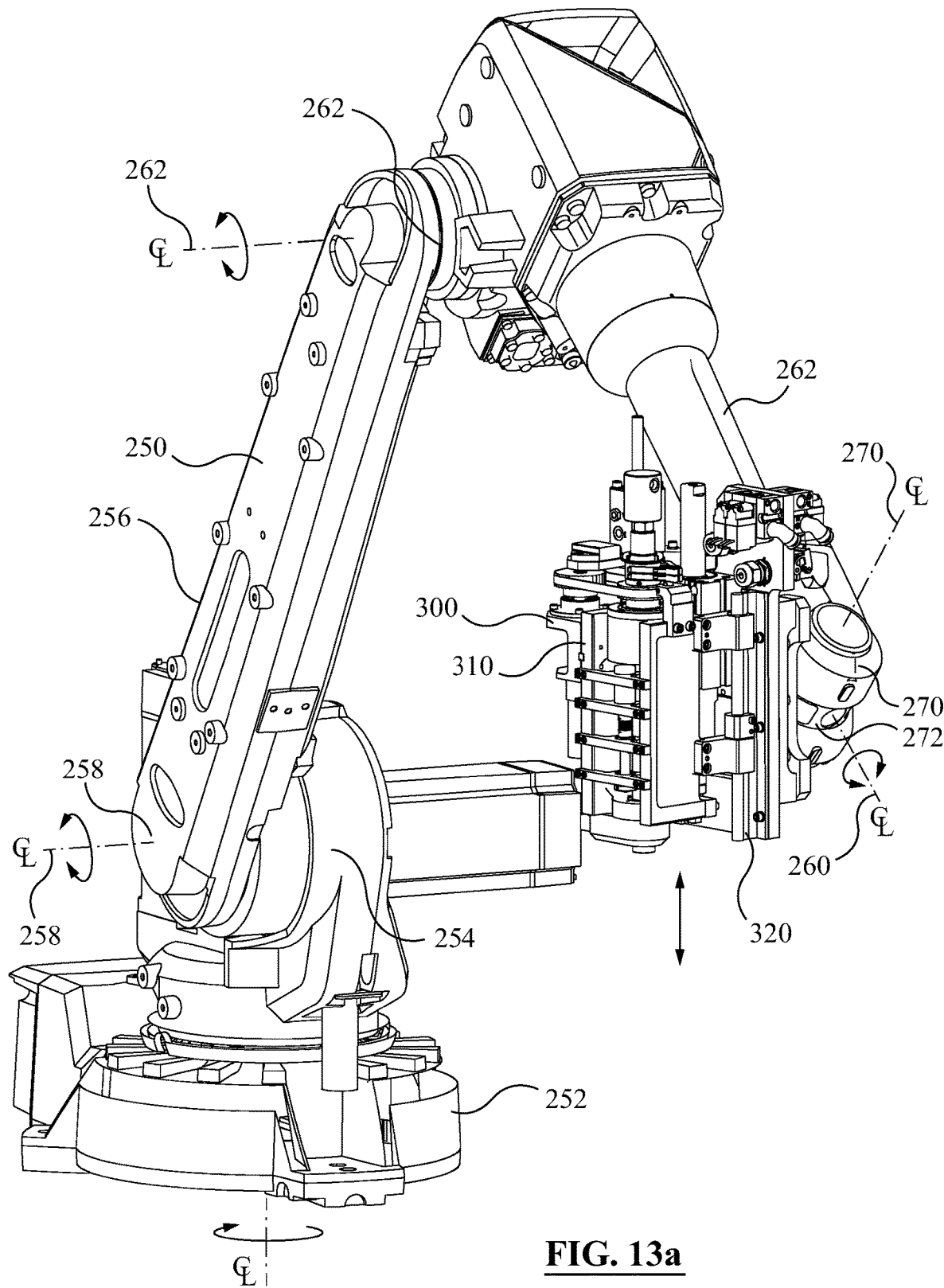
FIG. 13a shows a perspective view of an alternate embodiment of coating apparatus to that of FIG. 1a mounted on a multi-axis robot.
Figure 13B:
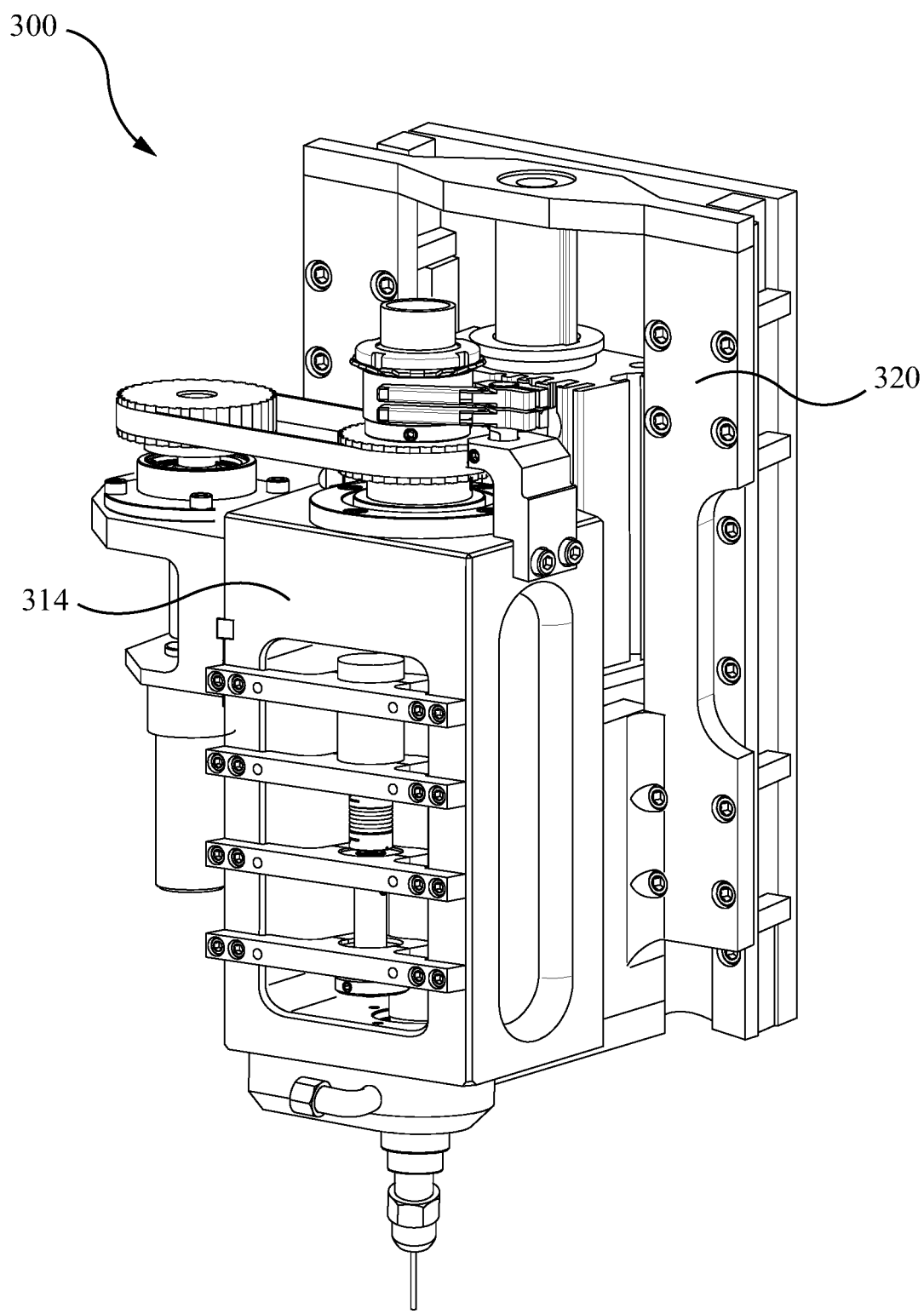
FIG. 13b shows a perspective view of the alternate welding or coating apparatus of FIG. 13a, apart from the robot.
Figure 14A:
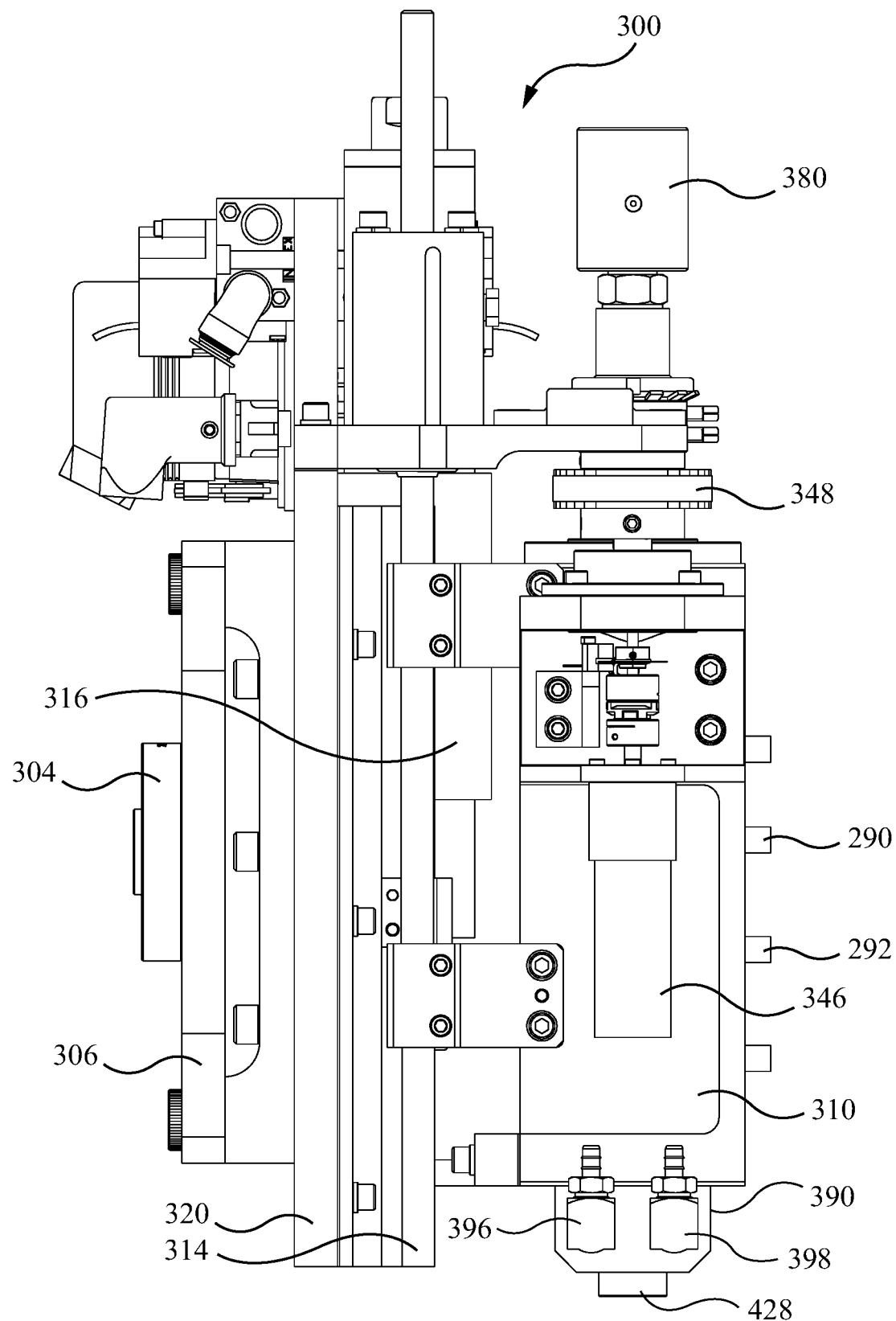
Figure 14B:
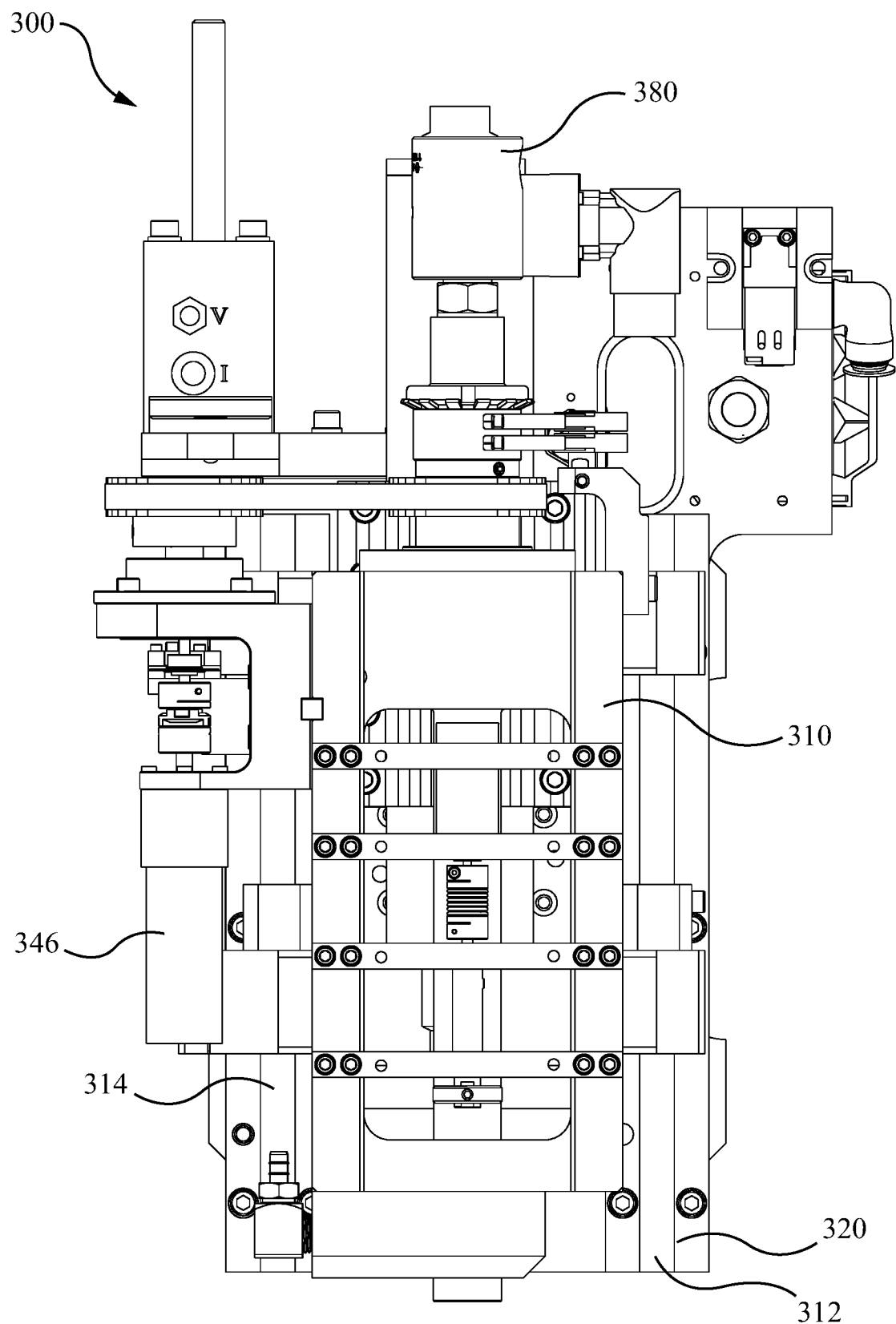
Figure 14C:
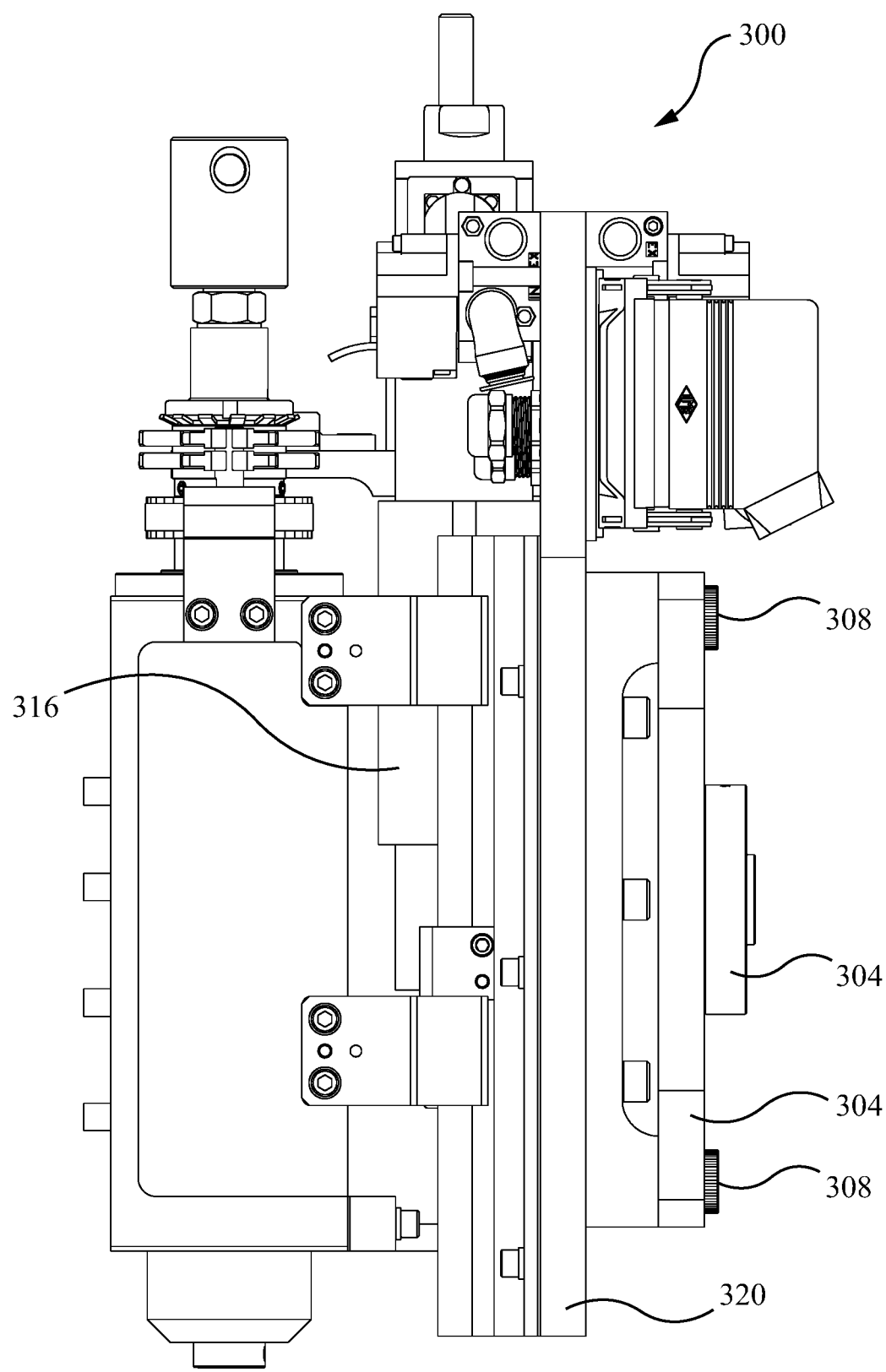
Figure 14D:
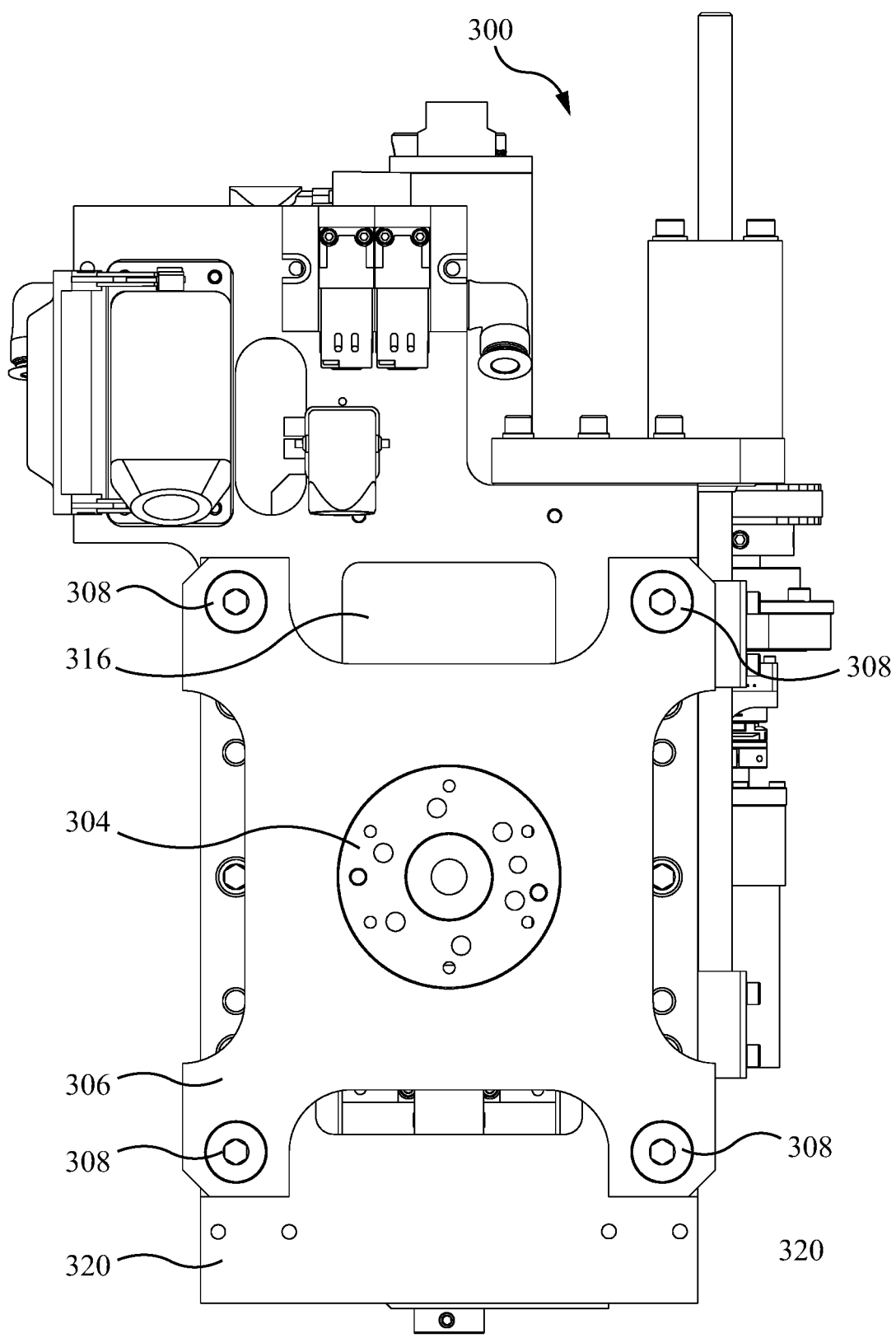
Figure 14E:
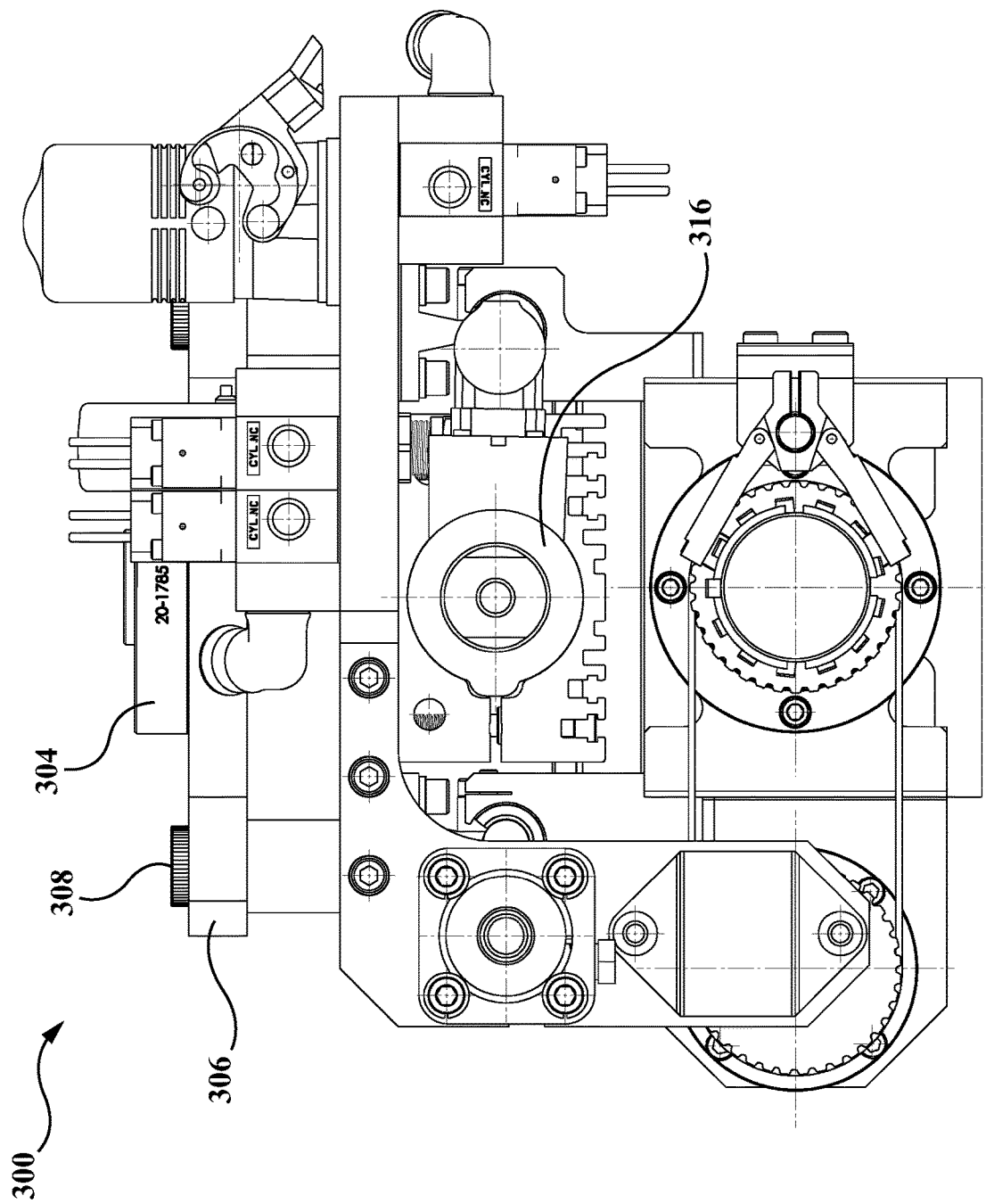
Figure 14F:
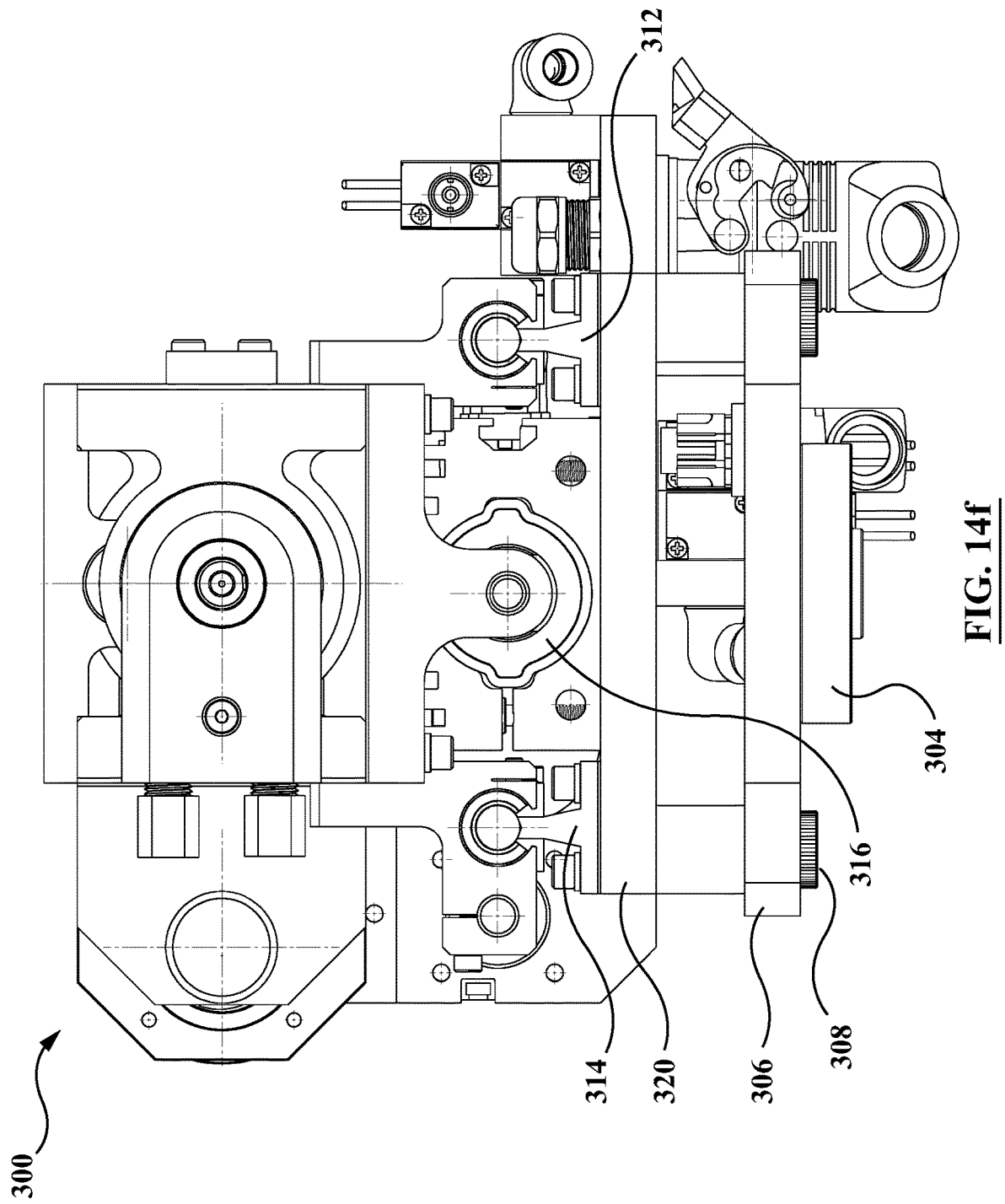

Similarly, In FIGS. 11a and 11b there is a simpler embodiment of welding apparatus 200 that has a first drive 202 including a variable speed motor 204, but does not have a second drive, i.e., there is no rotating oscillator. Apparatus 200 does, however, have an output feedback control 206 that includes digital encoder 208 that is used to maintain a relatively smooth output speed of rotation of the welding rod. In the further alternate embodiment of FIGS. 12a and 12b, there is a welding apparatus 220 that has a first drive 222 that has a liquid cooling jacket 224 to cool the electrode holder, as described above. The embodiments of FIGS. 10a and 10b, 11a and 11b, and 12a and 12b are intended to show that the various features may be employed alone or in combination.

The first drive may have an AC or a DC motor. In one embodiment it may be a 12 VDC Pittman Brush Motor with a no-load speed of 6500 rpm and a low speed of 500 rpm. Another embodiment of this motor may have a no-load speed of 6200 rpm, and a low speed of 300 rpm. It may be a brushless DC motor. It may be a 12 VDC servo motor with a speed range of 200-827 rpm; it may be a 24 VDC servo motor with a speed range of 500-1481 rpm. In still another embodiment, the first drive motor may be a DC servo motor having a no load speed of 7200 rpm and a low speed of 2200 rpm. That motor may have a gear reducer on the output side. As the various motors are, or may be, of different sizes, adapters 190, 192 may be used at one or both of the front and rear end to fit the motor into the mounting cavity defined in the molded housing, thereby permitting any of the motor embodiments to be used depending on, e.g., cost and availability. There may be a feed-back control system that includes a digital sensor, or digital encoder, mounted to observe output shaft speed. Inferentially, the monitoring of motor current, which may also be controlled, may typically also be a measure of output shaft torque. Output shaft torque may tend to fluctuate, e.g., when rod contact with the workpiece is broken, or when the rod starts to stick. The second drive, i.e., of the oscillator, may also be either an AC drive or a DC drive.

In the embodiments of FIGS. 13a through 20d, there is an automated low energy welding (LEW) applicator unit identified as a welding or coating apparatus 300. It interfaces with, i.e., mounts on and operates in cooperation with, a robot 250 and its power supply. The apparatus automatically applies LEW coatings and repairs and welds as programmed. That is, the robot is programmed to present the coating apparatus to a workpiece according to a pre-programmed path, where the path may follow the surface of the workpiece, whether that surface is flat or has a curvature. It may follow a particular path, as where the operation is to lay down a particular configuration of welding material, whether to follow a crack or defect in making a repair, or in building up a low energy weld of several passes, and so on.

Robot 250 is a multiple degree of freedom robot, such as may be purchased commercially, as, for example, from ABB. In the example, the robot has a base 252 such as may be mounted to stationary structure (e.g., a concrete floor, or other suitable pedestal), as may be. The workpiece is then positioned in a known location relative to robot 250. Robot 250 may include a laser sensing system to establish the relative location of the workpiece. The workpiece may itself be mounted on a pedestal or bed and may be stationary. Alternatively, the workpiece may be moving, as along an assembly line, whether continuously or intermittently, according to either a pre-determined path, or according to a path that can be sensed by the robot such that the relative position, orientation, and motion of the workpiece are known in the sense of the robot having the ability to correlate the path of tool operation to the workpiece. For ease of explanation, the workpiece is stationary during welding or coating, unless otherwise noted.

Robot 250 has a first degree of freedom, namely freedom of rotation about the vertical axis between the robot first member, or shoulder 254 and base 252. Robot 250 has a second degree of freedom of motion, namely angular rotation of upper arm 256 about the shoulder joint 258. Robot 250 has a third degree of freedom of motion, namely angular rotation of the forearm 260 relative to upper arm 256 about elbow joint 262. Elbow joint 262 may have an axis parallel to the pivot axis of shoulder joint 258. As such, motion of upper arm 256 and forearm 260 can place wrist 270 in a wide selection of positions in the radially extending plane perpendicular to the shoulder joint and elbow joint axes. Forearm 260 may have a further rotational degree of freedom about its long axis. Wrist 270 has a hand, or finger, or knuckle that has a further rotational degree of freedom about the pivot axis of wrist joint 272. Apparatus 300 has a mounting interface, or base, or plate 304 that mounts to a knuckle of robot 250, the knuckle being carried on a spindle extending from wrist 270. That knuckle may also have a rotational degree of freedom about its own longitudinal spindle axis such that plate 304 may be rotated. Plate 304 itself is mounted to a resilient intermediate member, or resilient suspension member 306. These multiple degrees of freedom permit the welding head, i.e., apparatus 300, to be oriented in a wide variety of locations and orientations to engage the workpiece.

Apparatus 300 has a head or carriage 310 that mounts on a base, or slide, or slides 320. The base, or slide, or slides 320 are mounted to the resilient intermediate member, or suspension member, 306. Resilient suspension member 306 may include springs or springs and dampers. In one embodiment it may have the form of a substantially stiff polymeric plate, which may be made of a Nylon™ or UHMW polymer. In other embodiments member 306 may be made of a metal, such as steel, and may be electrically insulated from the body of robot 250. While apparently rigid, such a plate is not rigid in the manner of a thick steel plate, and, being polymeric, has much higher anelasticity. It is, by the nature of the material, a damper or moderator of high frequency vibration. The plate is substantially rectangular, or, rather, has a substantially rectangular mounting fitting connection footprint at which the slide or slides, or base 320 is attached, e.g., on the front side of resilient support member 306. Resilient support member 306 also has a fastener footprint corresponding to the fastener footprint of mounting face plate 304, which, in this case, may be a circular mounting place of a diameter falling within the rectangular shape of resilient suspension member 306. As shown plate 304 has a diameter that is about half the width of the generally rectangular, or four-cornered shape of resilient suspension member 306. The fastener fittings at the corners of the plate, identified at 308 may be provided with resilient bushings or gaskets. Suspension member 306 may be non-electrically conductive. Suspension member 306 may tend to attenuate relatively high frequency vibration, such that vibration in apparatus 300 may tend to be isolated to some extent from robot 250. Apparatus 300 is connected through resilient suspension member 306 and mounting plate 304. When mounting plate 304 is installed on the spindle emanating from wrist 370, slides 320 travel with, and have their position, motion, and orientation dictated by the position of wrist 370.

Carriage 310 is mounted on guideways, slides, or rails 312, 314 so that it has a degree of freedom of motion, in this instance in linear translation, along those guideways. In the orientation shown in FIG. 13*a*, this would yield motion in vertical translation. Clearly, the direction of motion, whether vertical, horizontal, lateral, or some combination of components thereof, will be dictated by the orientation of wrist 270, and is variable according to the programming of robot 250. Apparatus 300 includes a drive 316 that causes carriage 310 to move along rails 312, 314. Drive 316 may be a screw drive, e.g., an Acme screw, or it may be a pneumatic or hydraulic drive. In this instance, a pneumatic drive may be convenient. There is also a brake, 318, which, in the embodiment illustrated is an air brake. It could be a magnetic or friction brake. Axial-direction drive 316 mounted is midway between rails 314, 314, such that all three of items 312, 314 and 316 are roughly co-planar. While this need not necessarily be so, the use of a co-planar, or approximately co-planar mounting may tend to reduce or avoid secondary eccentric, out-of-plane forces that may not aid in the smooth operation of apparatus 300. A symmetrical co-planar mounting may tend to be simple, and convenient. There is also an adjustable over-travel limit abutment, 308 rigidly mounted to carriage 310. The adjustment may have the form of a lag bolt, or threaded rod that is adjusted to set a limit on upward travel of carriage 310 relative to the base or slide or slides.

Apparatus 300 has a spindle assembly 330. In the most general case, spindle assembly may have a tool engagement interface 322 to which a variety of tools may be attached—drills, arbors, mills, and so on—in addition to the welding or coating equipment described herein. Too engagement interface 322 may include a socket for receiving the shank of the tool. Spindle assembly 330 is mounted in main bearings 324, 326, and a forward pilot bearing 328. Main bearings 324, 326 may be angular contact bearings. Pilot bearing 328 may have clearance to accommodate vibration as induced in the apparatus. A timing gear, or pulley, or sheave 332 is mounted to drive the spindle shaft 334 which extends longitudinally through the various bearings. Shaft 334 is electrically conductive. Slip rings 336 are mounted to the end of shaft 334 and receive power from brushes 338 (which are connected to a power supply), to the power input to shaft 334. Dampers, in the form of damper springs 340, 342 may be mounted axially outside, i.e., bracketing, main bearings 324, 326. A main spindle drive 344 is mounted to carriage 310 and includes a motor 346 and transmission 348. The motor can be a servo motor as described in the embodiments above. In this instance, transmission 348 has the form of a timing belt. It is driven by the output pinion or pulley or sheave 350 of motor 346, and carries motion to the input gear, or pulley, or sheave 332 of spindle shaft 334. The timing belt is non-electrically conductive. As may be understood, motor 346 operates at a given motor speed, and is comparable to any of the main drives described above in terms of speed of rotation. As before, the motor speed may be digitally controlled, as by use of an encoder 352 and associated feedback loop. This arrangement may be substantially the same as the encoder examples above.

Carriage 310 has first and second laterally extending structural members or frames, such as identified as a head frame 280, a tail frame 282, and left and right hand side frames 284, 286. Head frame 280 is substantially or predominantly cylindrical, and has an axial extent greater than the axial spacing of main bearings 324, 326. The main bearings 324, 326 of spindle shaft 334 of spindle assembly 330 are mounted in headframe 280. Pilot bearing 328 is likewise mounted in tail frame 282. Side frames 284, 286 form a pair of spaced apart axially extending beams whose lateral spacing and orientation is governed by head frame 280 and tail frame 282. Similarly, side frames 284, 286 provide the structural rigidity and define the stiffness of carriage 310 in respect of maintaining the spacing and orientation of headframe 280 and tail frame 282 relative to each other. Upper and lower slide followers 294, 296 are mounted to the near margins of side frames 284, 286 to engage the slide rails, 312, 314. The axial drive is mid-way between rails 312, 314, and that all three.

Apparatus 300 also includes an offset oscillator or vibration source 360, which, to avoid repetition of explanation, may be the same as, or substantially the same as above. That is, there is a vibrator motor 364, which drives through a clutch 366, thereby turning an output shaft 368 carried in bearings 372, 374. An eccentric 376 is mounted to the far end of driven output shaft 368. Motor 364 is secured in position by mounting frames 290 that attach to the outside (i.e., furthest away from wrist 270) margins of side frames 284, 286. Similarly, mounting members, or frames, 292, also mounted to the outside margins of side frames 284, 286, secure oscillator bearings 372, 374 in position. Again, this arrangement may be the same as, or substantially the same as, the oscillator arrangements noted above. The oscillator need not be mounted on an axis parallel to the spindle axis. It is, however, convenient, and relatively compact, for these axes to be parallel.

Inasmuch as spindle shaft 334 is hollow, conducts shielding gas. To that end, a gas supply manifold 380 is provided in the form of a rotating union shielding gas fitting mounted to the end of shaft 334 distant from the workpiece. At the opposite end of shaft 334 there is an O-ring seal 382 to prevent diversion of shielding gas. The flow of shielding gas is governed by a solenoid controlled valve 378 having on and off positions or conditions.

Carriage 310 is constrained to travel within a permitted range of travel. To that end there are left and right hand linear slides that have respective left and right hand fixed stops 384. Carriage 310 has upper and lower indexing fittings 386, 388, having the form of slide followers 294, 296 that mate with the linear slide. The upper and lower fittings alternately bottom, or run into, or abut, on fixed stop 384 at the upper and lower limits of travel.

A cooling jacket 390 may be mounted to carriage 310. That mounting may be to the distal face (i.e., the face oriented toward the workpiece) of tail frame 282. Cooling jacket 390 may include upper and lower seals 392 that engage the outside of spindle shaft 334. Cooling jacket 390 includes an annular cooling manifold 394 formed therein for the circulation of liquid coolant, and has liquid coolant inlet and outlet fittings 396, 398.

The application tool 400 is mounted at the distal end of spindle shaft 334. Application tool 400 may, in general, be any kind of tool that could be mounted to the end of a robot arm or milling machine, whether a welding or coating applicator or some other tool such as a drill, an end mill, an arbor, a grinder, or such as may be.

In the embodiment of FIG. 19a-19d, application tool 400 is a manually changed welding deposition of coating tool 410. Tool 410 may be referred to generally as a "chuck assembly", or merely a chuck. Tool 410 includes a spindle or chuck (i.e., the actual chuck fitting itself, as opposed to the overall chuck assembly), indicated as 414. Chuck 414 has a root or stub shaft 416 that fits closely within spindle shaft 334, and engages the inside of a seal, such as an O-ring seal or gas seal 382 mounted inside hollow spindle shaft 334. The outside of shaft 416 includes a securement engagement fitting 420. In the embodiment shown, securement engagement fitting 420 has the form of an external circumferential slot or groove or channel that is engaged by a mating locking fitting of spindle assembly 330. Fitting 420 will include a torque-receiving element. The locking fitting 422 (FIG. 15b) may be a circlip or circumferential spring clip, or screw fitting, or clamp that seats in a mating fitting of spindle shaft 334. The locking fitting (or fittings) secure chuck 414 so that torque is transmitted from shaft 334 to chuck 414. In the embodiment shown, fitting 422 is a lateral key. Fitting 420 has a geometry, such as a spline, channel, or socket that mates with the key.

Chuck 414 has a radially outwardly extending flange 424. The radially outward margin of flange 424 is profiled to mate with the wider portion of a shielding gas cowling or shell, or housing, or skirt 426 that defines within it a chamber 426. Cowling 426 is open at its distal end, and provides a seat for an end member that may have the form of a sleeve or cuff 428 that is hollow in the center and provides an outlet passage for the shielding gas. Cuff 428 may be made of a ceramic material. The ceramic material may tend to be suitable for high temperature use in a corrosive environment. In some instances cuff 428 may be mitred.

Chuck 414 has a through bore 430. The distal end of through bore 430 is widened and tapered to receive the shank of a collet 432, which has a matching taper. Collet 432 has an internal longitudinal passageway 434 that ends in an accommodation 436 for a welding electrode rod 440 such as may be used in operation with apparatus 300. Rod 440 will be mad of such welding material as suitable for the welding or coating operation, be it a steel alloy, a nickel or nickel alloy, an aluminum alloy, copper or a copper alloy, molybdenum or a molybdenum allow, titanium or a titanium alloy, or a carbide of boride ceramic composition, such as titanium carbide or titanium di-boride, or such other material noted hereinabove, or as may be. As used in the claims herein, the term "alloy" includes both a composition of more than one material, and also of only one material. That is, "nickel alloy" includes coatings that are only nickel, for example. An internally threaded end piece of collet nut 438 engages the outside threads of the distal end of chuck 414 as at 442, causing the chamfered inside end of collet nut 438 to urge collet 432 into the tapered mouth of bore 430, thus compressing collet 432 and clamping rod 440 in position. Chuck 414 and collet 432 are electrically conductive, and so carry electrical current from spindle shaft 334 into rod 440. Chuck 414 has a passageway, or conduit, or gas vent 444 by which shielding gas conveyed along the inside of shaft 334 is permitted to flow to chamber 426, and thence outwardly through cuff 428 which is mounted concentrically about rod 440.

In the embodiment of FIG. 20a-20d, application tool 400 is a manually changed welding deposition coating tool 450. Tool 450 may be referred to as a "quick release chuck assembly", or merely a chuck. In this case, rather than having chuck 410 that seats directly in the end of spindle shaft 334, a chuck 452 is seated in an intermediate fitting, or adapter, 448, such as may be known as an "HSK Holder". Chuck 452 is threaded or otherwise secured into the output end of adapter 448, and the near end of adapter 448 fits to spindle shaft 334 by a releasable securement fitting. Adapter 448 is changed by moving robot 250 to present tool 400 to a tool changer that is designed to interact automatically with adapter 448. The HSK holder and the automatic tool changing equipment are available from commercial suppliers.

From that point, tool 450 is the same, or similar to tool 410, although the gas cowling or gas shield 460 may be more compact and predominantly cylindrically sided, as at 462, giving a smaller internal chamber 464 since the upstream mounting is to the outside threaded portion of the HSK holder, as at 466, rather than to the radially larger flange of chuck 412 described above. Tool 450, as assembled, is shown in FIG. 20d.

In all cases, apparatus 300 and robot 250 are provided with appropriate electrical connectors (as at 470), pneumatic, and fluid connections, piping, and other ancillary fittings to supply electrical power, whether AC or DC, compressed air, and hydraulic or cooling fluid, such as may be required. These ancillary fittings are understood to be conventional. Apparatus 300 is also provided with sensors such as an inclinometer 472, as well as vibration, motion, and force sensors. The feedback from these sensors allows apparatus 300 to adjust as welding is progressing, e.g., as welding rod 440 is being consumed, it may automatically adjust the axial position of carriage 310 to advance toward the workpiece.

The use of an automatic tool changer and a programmable robot permits apparatus 300 to be used to lay down a welding pass, or a coating pass of material, be it steel, nickel, molybdenum, or such other material, and then, without releasing the workpiece from its accurately known position and orientation, to dress the surface with another tool, be it a drill bit, an end mill, an arbor, or a grinder, as may be appropriate to yield a finished, machined part. Alternatively, it permits a new welding rod to be installed without significant delay. That is, where more than one tool 450 is provided, one can be kept in readiness with a new welding rod while another tool 450 is being used. When the rod is eaten away in use, tools 450 can be swapped out automatically. I.e., the head control automatically stops the progress of the head, retracts the tool to the upwardly withdrawn position, (i.e., the "datum gauge line), and then the machine swaps out the head. The new head has a rod that has been engaged to a pre-set length, set to a gauge length. The programmed machine is given the gauge length as a known parameter, and so returns apparatus 300 to the workpiece with the new welding rod installed, at the correct position and height to continue from the point of interruption (i.e., the previous stopping point). With the new holder tool in place, with the new electrode, the machine moves to the last position and restarts the LEW process where it left off (or at such other location or for such other task as it may have been programmed to perform after swapping one tool for another).

The new replacement rod can be installed in the out-of-service tool 450 while the other tool 450 is working. This replacement can also be an automated process. Furthermore, it is possible to use different welding rod compositions with successive tools. For example, a first pass or treatment may lay down a coating of nickel on copper. A subsequent pass may lay down a coating of titanium carbide on the nickel. Similarly, an initial pass or treatment may coat steel with molybdenum, while another coating, perhaps on a different area, lays down a pass of titanium or a ceramic composition. In these examples, since they do not involve a manual tool change, apparatus 300 may be installed within a controlled environment, which may be flushed with shielding gas, or which may involve exposure to high temperatures or to corrosive or otherwise harmful processing substances.

As noted above, "Low Energy Welding" tends to involve spark deposition of welding or coating material in which the energy of deposit is of the order of 1 J per spark. The spark deposition, or "Low Energy Welding" approach may tend to yield a very small heat affected zone. The coating thickness may be in the range of 0.001" (or less) up to 0.100". Up to now, Low Energy Welding has been a hand-held process, often dependent upon the skill and intuition of the operator. Apparatus 300 may be suitable for mounting on an existing CNC machine tool or robot that controls the coating path or welding as would be done with an end mill, while retaining the rotation, vibration, and peening capabilities of the above-described hand-held units. Using force, current, and motion feedback, the apparatus adjusts electrode stick-out according to the controlled, programmed pattern of direction, angle, and force. The frequency of the electrical supply, the speed of electrode rotation, and the frequency of vibration are all adjustable (or fixed) as welding occurs. Spindle speed is known, because it is monitored, and can be adjusted in real-time, thereby tending to permit a more consistent processing of a workpiece, and promoting consistency of processing from workpiece to workpiece.

The coating head itself, i.e., the apparatus on carriage 310, is a sliding coating head. It is driven by a linear servo motor that governs axial position. The spindle can be driven by different motor systems, depending on the coating speed required. Encoder feedback is provided to permit spindle rotational speed to be monitored and adjusted (e.g., stabilized) during processing. The system may provide the quick-change capability described above; a shielding gas flushing or flooding capability; vibration of the spindle nose; provision of electrical power to the spindle through the main slip-ring connection; and water cooling of the hot end of the spindle. As described, in the embodiments above both the electro-spark deposition (ESD) electrical power and the shielding gas are supplied at the rear or distant end of shaft 334 and carried axially along shaft 334 to the electrode.

Figure 21A:
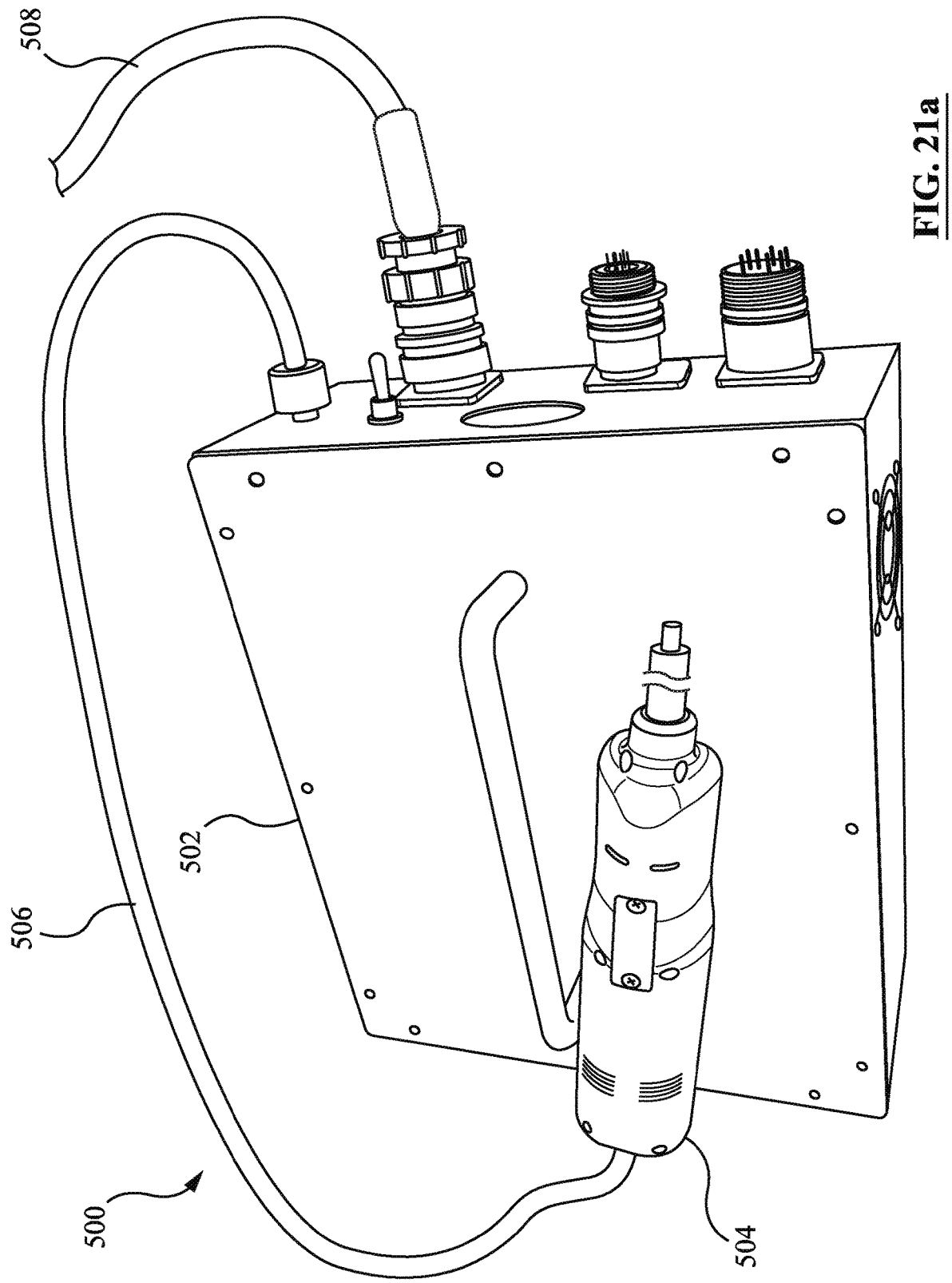
FIG. 21*a* is a general arrangement perspective representation of another embodiment of welding apparatus.
Figure 21B:
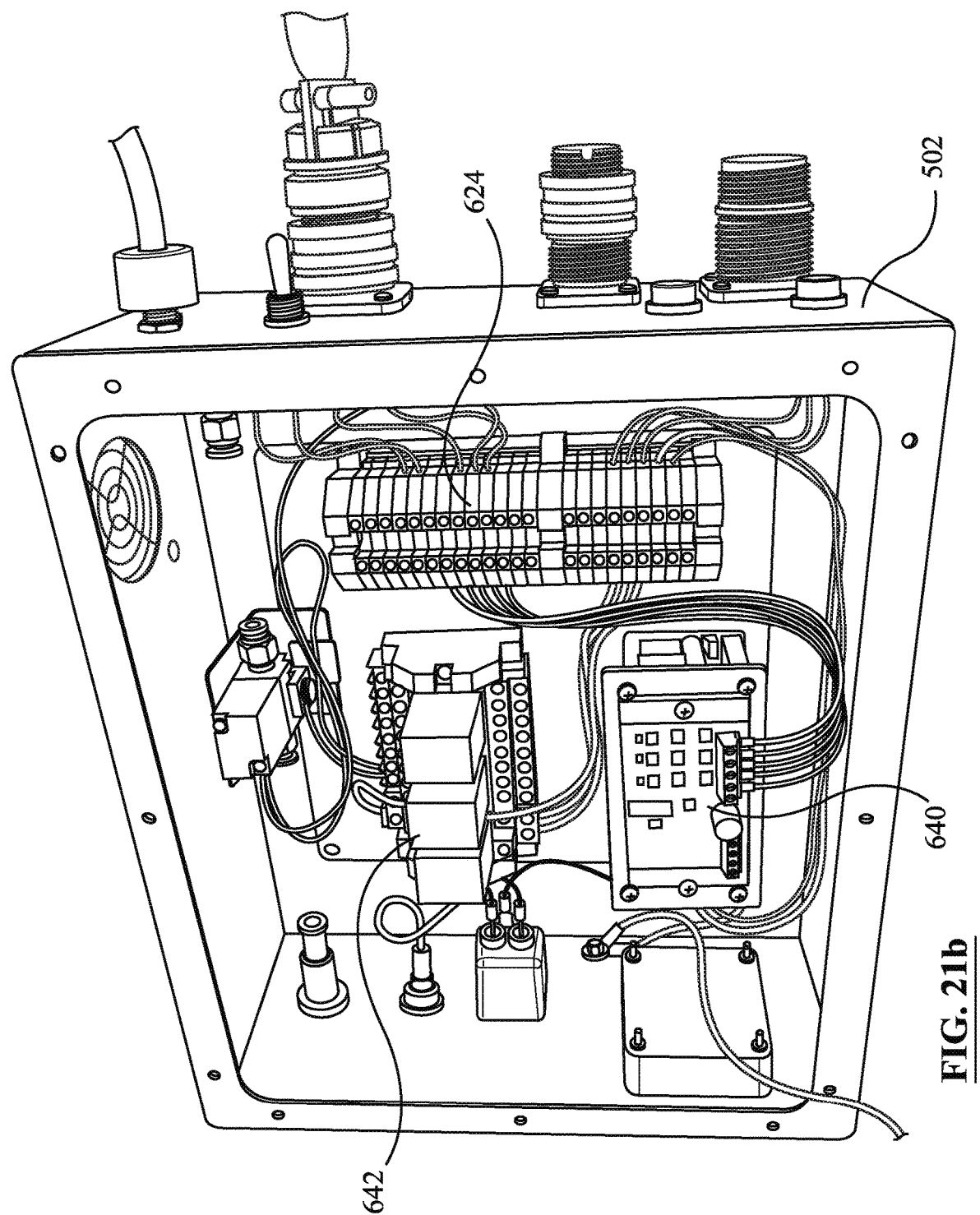
FIG. 21*b* is a view of the power converter of FIG. 21*a* with cover removed.
Figure 21C:
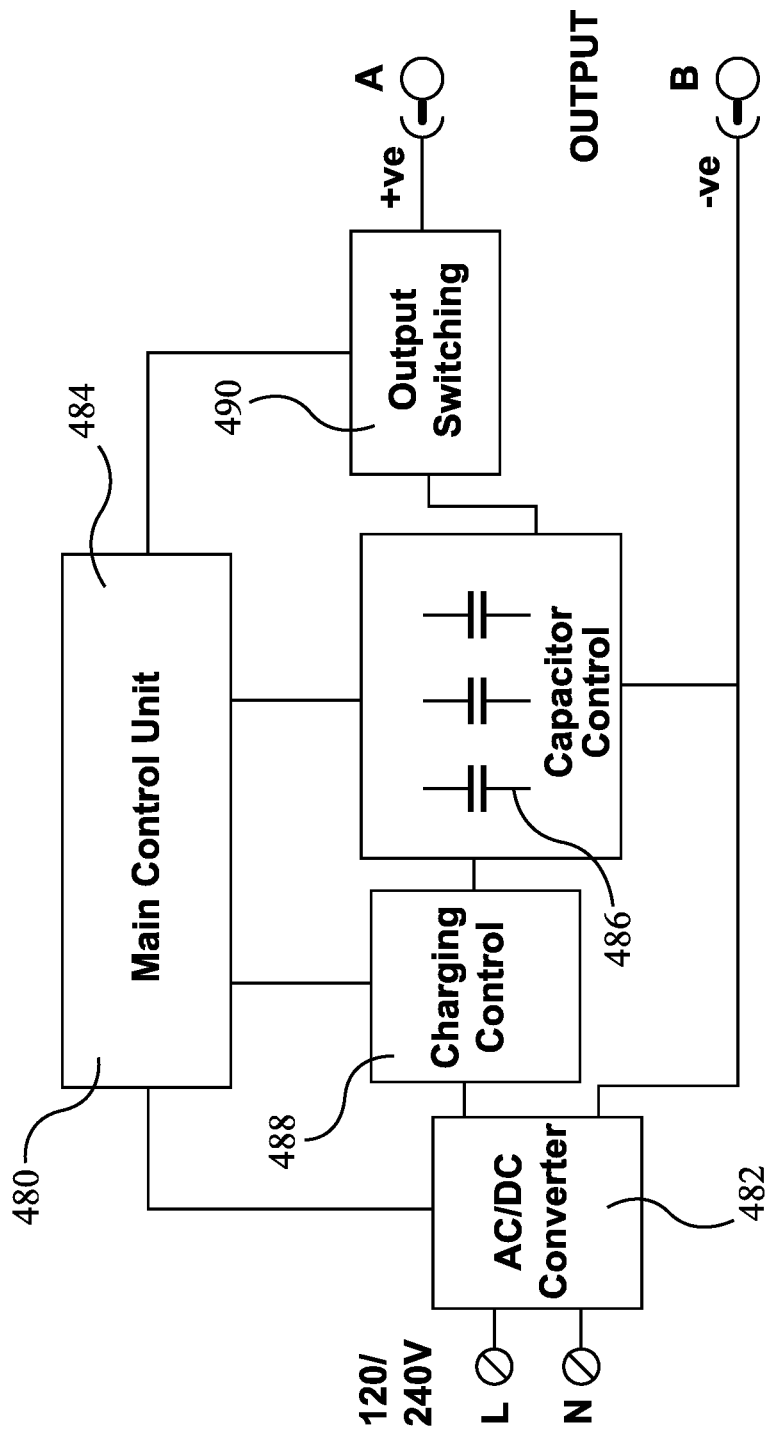
FIG. 21*c* is a schematic of a power supply alternative to the converter of FIG. 21*b*.

Considering the embodiment of FIG. 21a, there is a welding apparatus indicated generally as 500. It includes a power source module 502 and a welding electrode handle apparatus, or applicator, 504. Power source module 502 may be a power converter that itself receives power from another power supply that is ultimately connected to a source of main power, e.g., 120 V, 60 Hz or 220 V 50 Hz. The power converter may be receiving DC power from the intermediate power supply at some voltage, such as 150 V DC, and converting it to a different DC output. Alternatively, power source 502 may be a power supply such as power supply 480 seen in FIG. 21c. During operation, the power supply 480 provides the welding electrode with current. As seen in FIG. 21c, power supply 480 has an input interface in the form of an input AC/DC power converter 482 which converts line voltage to voltage usable within the power supply. The input power may be alternating current, e.g., 120 V, 60 Hz or 240 V, 50 Hz; or it may be a DC supply voltage up to about 150 VDC. Input power converter 482 may be a two-terminal input having a first input L, for line voltage, and a second terminal N for neutral or ground. Power supply 480 also has a main control unit 484. Main control unit 484 may also be termed, or may include, a central processing unit which may have the form of a circuit board and ancillary components. Main control unit 484 is programmed to determine the nature of the input power signal received at converter 482, and to convert it accordingly into rectified DC at an appropriate voltage for charging the capacitors of the capacitor bank (or banks) 486. Capacitor banks 486 may include a single set of capacitors, two sets of capacitors, or more sets of capacitors. Main control unit 484 is also controls the charging of the capacitors of capacitor banks 486, and monitors their stored voltage levels, setting those voltage levels according to the voltage required for the programmed output pulses. This may be done by controlling the positive voltage output from input power converter 482 using a charging control 488 connected in series between input power converter 482 and capacitor banks 486. Main control unit 484 also controls a main discharge switch, indicated as output switching 490 which is connected in series between the positive side of capacitor banks 486 and the output terminal 'A'. The other terminal 'B' is connected to the common ground, or neutral, of the converter output and the capacitor banks. The total charge of each discharge is determined by the magnitude of the voltage stored in the capacitors, and the number of capacitors switched to discharge through output 'A' when the switches are closed to conduct charge.

In any case, whether power source module 502 is a power converter or a power supply, it may be considered to be, generically "a power supply", as it may receive power from electrical mains, whether directly or indirectly, and convert it into a welding power discharge carried to a long-nosed applicator 504 through wiring such as may be symbolised by a cable or wiring harness 506, and which may include a grounding cable, or opposite polarity output, indicated generally as 508, that is electrically connected to the workpiece, or to the jig or fixture, or work table to which the workpiece is mounted during the welding activity. Alternatively, power supply 502 may receive power from another power supply, and may function rather as a power interface box between a commercially available power supply and applicator 504. To this end, power supply 502 has detection circuitry to identify whether the input source is AC or DC, and the voltage magnitude. Power supply module 502 may be adjusted to yield the desired output voltage, current, and train of electrical output signal used in the welding process.

The welding electrode output handle, or handle assembly or applicator 504, has a main body 510. Main body 510 has an external skeleton, or containment enclosures, or housing, or shell that includes mating first and second portions or halves, or back shells 512, 514. Main body 510 contains a motor 516 that receive power from power supply 502. Motor 516 may be a brushless DC motor, and may be geared, i.e., the motor may include reduction gearing between the motor and the output shaft. Apparatus 500 includes a rod, or rod assembly that protrudes forwardly of body 510. It may have an extension, or mandrel, or arm or rod 520.

Between motor 516 and rod 520 there is a non-electrically conducting transmission, or coupling 522 that carries torque and rotational displacement from motor 516 to an output shaft 518. Output shaft 518 is electrically conductive. It is carried in a pair of first and second, or proximal and distal, or rear and front, bearings 524. Forward of rear bearing 522, output shaft 518 passes through, or is mounted within, a set of brushes 526 and a slip rings 528 that receive the welding electrical feed from power supply 502. That electrical charge, current, and voltage supply, however it may be termed, is then carried through slip rings 528 and into output shaft 518.

Output shaft 518 is further carried through a shielding gas union 530 by which shielding gas, such as argon, is introduced into the passageway defined by the accommodation or central bore 532 formed in the forward end of shaft 518. Forward of gas union 530, the foremost end of shaft 518 is carried through a coolant union 534. Coolant union 534 can also be termed a cooling jacket. It has an internal cooling gallery through which externally supplied coolant is circulated, and by which, ultimately, heat is transferred away from the inner end of rod 520.

Rod 520 is actually an assembly, or head, which may be termed a "straight coating head", that is mounted to the holding body defined by main body 510. It could be mounted to a robot, as described in the embodiments above. The coating head, namely rod assembly 520 collectively, includes the outer shaft or tube or rod 536, which could be of square or hexagonal, or other shaped section, but is conveniently of round cylindrical section. Outer rod 536 is a stator. Outer rod 536 is electrically isolated, or has a surface treatment that is non-electrically conductive, such that if outer rod 536 should inadvertently come into contact with other objects during operation, no current will flow.

Outer rod 536 carries within it, or envelops, an inner shaft or tube or rod 538. That is, outer rod 536 forms, or defines, a protector, or shroud, or cowling, or shield surrounding inner rod 538 that is nested within outer rod 536. Inner rod 538 is the conductor that carries the welding discharge current. Inner rod 538 may have an outside diameter of the order of 5 mm (about V). In contrast to conventional conductors, inner rod 538 is hollow, so that it may also be employed to conduct shielding gas to the welding interface. That is, it performs three functions: it provides a rotating drive shaft to spin the electrode; it provides an electrical conduit to carry electrical current to the electrode; and it provides a fluid communication path by which to deliver shielding gas to the weld site. Moreover, the flow of shielding gas within the conductor may tend also to provide cooling to the conductor, and to rod assembly 520 more generally. That is, the rapidly flowing shielding gas provides forced convention heat transfer from inner rod 538.

Inner shaft or tube or rod 538 has a first or proximal end 542 that seats in the accommodation defined by central bore 532. Inner rod 538 is, or includes, a duct or passageway or conduit 540 through which to transport shielding gas received from shaft 518 to the second or distal end 544 of inner rod 538 located at the far (i.e., forwardmost) end of rod 520. Inner rod 538 is a hollow transmission shaft, or transmission member that is mounted in a torque transfer relationship (e.g., with a cotter pin or spline or keyway) to output shaft 518, such that it is a rotor driven rotationally by shaft 518. Inner rod 538 is electrically conductive. Inner rod 538 is carried in inner, mid-length and forward end bearings 546, 548 and 550 that keep it spaced (i.e., radially or annularly spaced) relative to outer rod 536. Bearings 546, 548 and 550 are electrically insulating. Bearings 546, 548 and 550 may be made of ceramic material. Rod 520 may include first and second bearing spacer tubes 552 and 554, those tubes having a shape to fit within outer rod 536 and to block the passage of bearings 546, 548 and 550, such that, on installation, inner bearing 546 locates against an inner end stop 556; proximal spacer tube 552 seats next to bearing 546; middle bearing 548 seats against the forward end of spacer tube 552; the rearward end of spacer tube 554 seats against middle bearing 548; and forwardmost bearing 550 seats again the forwardmost end of spacer tube 554, i.e., the parts are axially stacked. The string of parts is locked in place by a circlip 556 that seats in a groove in the inside wall of outer rod 538.

The forewardmost end of inner rod 538 defines an accommodation, or socket, into which a welding electrode adapter fitting, or seat 560 is mounted. This may be a treaded connection, or a permanent connection made by welding or plastic deformation of the material, e.g., as by crimping or swaging. It is an electrically conductive interface through which welding rod current passes. Seat 560 has a body 562 that has a first end 564 and a second end 566. First end 564 is the rear or inward end that engages the forward end of inner rod 536. Second end 566 is the front or forward, or outward end that engages a welding rod assembly 580. In the example, second end 566 has a welding rod engagement interface, or welding rod engagement fitting, however it may be called, which may be threaded as at 568.

Seat 560 also has two ports, inlet 572, outlet 574, and a passageway, path or conduit 576 extending between inlet 572 and outlet 574. In the example, passageway 576 is formed of a blind bore extending forwardly in the body of seat 560 from inlet 572 which is located in the rear end of seat 560, and an intersecting cross-bore that is let radially into seat 572 through the circumferential sidewall at the base, or forwardmost end, of the blind bore. When seat 560 is matingly engaged with inner rod 536, passageway 540 conducts shielding gas to inlet 572, whence it is carried through passageway 576 to outlet 574. Outlet 574, in turn, gives onto the mouth, or bell, or end of the inside cavity of outer rod 536. In the example shown, first end 564 of seat 560 is a male fitting that fits within the female fitting defined by the peripheral wall of the cylindrical section of inner rod 538. This could be reversed, such that inner rod 538 has the male fitting, and seat 560 has the female fitting.

Welding rod assembly 580 includes a welding rod holder 582 and a welding rod 584. Welding rod holder 582 may also be termed a chuck. The body of welding rod holder 582 has a first end 586, which is the rearward end; and a second end 588 which is the forward end. It is arbitrary which end is called the first end, and which end is called the second end. First end 586 mates with second end 566 of seat 560. Second end 588 mates with welding rod 584. In the example, the body of rod holder 582 as a bore extending inward from the forward end, and a larger, countersunk bore extending inward from the rearward end. The two bores intersect in the mid-body portion of holder 582.

The first engagement fitting 592 at first end 586 is a non-permanent fitting. It allows holder 582 to be matingly engaged and disengaged from seat 560. In the embodiment shown, fitting 592 is a threaded fitting. In the embodiment, it is a female thread that mates with the corresponding male thread of seat 560.

The second engagement fitting 594 receives one end of welding rod 584. Fitting 594 and welding rod 584 could be matingly threaded. However, a permanent mechanical connection can be made by inserting the end of welding rod 584 in the seat, accommodation, or socket defined by the bore formed in the forward end, and then plastically deforming the forward end of the chuck to squeeze onto the welding rod. Where a permanent connection is made, the chuck is disposed once the welding rod has been consumed. Given the single-use nature of such a chuck, rod holder 582 is removably mounted to seat 560. As may be noted, the outside diameter of the chuck body is less than the inside diameter of the mouth of outer rod 536, such that shielding gas carried through passageway 576 may tend to flow predominantly axially in the annular gap between them, somewhat in the manner of a nozzle or shower head, with the shielding gas flowing about the welding rod.

In the alternate embodiment of FIGS. 24a-24c and of FIGS. 25a and 25b, there is an apparatus 600 that is generally as described above. However, in place of seat 560 and welding rod holder 582, apparatus 600 has a generally T-shaped housing or seat 602 that mates with the end of a rod assembly 604 that is otherwise the same as rod assembly 520. In this case, the stem of the T of seat 602 is internally threaded, and the end of the external rod 606 or rod assembly 604 is correspondingly externally threaded. The end of internal rod 608 carries a bevel gear 610. The T-shaped housing of seat 602 is either non-electrically conductive, or has a non-electrically conductive coating such that it does not provide and electrical current path if inadvertently place in contact with an electrically conductive object.

The cross-bar portion of the T-shape has a through bore 612, into which a front bearing 614 and a back or rear bearing 616 are mounted. Bearings 614 and 616 are non-electrically conductive. Welding rod 620 is carried through the bearings. A second bevel gear 618 is mounted to the rearward portion of welding rod 620. An end nut 622 on rod 620 works in cooperation with second bevel gear 618 to fix the longitudinal position of rod 620 relative to back bearing 616. The driving and driven bevel gears are electrically conductive. The interior of the chamber define inside the T-shape of the housing is in fluid communication with the outlet end of hollow shaft of inner rotating shaft, or rod, 608. Front bearing 614 similarly cannot move rearwardly beyond an internal stop defined by circlip 624. Welding rod 620 also carries a positioning ring 626 that is crimped on the rod prior to insertion. Once inserted, nut 622 is tightened. Positioning ring 626 is a consumable element that is discarded with the remainder of rod 620 after it has been used. The T-shaped housing has grooves or splines that form axial gas passageways 630 by which shielding gas vents to ambient about the exposed portion of welding rod 620.

In operation, inner rod 608 drives first bevel gear 610, which turns the second, or driven bevel gear 618, which turns welding rod 620. While this occurs, shielding gas is carried from inner rod 608 through the internal passageway defined within the T-shaped body of seat 602, and out the slot or slots of passageway, or passageways 630 to bathe welding rod 608, and the welding interface, during welding.

Figure 15A:
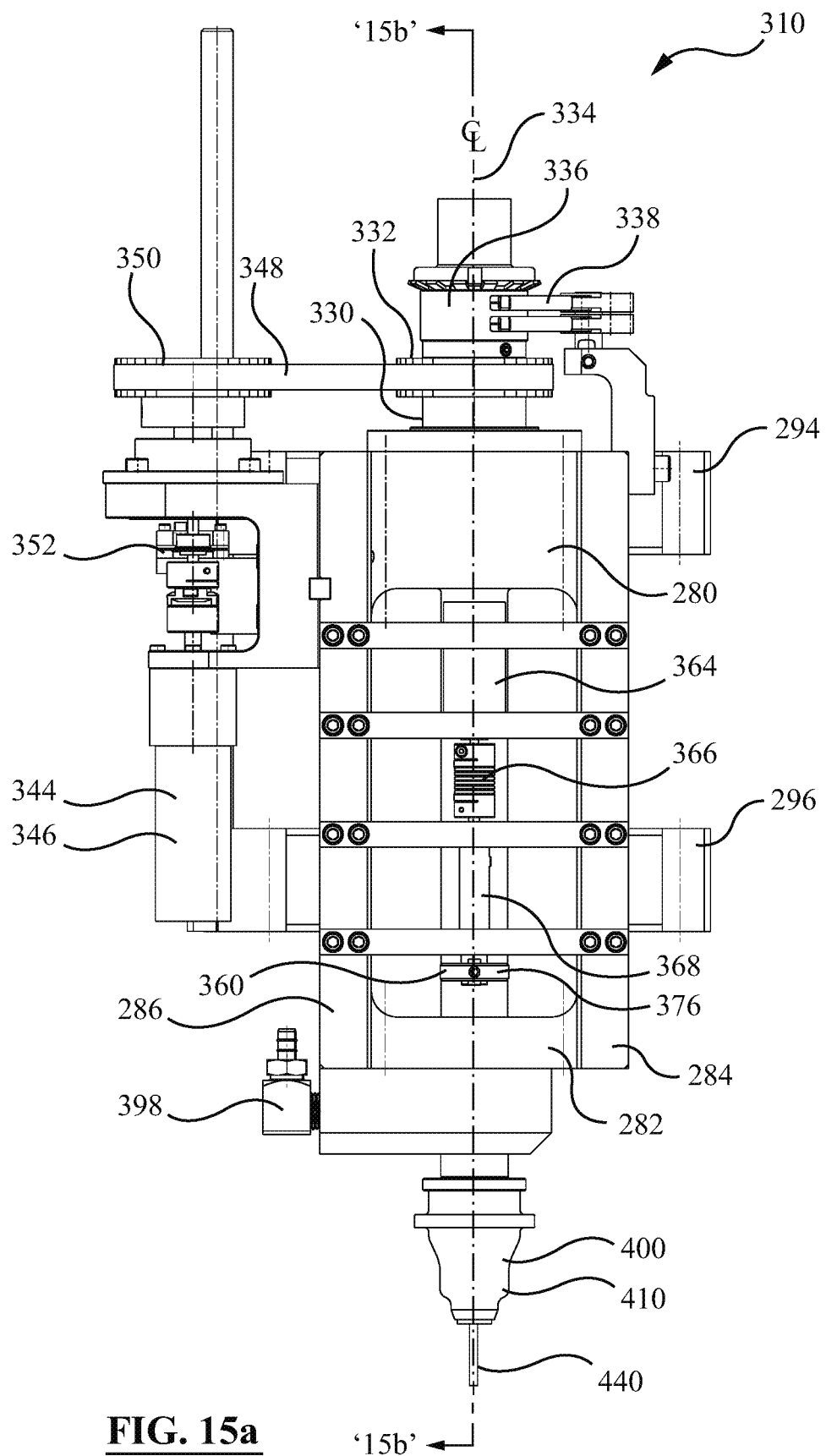
Figure 15B:
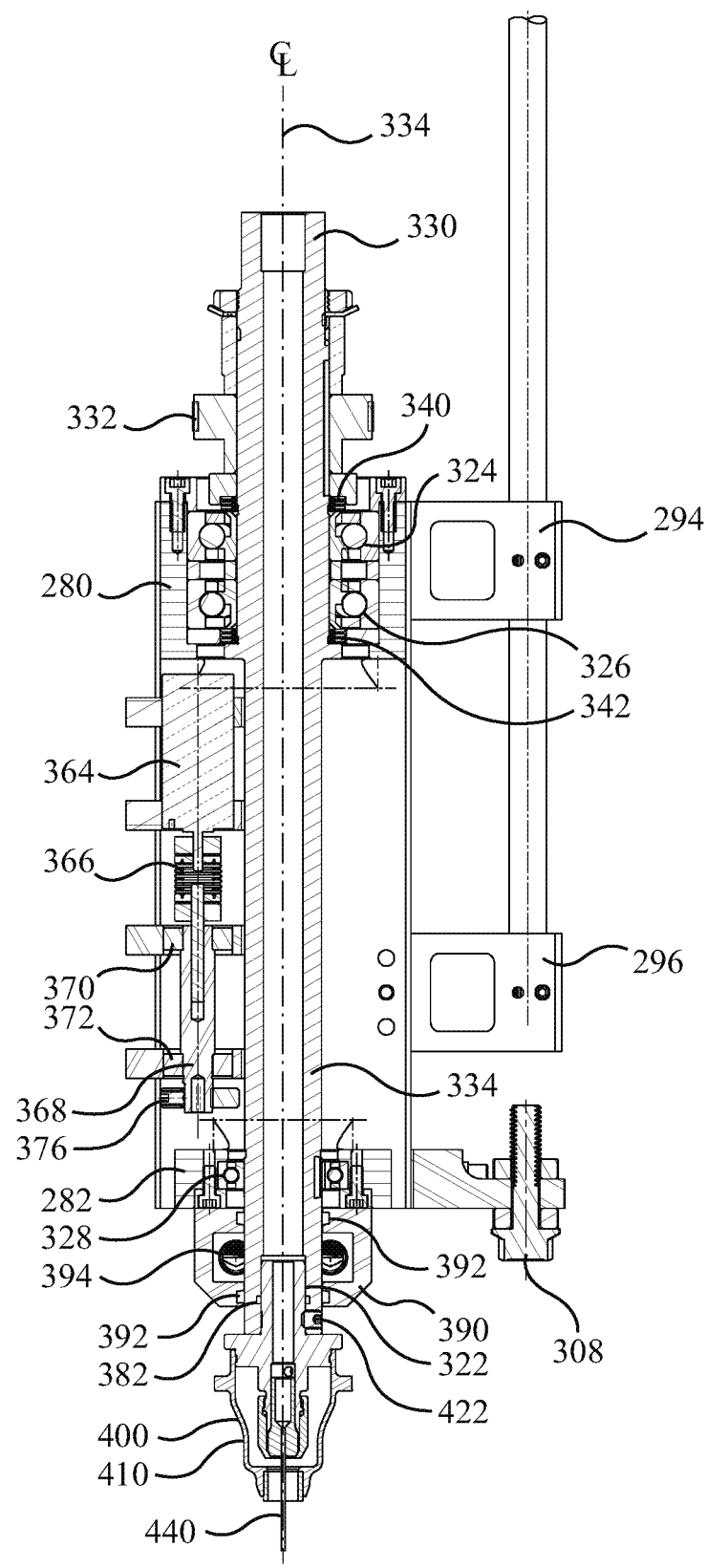
FIG. 15b shows a cross-sectional side view of the spindle housing of FIG. 15a taken on the center line vertical plane of the spindle.
Figure 16A:
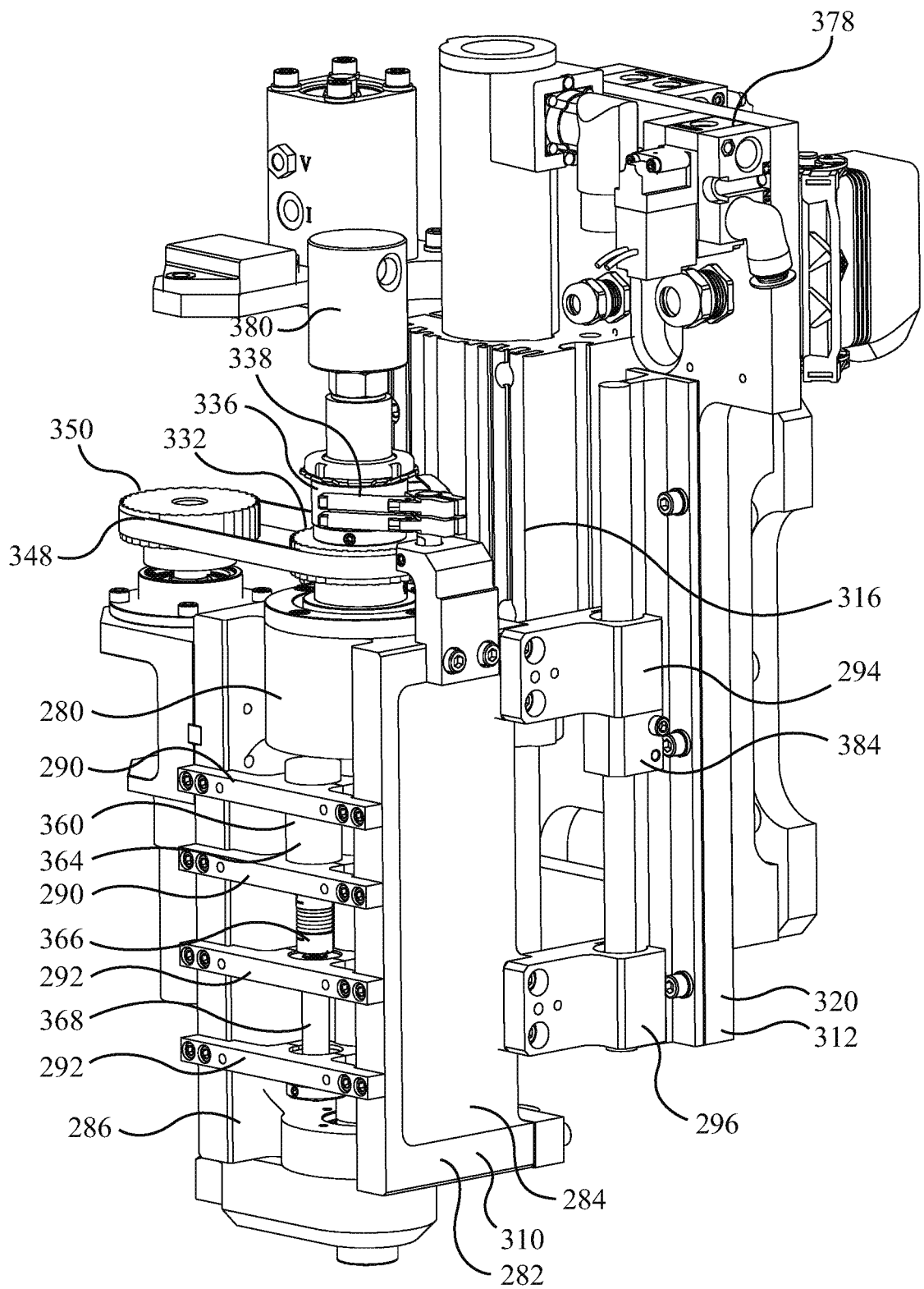
FIG. 16a shows a perspective view from the right front of the coating head of the coating apparatus of FIG. 14a, with the coating head in the fully extended or lowered position as when engaging a workpiece.
Figure 16B:
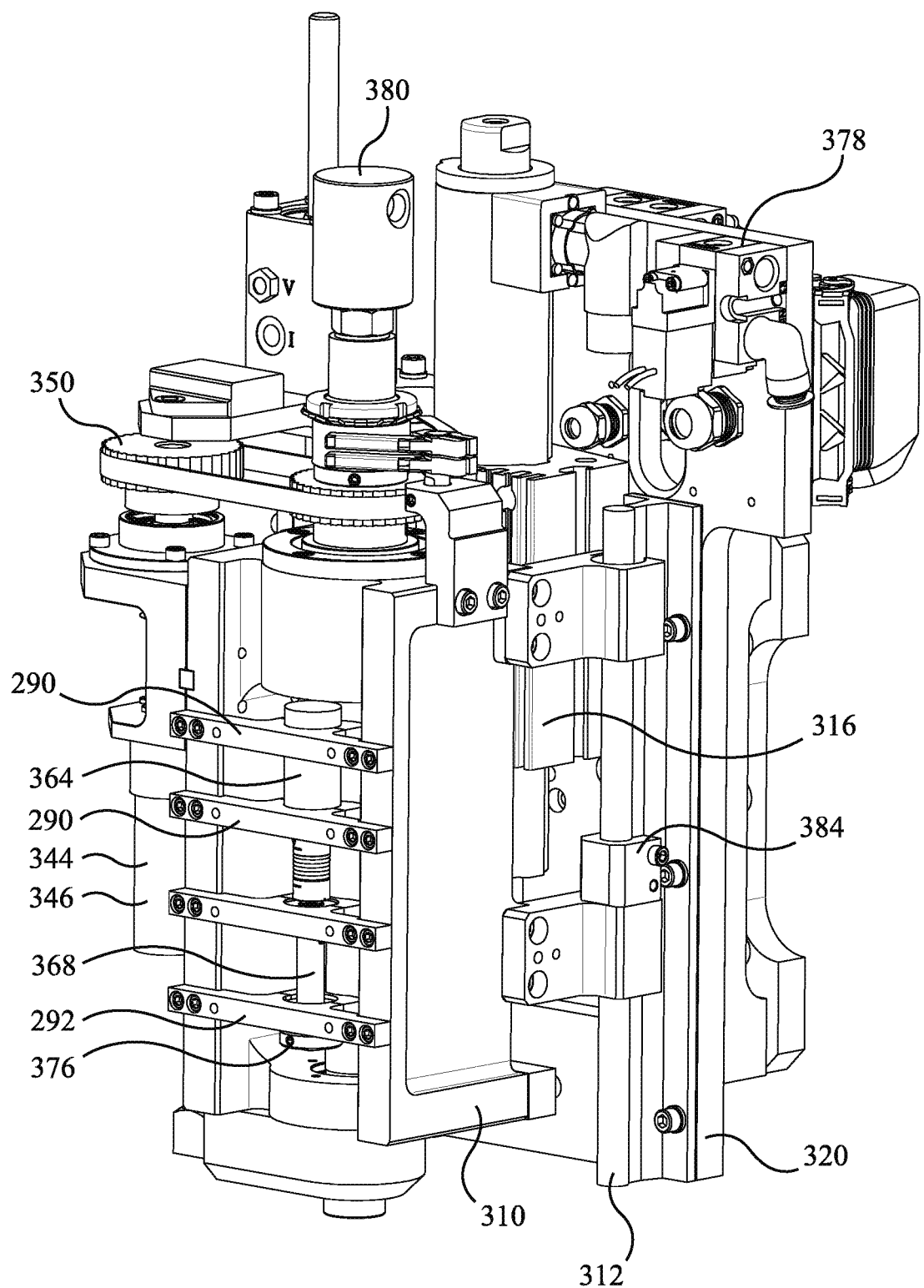
FIG. 16b shows a perspective view from the right front of the coating head of the coating apparatus of FIG. 14a in the raised or fully retracted position, as when disengaged from the workpiece.
Figure 16C:
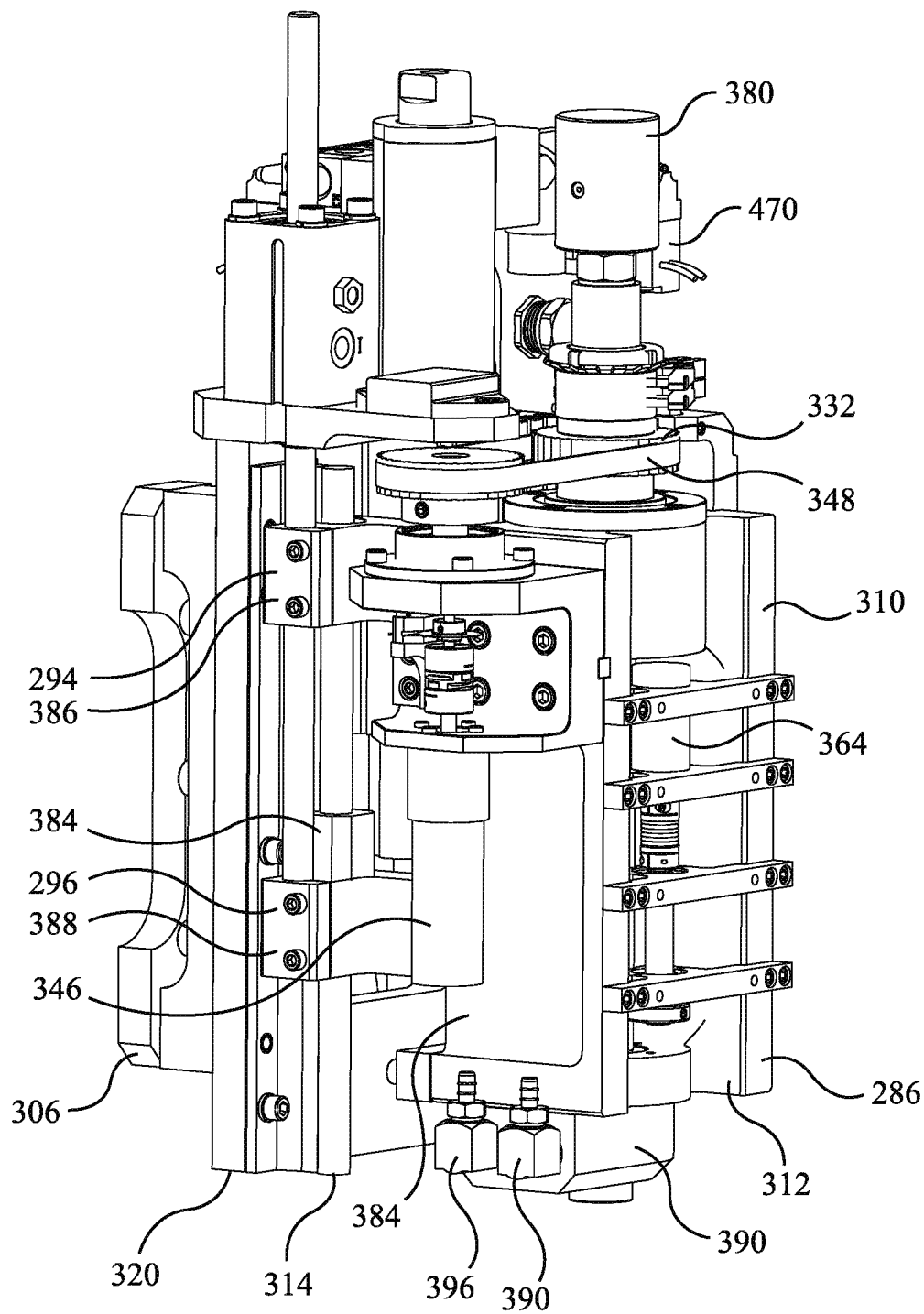
Figure 16D:
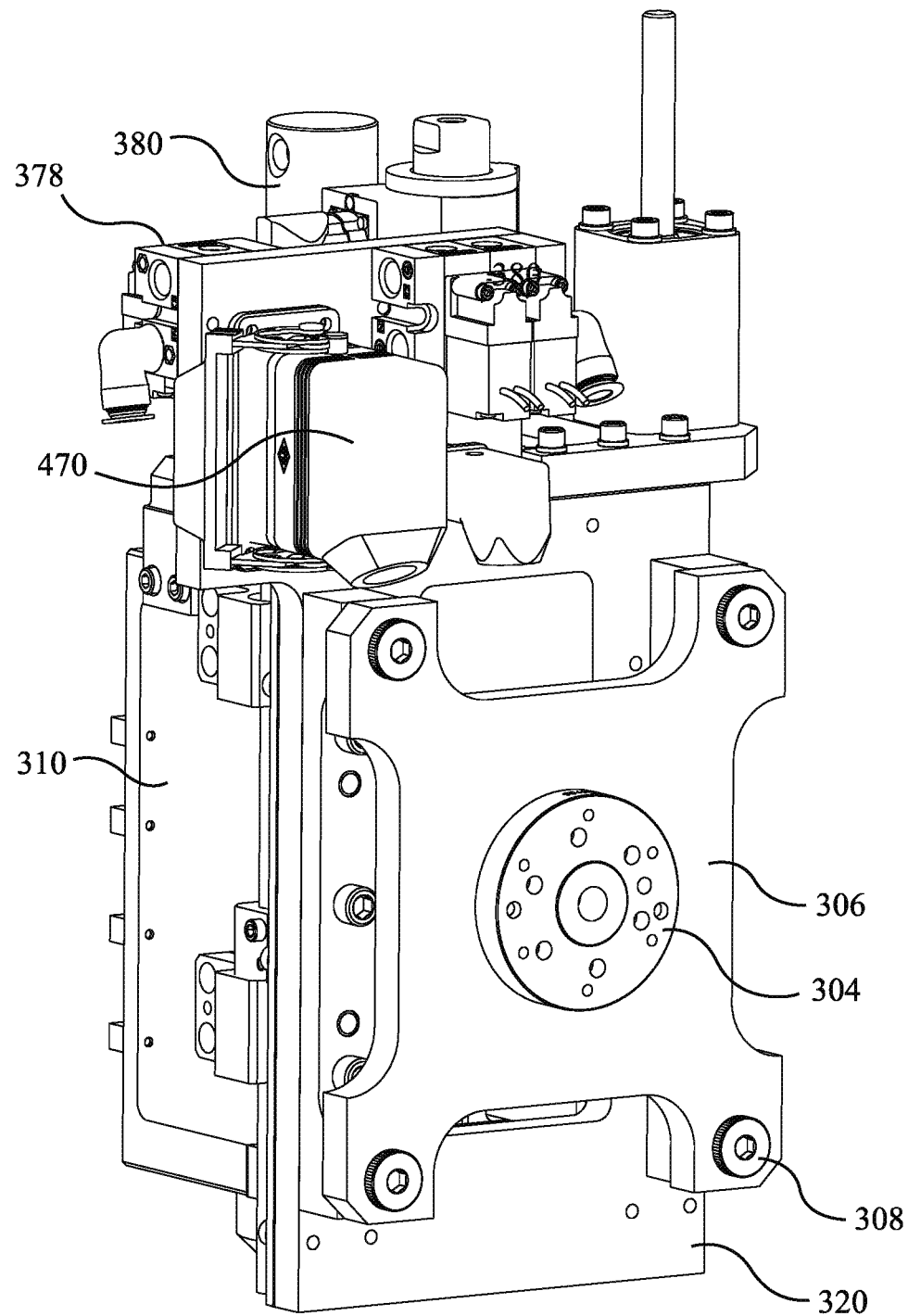
Figure 17A:
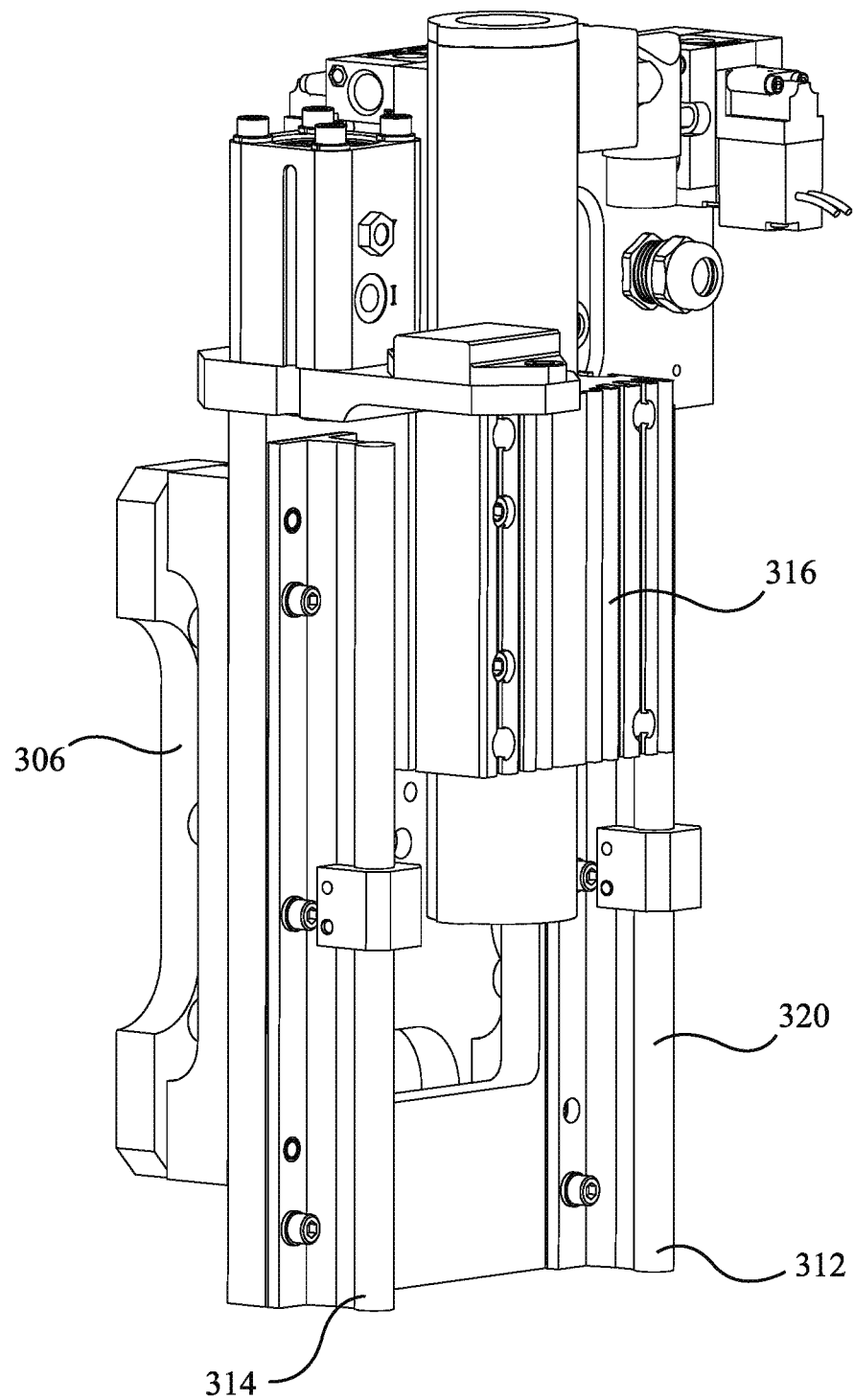
Figure 17B:
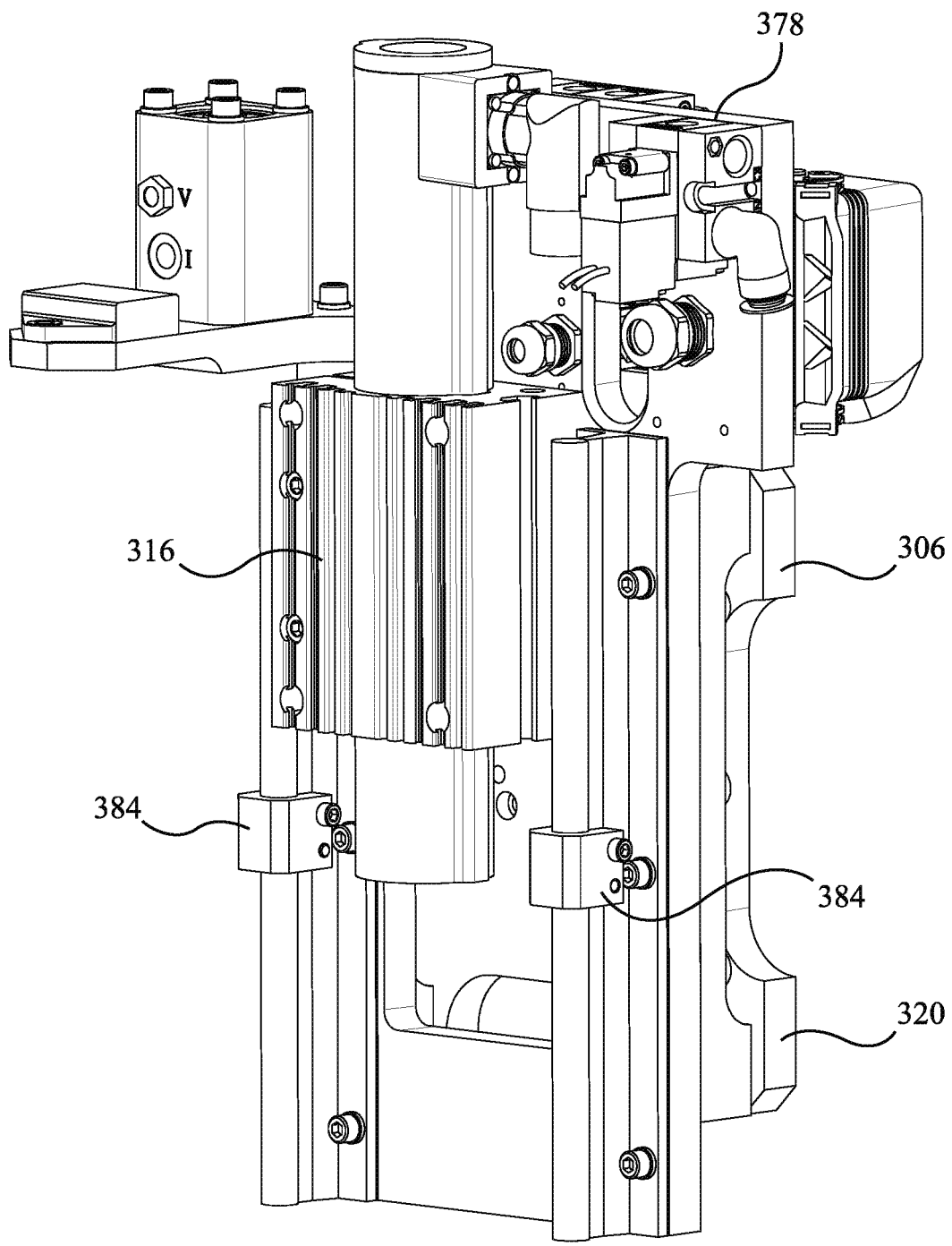
Figure 18A:
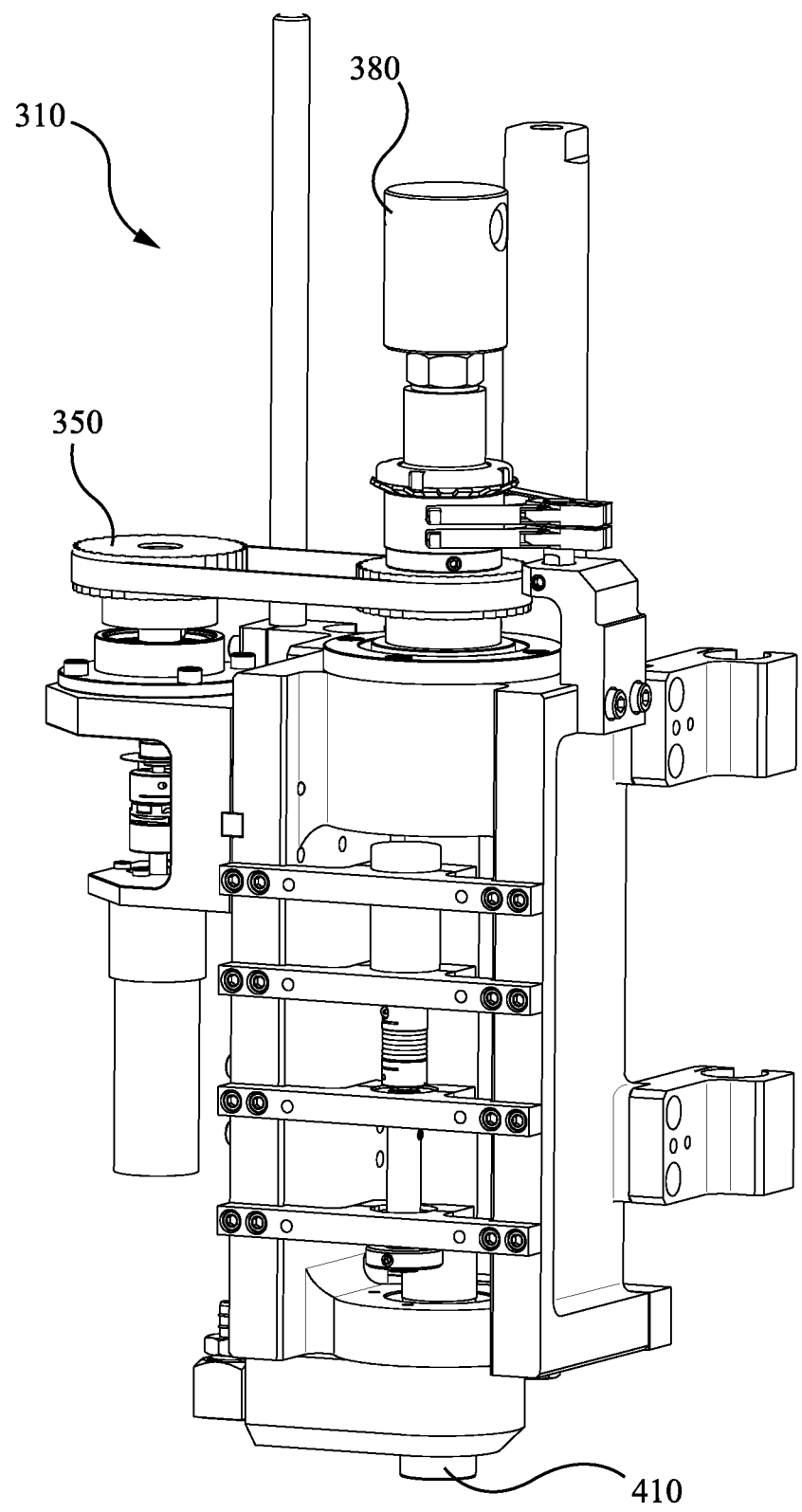
FIG. 18a shows a tool and carriage of the coating apparatus of FIG. 14a from in front and to the right.
Figure 18B:
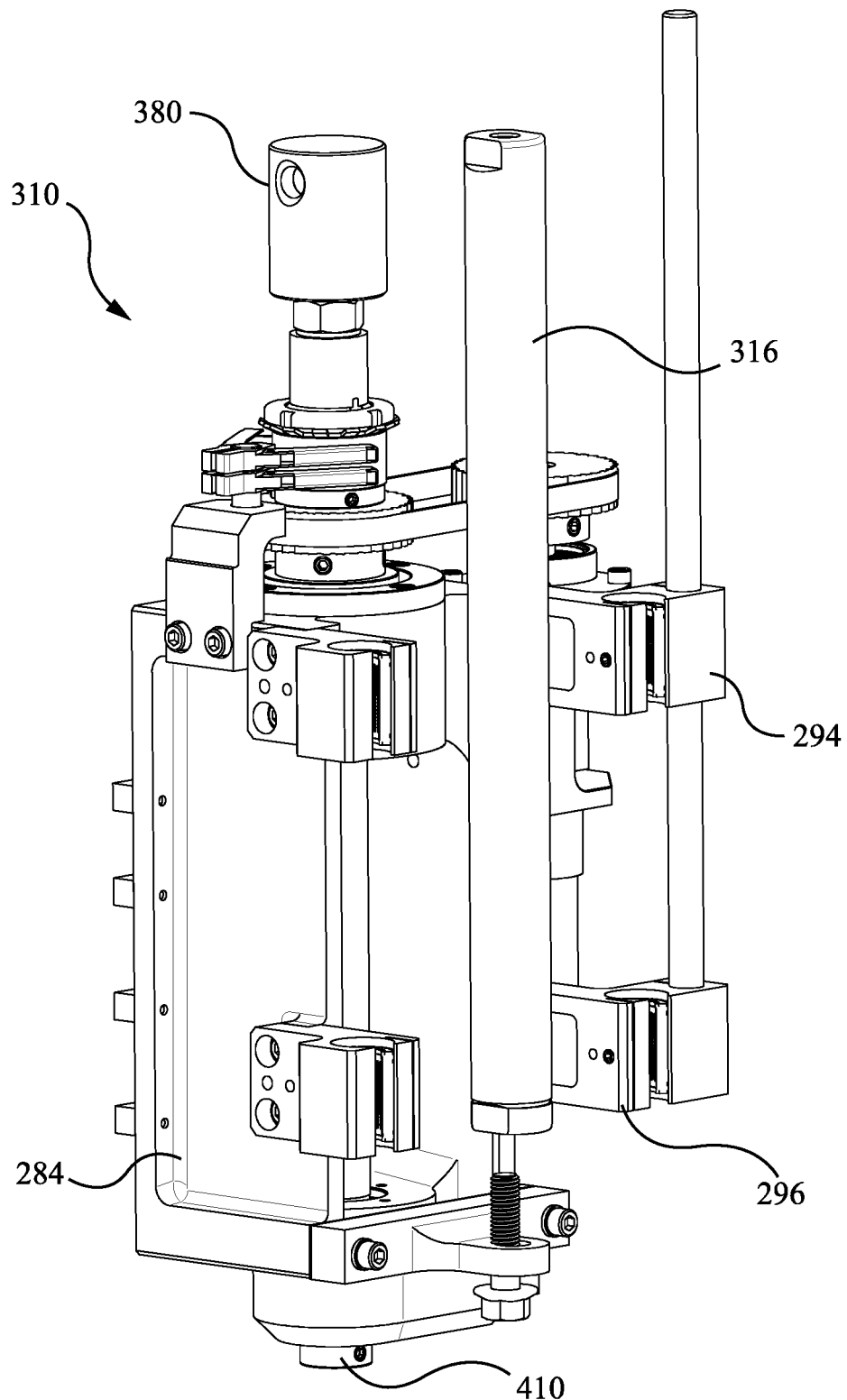
FIG. 18b shows the tool and carriage of FIG. 18a from behind and to the right.
Figure 22C:
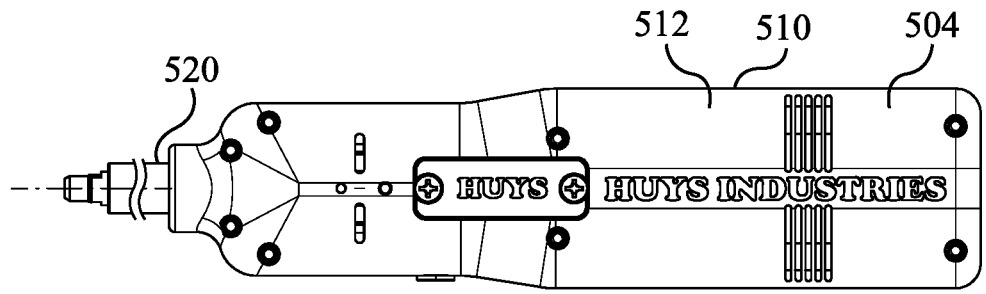
FIG. 22*c* is a front view of the welding electrode handle of the apparatus of FIG. 22*a*.
Figure 22D:
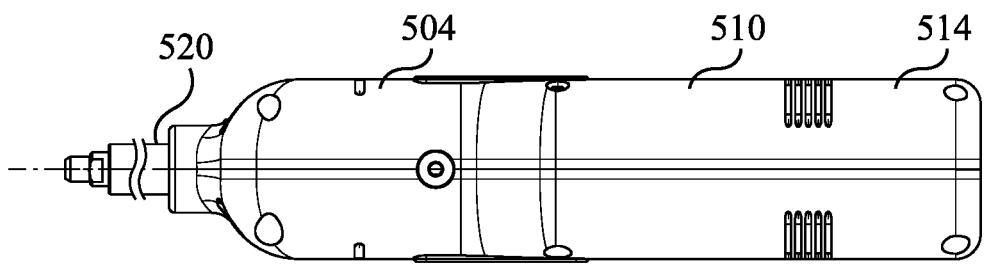
FIG. 22*d* is a back view of the welding electrode handle of FIG. 22*a*.
Figure 22E:
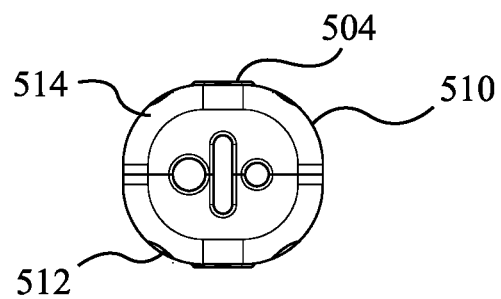
FIG. 22*e* is a rear end view of the welding electrode handle of FIG. 22*a*.
Figure 22F:
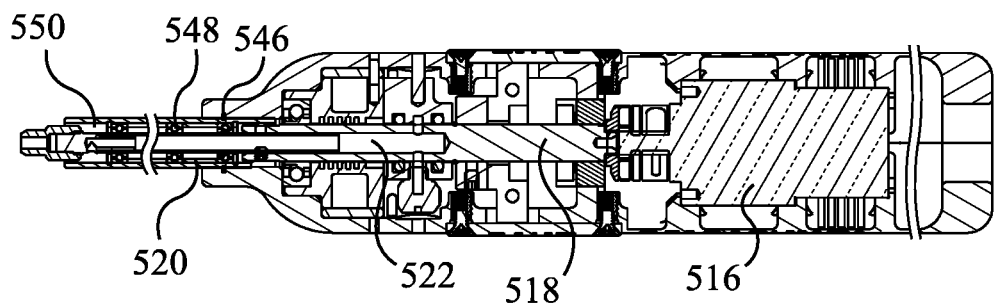
FIG. 22*f* is a cross-sectional view on the central longitudinal plane of the welding electrode handle apparatus of FIG. 22*a*.

Although the embodiments of FIGS. 22a-22f and 24a-24e are described in the context of a hand held application, i.e., with handle assembly or applicator 504, such an assembly can be mounted to an applicator or base that is mounted to a robot arm, and carried along an application path, or schedule, according to a pre-programmed function, or in response to surface and tool location sensors, in accordance with any of the embodiments described above. An example of such an application is seen in FIGS. 25c, 25d and 25e, in which there is a spinning mandrel or cylinder assembly 632, substantially as seen in FIG. 15b, but with the shielding gas transmitting applicator end tool as seen in FIG. 22f or 25a, possibly carried in a quick change tool, similar to, or largely the same as, tool 400 seen in FIG. 19a-19d. Assembly 632 is mounted in head 634 which is substantially similar to, or the same as, carriage 310. As may also be seen, head 634 has a quick-release, in this instance a pneumatic quick release 636 that includes a one-way acting pneumatic piston and passive return springs 646. When air pressure is applied through sealed pneumatic union 628, the tool e.g., 638 is released, and a new tool can be installed automatically. This may permit automatic tool changes when the consumable welding rods have been reduced in length and require replacement, largely without interruption or intervention, relatively expeditiously.

Similarly, although the embodiments of FIGS. 22a-22f and 24a-24e are described in the context of a hand-held applicator 504, whether the welding head is mounted to a hand held holding body such as hand-held applicator 504 of FIG. 21a, or to an automated holding body, in the form of a robot as described above, they can also be provided with a source of vibration, be is an oscillating imbalance or an ultrasonic horn, as described in the other embodiments included herein.

Referring back to power supply 502, the power supply includes capacitor banks that are charged and discharge during the welding process. In the context of low energy welding, as noted above, the energy of each discharge may be kept to a low figure, of the order of 1 Joule, or a few Joules. This is very small as compared to conventional welding.

It is known to use DC voltage for welding. It is also known to use AC voltage, with sinusoidal wave forms. In this regard, the inventors refer to the minaprem website at http://www.difference.minaprem.com/joining/difference-between-dcen-and-dcep-polarities-in-arc-welding/

The content of this website, including its definitions of welding terminology, are incorporated herein by reference. In particular, the applicant incorporates the definitions:

"In arc welding, the base plates are connected with one terminal of the power source, while the electrode is connected with other terminal. When sufficient potential difference is applied, electrons flow from negative terminal to the positive terminal in the external circuit. Avalanche of flow of electrons constitutes the electric arc, which is prime source of heat. Polarity in arc welding decides the direction in electron flow between base plates and electrodes. Arc welding power sources provide either AC or DC power; however, depending on the connection made, DC power can provide two polarities—straight polarity and reverse polarity."

Direct Current Straight Polarity (DCSP) or Direct Current Electrode Negative (DCEN)—The electrode is connected with the negative terminal of the power source and base metals are connected with the positive terminal. So with DCSP polarity, electrons emit from electrode and flow towards base plates.

Direct Current Reverse Polarity (DCRP) or Direct Current Electrode Positive (DCEP)—The base metals are connected with the negative terminal of the power source and electrode is connected with the positive terminal. Thus with DCRP polarity, electrons emit from base plates and flow towards electrode.

As further noted on the Minaprem website:

"Arc welding power sources can supply either AC or DC or both forms of current. In case of DC polarity, current flows only in one direction; whereas, in case of AC, current flow direction reverses in every cycle (number of cycles per second depends on the frequency of supply). In arc welding, base metals are connected with one terminal and the electrode is connected with other terminal. Under presence of sufficient potential difference, continuous flow of electrons between them through a small gap constitutes the arc (prime source of heat in arc welding).

The Low Energy Welding power supply 502 has been developed based on the principle of micro-arc capacitor discharge welding control. It is a combination of arc and capacitor discharge welding controls. Power supply 502 includes a programmable control. It is programmable to control the initial discharge voltage, and the quantity of stored charge to be released during the individual discharges. The programmable control includes switching, be it one switch or many switches, to permit the polarity of the DC discharge through the workpiece and welding rod to be reversed.

One terminal, the "first terminal" of the power supply is connected to a consumable electrode held in an applicator running in a rotating or vibrating motion, or both, as in the various embodiments described above. In one example, the "first terminal" would be a cable in wiring harness 506. For the purposes of discussion, that first terminal will be designated, at least nominally, as the negative terminal. The second terminal, or positive terminal (at least nominally) of power supply 502 is connected to the workpiece via the connection of a low impedance copper cable. In one example, that terminal would be a cable in wiring harness 508. A complete electrical circuit is made when the electrode is brought near the workpiece, and current begins to flow.

A high current of very short duration will be produced along the circuit when a contact is made between the electrode and the workpiece. The high current pulses melt a portion of the electrode and the molten material is transferred to the workpiece during the moments when contact is made. In the intermittent contact of ESD welding, this may tend to be a relatively slow process. However slow it may be, eventually substantial amount of electrode material is transferred and accumulates on the surface of the workpiece to form a metallurgical layer.

In principle, as noted, there are two major categories of power supplies, AC and DC. In conventional AC, the output polarity of the first and second terminals changes sinusoidally from positive to negative, and back to positive and so on in a preset manner according to the frequency of the supplied power. In DC, the polarities of the output terminals are fixed throughout the process.

In arc welding, as noted above, DC power has two modes of operations: straight polarity (DCEN) and reverse polarity (DCEP). In straight polarity DC mode, the electrode is connected to the negative terminal while the workpiece is connected to the positive terminal of power supply 502. Electrons flow from the electrode to the workpiece when weld current conducts. On the other hand, electrons flow from the workpiece to the electrode in the DC reverse polarity (DCEP) mode of operation.

The choice of polarity of the welding circuit is important for the arc welding of different materials, and different shapes as that choice may tend to produce different results. There are advantages and disadvantages associated with these two modes of DC polarity of operation. With electrons flow from the electrode to the workpiece, in general the DCEN mode has the following features:

Electrons emit from electrode to workpiece
More heat to be generated on the workpiece surface
Better melting on workpiece surface
Better welding penetration
Better for high welding point metals
Might have higher distortion, stress and wider HAZ
No arc cleaning effects on workpiece surface
No good for thin metals
Lower rate of electrode deposition In the DCEP mode of operation, electrons flow from the workpiece to the electrode giving the following features:

Electrons emit from workpiece to electrode
More heat to be generated on the electrode
Less weld melting and penetration on workpiece surface
Suitable for thin metal
Not suitable for high melting point metals
Arc cleaning or oxide cleaning on workpiece surface
Higher electrode deposition rate.

Power supply 502 herein may be used for ESD welding. The power supply control and power circuit has been modified to provide the following modes of operations:

1. Direct Current Straight Polarity (DCEN)
2. Direct Current Reverse Polarity (DCEP), and
3. Programmable Alternating Current That is, apparatus 500 (or any of the other embodiments of apparatus shown and described herein), may be operated in DCEN mode, or in DCEP mode. In addition, or in the alternative, however, it may be operated in a programmable alternating current, or alternating polarity mode. In this AC mode, or alternating polarity mode, of operation described herein, a mix of DCEN and DCEP arc welding phenomenon may occur during the welding process. The choice of DCEN, DCEP or AC modes for Low Energy Welding depends on a number of welding conditions and factors.

Power supply 502 includes a circuit board 640 having a programmable logic device, which may be termed the "Main Control Unit". The logic device is used to provide the control functions of power source 502. The selection of the DIP switches of power source 502 sets the operating mode. Also a thyristor module group 642 has also been developed at the output. It provides the varying polarity of the power outputs to the electrode and workpiece in real time during operation. ESD processes heretofore have employed Direct Current Reverse Polarity, which has been observed up to now to produce better results than Direct Current Straight Polarity.

The controller of the power supply is programmed to provide welding discharge pulses across the terminals of the power supply, and thus to provide a method of welding. The method of welding may be a Low Energy Welding method, in which each specific welding pulse has an energy discharge of less than 200 Joules. In these methods, the welding discharge per pulse may be less than 20 joules. In some methods it may be less than 2 joules per pulse of discharge. Methods of Low Energy Welding described herein may be intermittent methods, rather than continuous methods, where the time duration of welding is short, and the surface location of welding is rapidly changing. Where this occurs, the energy discharge per unit of surface area is small. This may tend to yield a small, or very small, heat affected zone. The method of discharge is made intermittent by the rotation of the welding rod, or by the vibration of the welding rod, or both. Welding may also be made intermittent by moving the workpiece, e.g., be shaking or rotating the work table, jig, or fixture to which the workpiece is mounted, independent of vibration of the welding electrode.

Moreover, the programmable control permits the magnitude of the voltage at the commencement of discharge also to be controlled, and for the magnitude of voltage to be varied between successive discharges, or groups of discharges, and to be varied as between discharges of differing polarity. That is, where one or more discharges may be made with positive polarity, and the initial voltage of those pulses may be varied from pulse to pulse, additionally, the power supply may be programmed to reverse the polarity of the pulses from time to time during welding. By varying the polarity, a series of pulses in one direction, be it positive polarity, may be used to obtain greater penetration, while a subsequent pulse or pulse of opposite polarity may be used to improve the cleaning effect such as may tend to reduce oxidation effects in the welding process. This reversal of polarity may be used in combination with the use of a shielding gas.

Where the polarity of one or more pulses of discharge in a train of discharges has been reversed, the controller is programmable to select individual discharges or multiple discharges in the reversed polarity. The voltage of the reversed polarity pulses need not be symmetric. That is, the controller is programmable to vary the voltage of one or more of the pulses of that reversed polarity, and to vary the magnitude of the initial voltage of the reverse polarity from the magnitude of the initial voltage of the original polarity. That is, unlike a conventional sinusoidal AC signal, the mean voltage of the series of pulses may not be zero, and so therefore the train of pulses need not have a symmetric positive and negative peak voltages relative to a zero voltage mean. The mean voltage of the train of pulses may be positive or negative. The supplied voltage may not be sinusoidal. Where more than one bank of capacitors 644 is used, the peak amplitude of voltage of one polarity, be it a positive voltage, may be different from the peak polarity of the other polarity, be it a negative voltage. Similarly, the total charge of the individual pulses may vary. It may be that a discharge pulse of greater (or lesser) energy, and therefore of greater (or lesser) heating, may be desired in one direction to achieve a level of penetration, whereas discharge pulses of lesstotal charge, and therefore of less energy, may be used for cleaning. In one embodiment the peak or initial voltage of the positive polarity pulses may be greater than the peak or initial voltage of the negative polarity pulses. Power supply 502 may include a plurality of sets of capacitors that may be charged to the same or different voltage levels according to the discharge voltages of the programmed welding process.

In this welding method, the output signal may be termed "digitally controlled AC". It may also be termed "reversing polarity digital controlled direct current welding", in the sense that each individual pulse or discharge is a direct current discharge. However, the controller is programmed to reverse the polarity of the direct current at times during the method. Hence the process is a direct current process in which the polarity is alternated digitally. Where a train of such discharges occurs, and the discharge pulses are of varying polarity, wither of equal number or otherwise, the resulting output may be termed synthetic AC. The "AC" is an assembled, (or synthesised and therefore synthetic), train of DC discharges of varying polarity that alternates between positive and negative, although it is not necessary that it alternate at each successive discharge. There may be more than one successive discharge of one polarity between alternations of polarity.

Figure 26A:
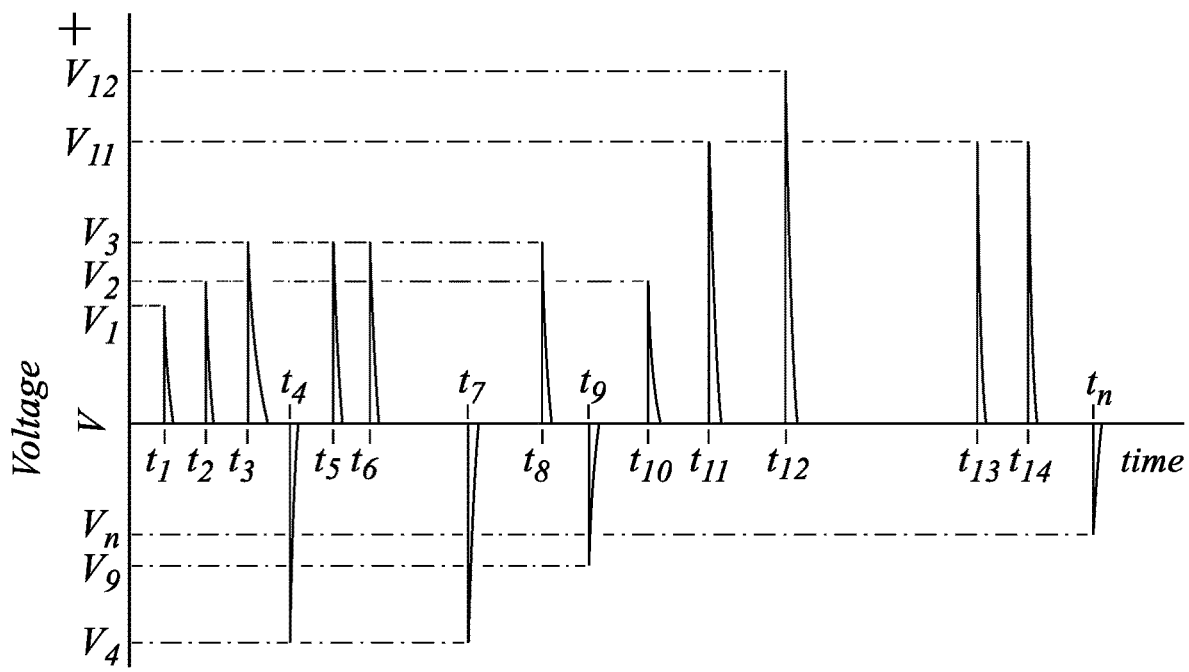
FIG. 26*a* is a chart of Voltage v. time for the welding apparatus of FIG. 21*a*.

The quantity of charge of each discharge, and the initial voltage of each discharge may also be varied by digital control. Each bank of capacitors may include several individual capacitors that can be switch to discharge in any given pulse. Where a pulse of greater total energy is sought, a greater number of capacitors of that bank may be switched to discharge at the same time. As noted, the number of discharges of one polarity need not be equal to the number of discharges of the opposite polarity. They may be different in number. They may have different total charge. They may be different in initial voltage magnitude. They may be different in total energy of discharge. In particular, there may be more DCSP discharge pulses than DCRP pulses. The DCSP pulses may have a higher initial voltage. The DCSP pulse may have a greater energy input than the DCRP discharge pulses. FIG. 26*a* is provided as an illustration of a programmable, or programmed, series of pulses, or series of discharges, or, collectively, a wave train, or discharge wave-train, of discharge voltage v. time. In these drawings, each pulse is understood to be of short time duration, having the form of a spike, starting at the initial programmed voltage, and then decaying rapidly. The time duration of the pulse is not controlled directly, but tends to be a function of the total quantity of charge of the pulse and the resistance to the flow of the pulse. The voltage of the pulse is shown as being roughly triangular, with the amplitude (i.e., voltage) of the pulse decreasing. The pulses commence at $t_1$, $t_2$, $t_3$, etc., to $t_n$. In the example of FIG. 26*a*, each pulse in the wavetrain is variable. The pulses may have the same or different voltages $V_1$, $V_2$, $V_3$, etc., to $V_n$, from preceding or following pulses. Total charge may be different in each pulse. The pulses may have the same or opposite polarity. The pulses may be spaced by the same or different time between pulses. In that sense, the illustration of FIG. 26*a* is intended to be generic. It is also to be noted that referring to the series of pulses as a "wave train" may be understood in the sense of the pulses forming a continuing sequence of events. However, the term "wave train" tends to imply, or to be interpreted as, a series of waves of some measure of uniformity, or standard repeating periodicity (i.e., set frequency or set wavelength) such as produced by an oscillator, which may be an analog wave generator. In the case of FIG. 26*a*, however, each individual pulse in the series may be unique in terms of voltage, polarity, total charge discharged, and time-wise spacing from its neighbours. At the most basic level, it is a program for the creation of individual discharges, where the output includes several such individually programmed discharges spaced in time from each other. While it may be referred to as a wave train, and, as indicated above, as an Alternating Current wave train, it is more accurately thought of as a synthetic AC wavetrain that is made up of several programmed DC pulses strung together.

Figure 26B:
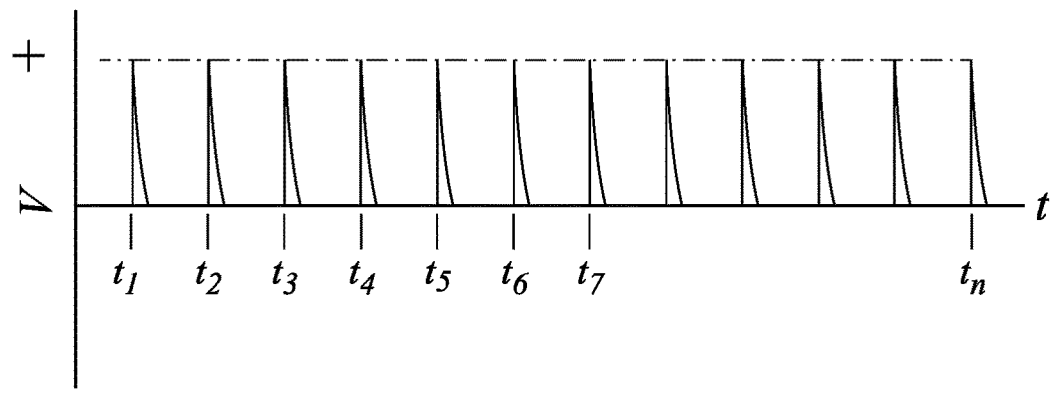
FIG. 26*b* is an example of a wave train produced using the apparatus of FIG. 21*a*.
Figure 26C:
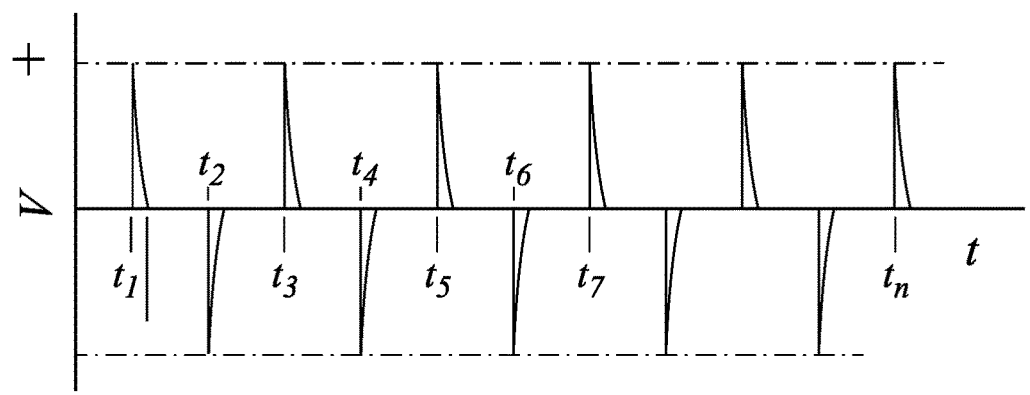
FIG. 26*c* shows a different wave train produced using the apparatus of FIG. 21*a*.
Figure 26D:
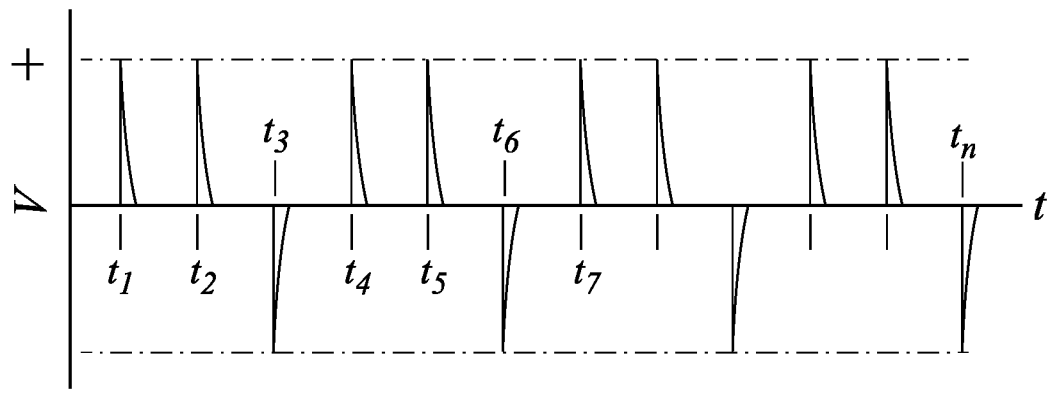
FIG. 26*d* shows an apparatus of unequal positive and negative pulses.
Figure 26E:
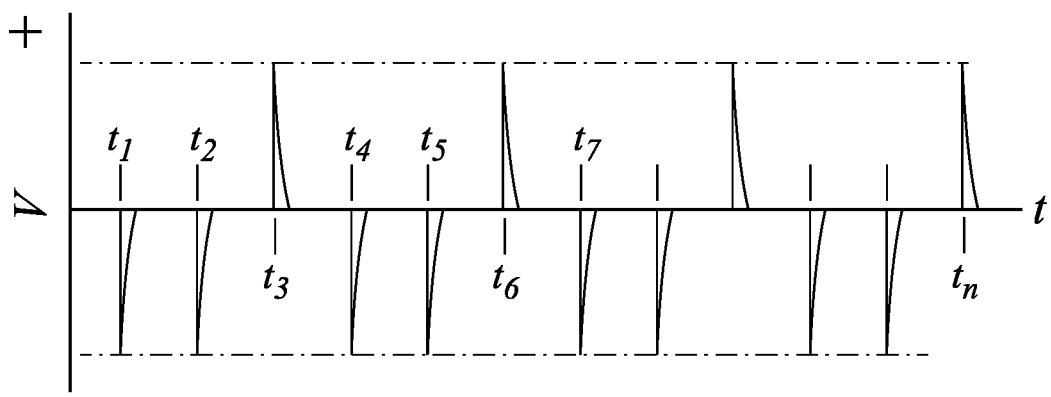
FIG. 26*e* shows a reversed wave train to that of FIG. 26*d*.
Figure 26F:
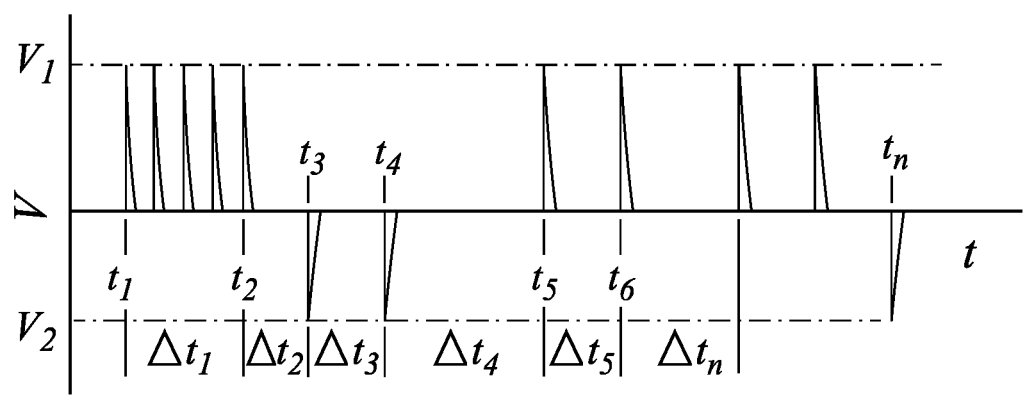
FIG. 26*f* shows an alternate programmed wave train to that of FIG. 26*a*.

In one embodiment, the method may include discharging a series of DCSP discharge pulses followed by a DCRP discharge, or a plurality of DCRP discharges, followed by one or more further DCSP discharge pulses. The energy per discharge may be less than 2 Joules. In the example of FIG. 26b, the apparatus is programmed to produce a series of discharges of the same voltage, with discharges at times $t_1$, $t_2$, $t_3$, etc., to $t_n$. The pulse spacing is equal, yielding a wave train resembling a rectified square wave. In FIG. 26c, the same wave form is shown, with alternating pulse having opposite polarity. This is a synthetic AC wave form produced by adding alternative polarity DC pulses. In FIG. 26d, the wave-form is asymmetric, having more positive pulses than negative pulses. The magnitude of the voltage discharge may vary from pulse to pulse. In a power supply with a single set of capacitor banks, the magnitude of the voltage may be equal in both directions. In this example, the spacing of the pulses is equal from pulse to pulse. The example of FIG. 26e is the opposite of FIG. 26d, being a wave form having more negative pulses than positive pulses. In FIG. 26f, the wave form may have a single magnitude of straight voltage, and a single magnitude of reverse voltage. The pulse duration, the number of pulses per time, and the pulse spacing may be individually variable, as shown. The variation in period between discharge, or sets of discharges, may also include "dead time", i.e., time periods or intervals, or interruptions, or pauses, when electrical discharge is suspended, notwithstanding that either the workpiece or the welding electrode applicator may continue to be subject to mechanical vibration such as to cause peening of the weld-metal coating or fillet, at may be. The frequency of peening, such as driven by a mechanical oscillator, may be in the range of 300 to 6000 rpm, or, roughly 5 Hz to 100 Hz, such as might be applied by an oscillator mounted to, or with, the welding electrode holder. Alternatively, peening may occur when vibration is provided at an ultrasonic frequency, applied either to the workpiece or to a jig in which it is mounted, or applied at the welding electrode holder. The peening vibration may also occur at the same time as electrical discharge. The initial voltage at the start of each discharge pulse may typically be in the range of 30 V-150 V DC, although lower voltages may be used depending on the material to be coated or welded. That is, welding TiC to Cu, as in welding caps, may be best suited to one voltage, perhaps a lower voltage such as about 30 V, whereas welding Aluminum, Magnesium, Nickel, or molybdenum may be suited to a different, perhaps higher, voltage, such as greater than 50 V. Similarly, the energy per discharge, the rate of discharges per unit time, and therefore the heat to be transferred, may vary according to the workpiece material and the coating material to be deposited.

Figure 28A:
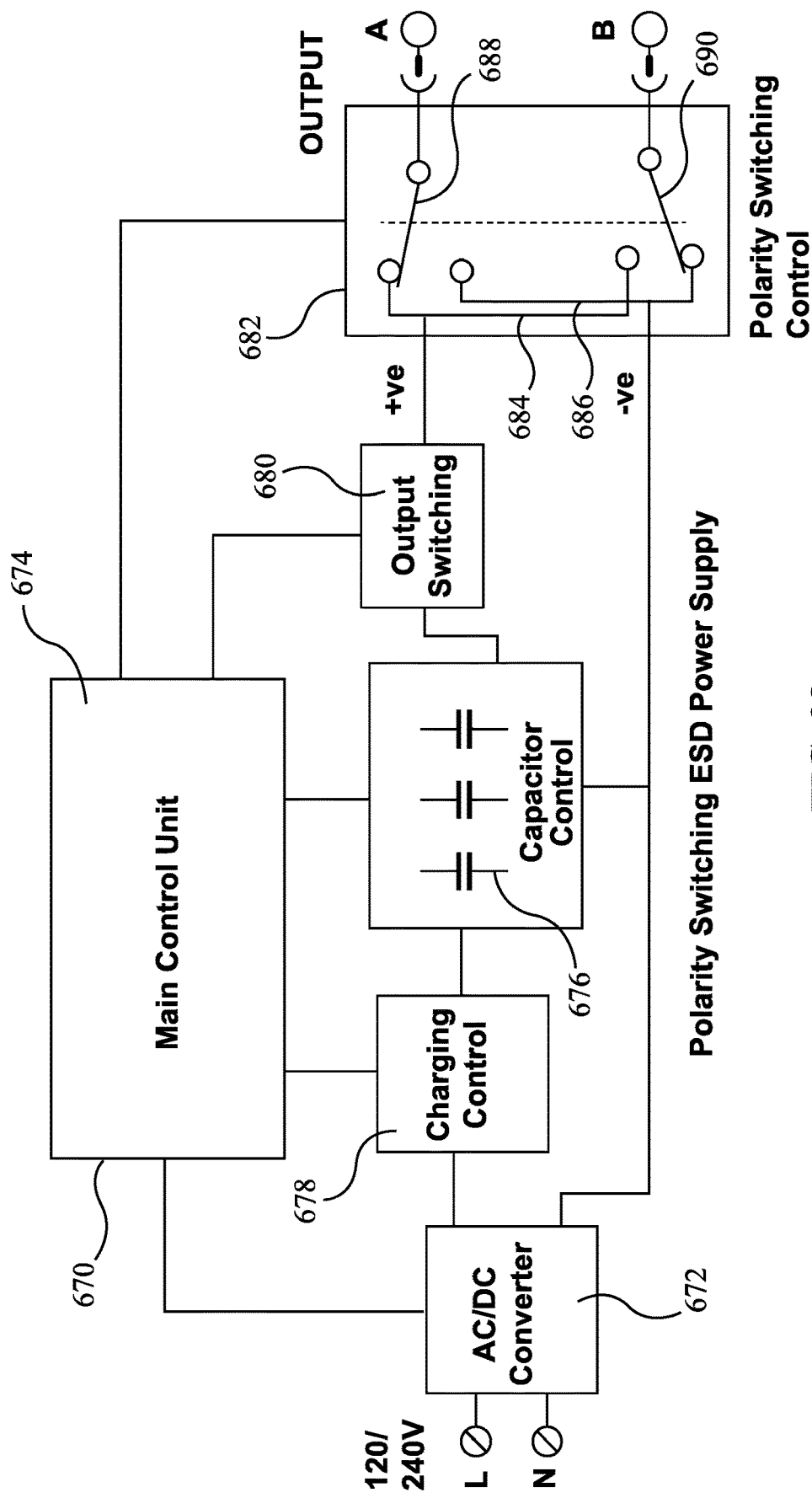
FIG. 28*a* is a schematic of a switching apparatus for the power supply of FIG. 21*a*.

While the use of a digitally-generated reversing DC sequence of pulses (or, alternatively, a "synthetic AC" wavetrain) may be applicable in a variety of ESD, or low energy welding, generally, FIG. 28a shows a two-pole apparatus to which reference may be made when considering the use of reversing or alternating ESD processes. In FIG. 27 there is a power supply, P.S., identified as 650. It receives line voltage, or such other source electrical power as may be, and converts it to a suitable output form. That conversion may involve rectification to a DC signal, and accumulation of charge on capacitor banks. Power supply 650 has three output terminals T1, T2 and T3, respectively. T1 is connected to the welding handle, and ultimately to the welding electrode, identified notionally as handle-and-electrode-assembly 660 by a conductor such as indicated as cable 652. The handle-and-electrode assembly 660 may be any of the welding electrode apparatus described herein.

In this instance, ESD, or low energy welding, or spark deposition welding may be used to join, or to form a weld between, two different parts. That is, it may be desired to attach two parts 662 and 664 of a desired final assembly indicated as 668. The weld fillet is indicated as 665. FIG. 27 may be exaggerated for the purpose of simplification and explanation. Parts 662 and 664 may be thin parts, perhaps less than 1/16" thick, perhaps less than 0.060" thick. They may be placed in very close contact and held in jigs for that purpose. Parts 662 and 664 may not necessarily be made of the same material, and they may not be made of materials that are easily joined under other circumstances. Alternatively, they may be the same material. In any case, they may be materials for which a large heat affected zone is not desired. As can be seen, T2 is electrically connected to part 662 and T3 is electrically connected to part 664, as indicated by cables 654, 656 respectively.

ESD, or low energy welding, may be commenced by applying a voltage discharge across T1 and either of T2 or T3. The welding rod and handle assembly 660 may be very finely guided along the site at which a weld filet is desired between parts 662 and 664 by an automated welding electrode holder, carriage, or robot. Alternatively, the handle may be held and moved manually.

Where the parts are of dissimilar materials, welding may start by coating the exposed surface of one or both of parts 662, 664 with an intermediate composition, such as nickel, or a nickel-rich alloy, to build up a stratum to which other materials may be welded more easily. Whether for similar metals or for dissimilar metals, ESD, or low energy welding, may be used to build up a coated layer. It may then be used to build up a fillet of weld metal between the parent metal of the two parts. This may take several passes, or coating sessions, as may be. The process may occur under an inert atmosphere, or in the presence of a supplied flow of shielding gas using suitable apparatus as described above. It may occur using a hand-held apparatus or a robot mounted welding electrode. When completed, the resultant weld may have only a small heat affected zone, or no appreciable heat affected zone. The weld may be very close to near net size, and may not require grinding or other surface finishing. Alternatively, the surface may be polished after welding, as suitable.

During operation, the power supply provides the welding electrode with current. As seen in the schematic drawing of FIG. 28a, power supply 650 may be a polarity switching electro-spark discharge power supply such as indicated at 670. Power supply 670 includes an input interface in the form of an input power converter 672 which converts line voltage to voltage usable within the power supply. The input power may be alternating current, e.g., 120 V, 60 Hz or 240 V, 50 Hz; or it may be a DC supply voltage, such as 150 V from another power supply to which power supply 650, 670, 700 or 710 may be connected as a power interface box, or converter. Input power converter 672 may be a two-terminal input having a first input L, for line voltage, and a second terminal N for neutral or ground. Power supply 670 also has a main control unit 674. Main control unit 674 may also be termed, or may include, a central processing unit which may have the form of a circuit board and ancillary components. Main control unit 674 is programmed to determine the nature of the input power signal received at converter 672, and to convert it accordingly into rectified DC at an appropriate voltage for charging the capacitors of the capacitor bank (or banks) 676. Capacitor banks 676 may include a single set of capacitors, two sets of capacitors, or more sets of capacitors. Main control unit 674 is also controls the charging of the capacitors of capacitor banks 676, and monitors their stored voltage levels, setting those voltage levels according to the voltage required for the programmed output pulses. This may be done by controlling the positive voltage output from input power converter 672 using a charging control 678 connected in series between input power converter 672 and capacitor banks 676. Main control unit 676 also controls a main discharge switch, indicated as output switching 680 which is connected in series between the positive side of capacitor banks 676 and the input positive terminal of a polarity switching control unit 682. During discharge output switching 680 is held in the closed position or condition, i.e., in which it conducts electricity by main control unit 674.

Polarity switching control 682 has two internal pairs of terminals 684, 686, the first being positive, the other being negative, neutral, or ground. Polarity switching control 682 also has two internal throws, or switches, 688, 690 that are slaved, i.e., linked, together. Control unit 674 is operates switches 688, 690, connecting them alternately to the first and second discharge power outlet terminals, seen as "A" and "B". In the normal, or straight polarity context, terminal pair 684 is connected through switch 688 to terminal "A". Similarly, the other side of terminal pair 686 is connected through switch 690 to terminal "B". In this configuration a "positive" charge pulse will be sent to the welding electrode. Alternatively, in the opposite position, main control unit 674 sets the switches such that the positive side, of terminal pair 684, is connected through switch 690 to terminal "B", and the negative, neutral, or ground side, of terminal pair 688, is connected through switch 688 to terminal "A", thus reversing the discharge polarity.

Figure 28B:
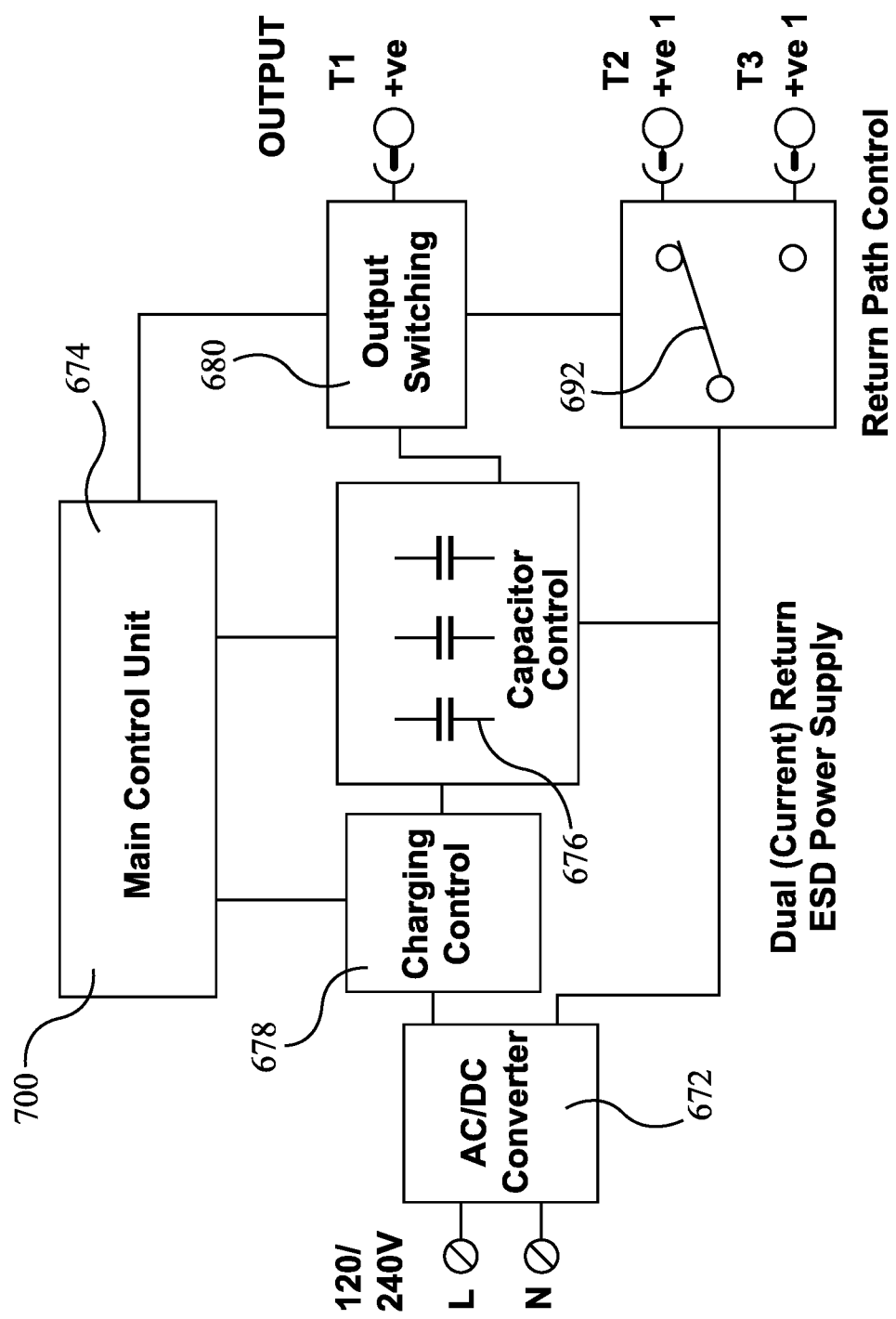
FIG. 28*b* is an alternate switching apparatus to that of FIG. 28*a*.

In the embodiment of FIG. 28b, power supply 700 may be taken as being the same as power supply 650, other than that it does not have an alternating polarity output, but rather a fixed positive (or negative, depending on which output is attached to the welding electrode) output at T1 (the positive output). On the negative, neutral, or ground side, there is a switch 692 that is movable between T2 and T3, such that discharge, and therefore deposition of welding rod material as a weld metal coating, will vary between parts 662 and 664, for example. Over time, as there is weld metal accumulation that bridges the join between parts 662 and 664, it will not matter which side provides the negative, neutral or ground.

Figure 28C:
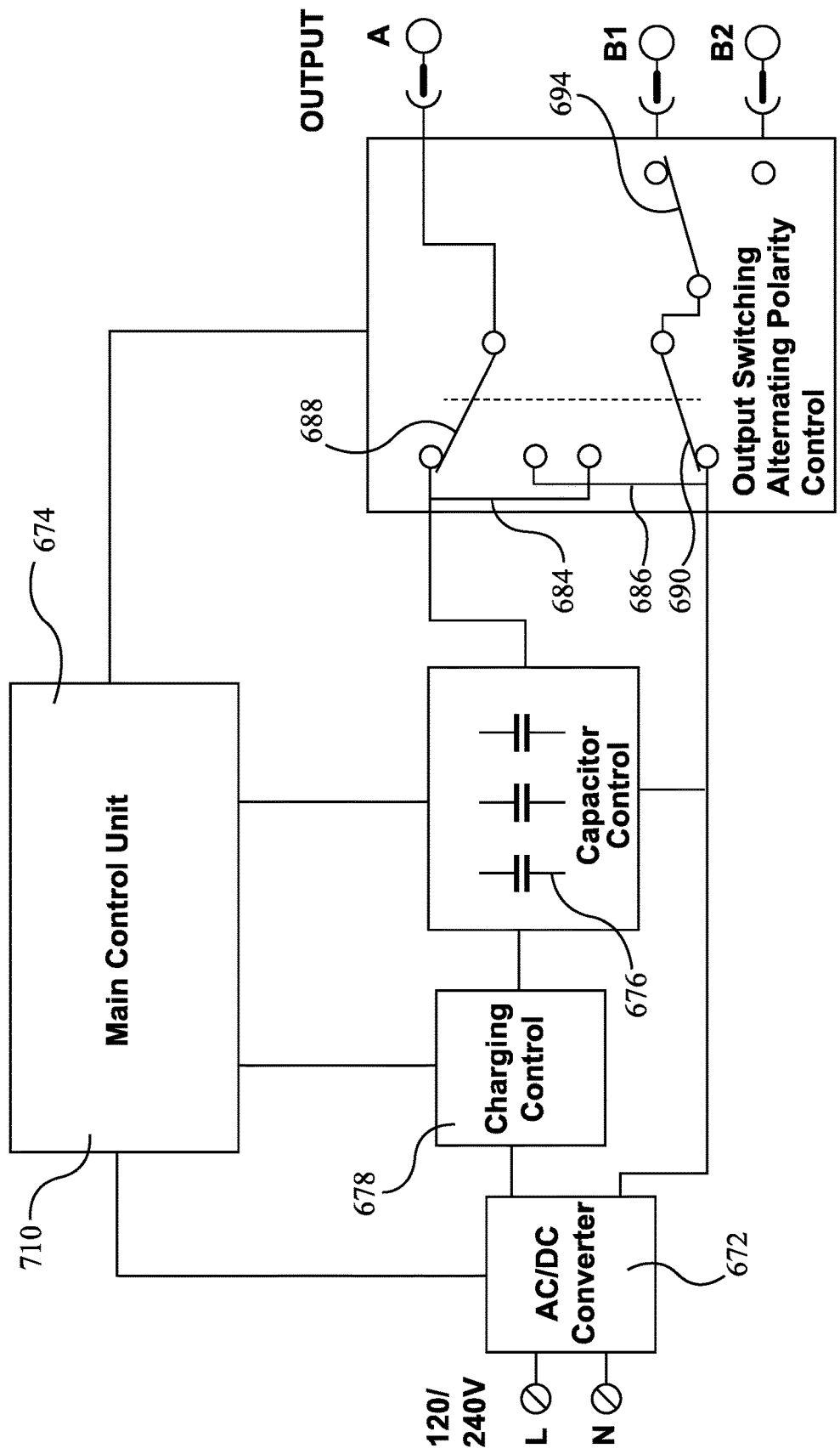
FIG. 28*c* is an alternate switching apparatus to that of FIG. 28*a*.

In FIG. 28c, power supply 710 combines the output switching features of power supply 670 and power supply 700 to provide both switching between alternate negative, neutral, or ground polarity for the parts upon which accumulation of deposited weld metal is to occur, and, in addition it also has the ability to reverse polarity between the welding electrode and the workpieces. That is, main control unit 674 operates to control the switching of alternating polarity switches 688 and 690, and to control the switching of alternate output control switch 694 which moves between alternate outputs "B1" and "B2".

In operation, the output switching of the embodiments, or examples, of FIG. 26a-26f, FIG. 27, and FIGS. 28a to 28c is controlled by main control unit 674. Although the synthetic DC electrical signals, or electrical pulses, however they may be called, may not have the same period or pulse duration, they may have an average rate of discharge, or an accumulated number of signals per elapsed unit of time. For example, there may be 10 to 10,000 signals, or discharges, over a period of 1 second. In some embodiments this rate may be in the range of 1500 discharges per second to 5000 discharges per second. This can be termed a frequency range of 10 Hz to 10 kHz, except that the individual pulses are not cyclic, but rather are discrete, programmed, DC discharges, as noted above. The programming may call for signal pulses of equal spacing, but it need not necessarily do so. As will also be noted, the rate of emission of discharge pulses is not amenable to manual control of the internal reversing polarity and alternate output terminal switches, but rather is an automated, programmed, electronically controlled process. The operator may program the power supply by adjusting the discharge voltage levels, and the overall energy discharge per unit time (effectively, the pulse voltage, total charge, and the number of pulses per second) to govern the overall heat input into the workpiece interface (e.g., to avoid over-heating). However, once having set those external input parameters, the main control unit is programmed electronically to implement the selections made by the operator.

The operator may also select whether straight polarity is to be employed, and to what extent. Alternatively, the deposition apparatus may sense the rate of consumption of the welding electrode, and, when that rate of consumption has fallen relative to the initial rate by a datum amount, such as 1/5 or ¼ (i.e., to 4/5 or ¾ of the original rate), to initiate a cleaning cycle using straight polarity. The cleaning cycle may include a series, or burst, of straight polarity pulses, or it may be implemented by alternating between forward or straight (i.e., cleaning) and reverse (i.e., deposition) pulses. The number of straight pulses may be different from, (i.e., not equal to), the number of reverse pulses. For example, the ratio of cleaning pulses to deposition pulses may be in the range of 1:1 to 1:10.

In summary, as described above, there is an electro-spark deposition apparatus. It has a power supply having a main control unit and a welding electrode connected to the power supply. The main control unit includes a synthetic discharge signal generator programmed to produce DC discharges as output electrical signals from the power supply. Each discharge has an initial voltage, a charge, a starting time and a polarity. The synthetic discharge signal generator is programmed to release a plurality of these DC discharges in series. The set of discharges defines a synthetic AC output of the series of the DC discharges.

The apparatus includes an output polarity reversing switch. The main control unit is connected to operate the output polarity reversing switch. The apparatus may have three output terminals: a first of the output terminal is connected to the welding electrode, a second of the output terminals and a third of the output terminals have respective workpiece connections, such as cables, connected to the workpiece, or workpieces, or jigs in which they are mounted. The apparatus has an output selection switch operable alternately to connect the second and third output terminals. The main control unit is connected to operate the output selection switch. The power supply may have first and second banks of capacitors (and possibly more banks of capacitors). The main control unit is connected to govern discharge of the first and second banks of capacitors.

There is a method of electro-spark deposition that includes providing a welding apparatus having a power supply, a welding electrode connected to the power supply, a consumable welding electrode rod mounted to it, and first and second workpiece connections emanating from the power supply. The workpiece connections, in operation, are of opposite polarity to the welding electrode. The method includes providing an electro-spark discharge current to the welding electrode rod while the power supply is switched to elect the first workpiece connection; switching the power supply to elect the second workpiece connection; and providing an electro-spark discharge current to the welding electrode rod while the power supply is switched to elect the second workpiece connection.

The method includes repeatedly switching back and forth between the first and second workpiece connections. It may include reversing polarity as between the welding electrode and the first and second workpiece connections. The method may include changing output voltage when polarity is reversed to apply a first voltage during straight polarity discharge, and a second voltage during reverse polarity discharge. The first voltage may be of greater magnitude than the second. Reverse polarity discharges may be applied more often than straight polarity discharges. The ratio of reverse polarity discharges to straight polarity discharges may be in the range of 2:1 to 10:1. The method may include vibrating at least the welding electrode to peen deposited weld metal between discharges. It may also include applying ultrasonic vibration to the workpiece.

As in FIG. 27, the workpiece may include a first work piece part and a second workpiece part. The method includes welding the first and second workpiece parts together to form the workpiece. The first workpiece connection, i.e., the terminal cable, or electrical conductor strap, is electrically connected to the first workpiece part, and the second workpiece connection, or terminal cable, is electrically connected to the second workpiece part. In some examples of the method, the first workpiece part is made of a first material and the second workpiece part is made of a second material, which is different from the second material. The method may include providing an electro-spark deposition coating of at least one of the first and second workpiece parts of a first coating alloy, such as nickel or a nickel alloy, followed by a further coating of a second coating alloy applied to the first coating alloy. The method may include building a weldmetal fillet between the first and second workpiece parts. The method may be undertaken in the presence of a shielding gas.

In some embodiments, more than one welding or coating apparatus may be used at the same time, as where multiple passes are to be made, or one material is to be deposited upon another, or where a large area is to be treated.

Although the various embodiments have been illustrated and described herein, the principles of the present invention are not limited to these specific examples which are given by way of illustration, but only by a purposive reading of the claims.

We claim:

1. A method of electro-spark deposition comprising:
providing an electro-spark deposition welding apparatus including an electro-spark deposition power supply, a welding electrode holder connected to the power supply, and a consumable welding electrode rod mounted to the welding electrode holder, and at least first and second workpiece connections emanating from said electro-spark deposition power supply;
in use said first and second workpiece connections being at different locations;
said welding electrode, in operation, being of a first polarity;
said first and second workpiece connections, in operation, being of a second polarity;
said second polarity of said first and second workpiece connections, in operation, being of opposite polarity to said first polarity of said welding electrode;
providing a first electro-spark deposition discharge current to said welding electrode rod while said power supply is switched to elect said first workpiece connection;
switching said electro-spark deposition power supply to elect said second workpiece connection; and
providing a second electro-spark deposition discharge current to said welding electrode rod while said power supply is switched to elect said second workpiece connection;
said first electro-spark deposition discharge current having the same polarity relative to said welding electrode rod as does said second electro-spark deposition discharge.

2. The method of claim 1 wherein said method includes repeatedly switching back and forth between said first and second workpiece connections.

3. The method of claim 1 wherein said method includes occasionally reversing polarity as between (a) said welding electrode and (b) at least one of said first and second workpiece connections.

4. The method of claim 3 wherein said method includes applying a first voltage during a first electro-spark deposition discharge, said first electro-spark deposition discharge being a straight polarity discharge, and applying a second voltage during a second electro-spark deposition discharge, said second electro-spark deposition discharge being a reverse polarity discharge, and said first voltage having a greater magnitude than said second voltage.

5. The method of claim 3 wherein said method includes applying a different number of straight polarity discharges than reverse polarity discharges.

6. The method of claim 1 wherein said method includes maintaining total energy in individual discharges of said welding electrode rod to less than 20 Joules.

7. The method of claim 1 wherein said method includes at least one of:
(a) vibrating at least the welding electrode to peen deposited weld metal; and
(b) applying ultrasonic vibration to the workpiece.

8. The method of claim 1 wherein the workpiece includes a first work piece part and a second workpiece part, said first workpiece connection is electrically connected to said first workpiece part, and said second workpiece connection is electrically connected to said second workpiece part; and said method includes welding said first workpiece part and said second workpiece part together to form said workpiece.

9. The method of claim 8 wherein said method includes having said first workpiece part made of a first material and said second workpiece part made of a second material, said first material being different from said second material.

10. The method of electro-spark deposition of claim 8 wherein said method includes building a weldmetal fillet between said first and second workpiece parts.

11. The method of electro-spark deposition of claim 1 wherein said method includes providing a main control unit; and programming said main control unit to alternate connection of said power supply as between said first and second workpiece connections.

12. The method of electro-spark deposition of claim 1 wherein said power supply has a main control unit and a polarity reversing switch, and said method includes programming said main control unit to reverse polarity of said power supply as between (a) said electrode; and (b) the connected one of said first and second workpiece connections.

13. The method of electro-spark deposition of claim 1 in which the power supply includes at least a first capacitor bank and a second capacitor bank, and said method includes charging said first capacitor bank to a first voltage and charging said second capacitor bank to a second voltage, said first voltage of said first capacitor bank being different from said second voltage of said second capacitor bank; said first voltage of said first capacitor bank having a magnitude that is larger than the magnitude of said second voltage of said second capacitor bank; applying said first voltage to said welding electrode rod in a first polarity mode;

and applying said second voltage to said welding electrode rod in a second polarity mode; said second polarity mode being opposite to said first polarity mode.

14. The method of electro-spark deposition of claim 1, wherein the power supply has an input power converter that is sensitive to at least voltage amplitude and frequency of input power, and a main control unit and said method includes programming the main control unit to transform input AC power received by said input power converter to a DC output and then converting said DC output to a synthetic AC output.

15. The method of electro-spark deposition of claim 1 wherein said apparatus includes at least one of (a) welding electrode vibrator; and (b) a workpiece vibrator and said method includes applying vibration correspondingly to at least one of (a) the welding electrode; and (b) the workpiece.

16. The method of electro-spark deposition of claim 1 wherein there are time periods between successive electro-spark deposition discharges, and said method includes varying said time periods.

17. The method of electro-spark deposition of claim 1 in which the power supply includes at least a first capacitor bank and a second capacitor bank, and a polarity reversing switch, and said method includes:

providing a main control unit;
charging said first capacitor bank to a different voltage than said second capacitor bank in which voltage of said first capacitor bank has a magnitude that is larger than is said voltage of said second capacitor bank;
applying said first voltage in one polarity mode, and applying said second voltage in an opposite polarity mode; and
programming said main control unit to reverse polarity as between (a) said electrode;
and (b) the connected one of said first and second workpiece connections between successive discharges from said first and second capacitor banks.

18. The method of electro-spark deposition of claim 17, wherein the power supply has an input power converter that is sensitive to at least voltage amplitude and frequency of input power, and there is a main control unit, and said method includes programming the main control unit to transform input AC power received by said input power converter to a DC output and then converting said DC output to a synthetic AC output.

19. The method of electro-spark deposition of claim 18 wherein the welding apparatus includes at least one of (a) a welding electrode vibrator; and (b) a workpiece vibrator, and said method includes applying vibration correspondingly to at least one of (a) the welding electrode; and (b) the workpiece.

20. The method of electro-spark deposition of claim 17 wherein the welding apparatus includes at least one of (a) a welding electrode vibrator; and (b) a workpiece vibrator and said method includes applying vibration correspondingly to at least one of (a) the welding electrode; and (b) the workpiece.

* * * * *